(12) United States Patent
Mase et al.

(10) Patent No.: US 12,475,819 B2
(45) Date of Patent: Nov. 18, 2025

(54) DISPLAY DEVICE, DISPLAY SYSTEM, AND DISPLAY DRIVING METHOD

(71) Applicant: Sony Semiconductor Solutions Corporation, Kanagawa (JP)

(72) Inventors: Kota Mase, Tokyo (JP); Takayuki Kanda, Fukuoka (JP); Taro Ichitsubo, Tokyo (JP); Atsuto Moriwaki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/707,485

(22) PCT Filed: Oct. 4, 2022

(86) PCT No.: PCT/JP2022/037179
§ 371 (c)(1),
(2) Date: May 3, 2024

(87) PCT Pub. No.: WO2023/084950
PCT Pub. Date: May 19, 2023

(65) Prior Publication Data
US 2025/0029522 A1   Jan. 23, 2025

(30) Foreign Application Priority Data
Nov. 10, 2021  (JP)  ................. 2021-183508

(51) Int. Cl.
*G09G 3/00* (2006.01)
*G06F 3/01* (2006.01)

(52) U.S. Cl.
CPC ............. *G09G 3/001* (2013.01); *G06F 3/013* (2013.01); *G09G 2310/08* (2013.01); *G09G 2330/021* (2013.01); *G09G 2354/00* (2013.01)

(58) Field of Classification Search
CPC .... G06F 3/013; G09G 3/001; G09G 2310/08; G09G 2330/021; G09G 2354/00; G09G 2340/0407
See application file for complete search history.

(56) References Cited

U.S. PATENT DOCUMENTS

2017/0236466 A1   8/2017  Spitzer
2019/0164468 A1*  5/2019  Jung ................. G09G 3/2092
(Continued)

FOREIGN PATENT DOCUMENTS

JP   2003219346 A   7/2003
JP   2009122599 A   6/2009
(Continued)

OTHER PUBLICATIONS

International Search Report (PCT/ISA/210), International Application No. PCT/JP2022/037179, dated Dec. 20, 2022.

*Primary Examiner* — Matthew A Eason
*Assistant Examiner* — Scott D Au
(74) *Attorney, Agent, or Firm* — Michael Best & Friedrich LLP

(57) ABSTRACT

In one example, a display device includes a reception circuit that receives pieces of first, second, and third image data in order. The piece of first image data has pixel values for a first resolution, the piece of second image data has pixel values for a second resolution higher than the first resolution, and the piece of third image data has pixel values included an entire image. A display section includes first, second, and third sets of pixels, and a display drive circuit performs first, second, and third driving for the first, second and third sets of pixels.

19 Claims, 59 Drawing Sheets

(56) References Cited

U.S. PATENT DOCUMENTS

| | | | |
|---|---|---|---|
| 2020/0327863 | A1 | 10/2020 | Grossman |
| 2021/0089119 | A1 | 3/2021 | Riguer |
| 2021/0141449 | A1 | 5/2021 | Zhang |
| 2021/0166656 | A1 | 6/2021 | Atkinson |

FOREIGN PATENT DOCUMENTS

| | | | |
|---|---|---|---|
| JP | 2019197224 | | 11/2019 |
| JP | 2020504959 | A4 | 2/2020 |
| JP | 2020523688 | | 8/2020 |

* cited by examiner

[ FIG. 10 ]
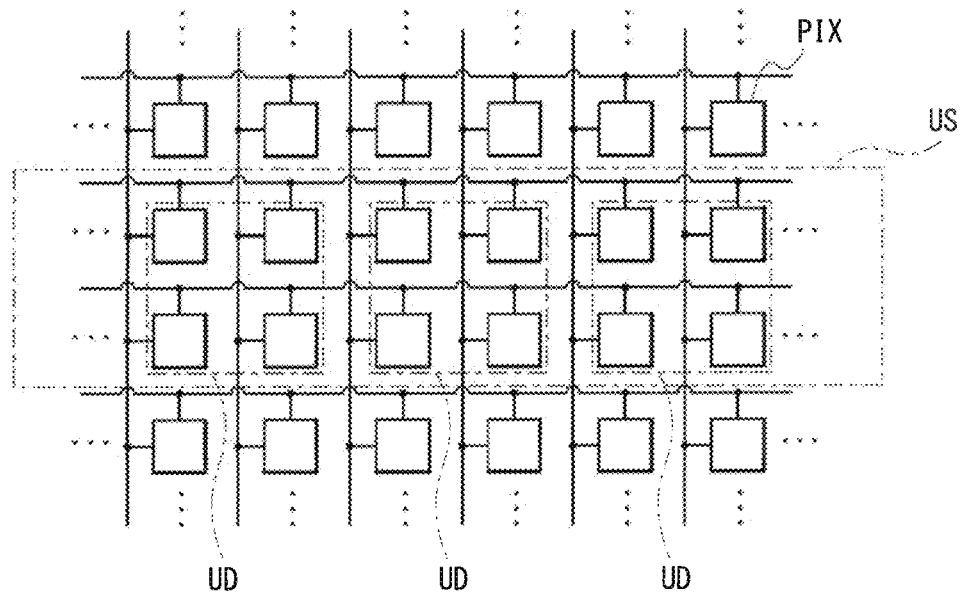
[ FIG. 11 ]
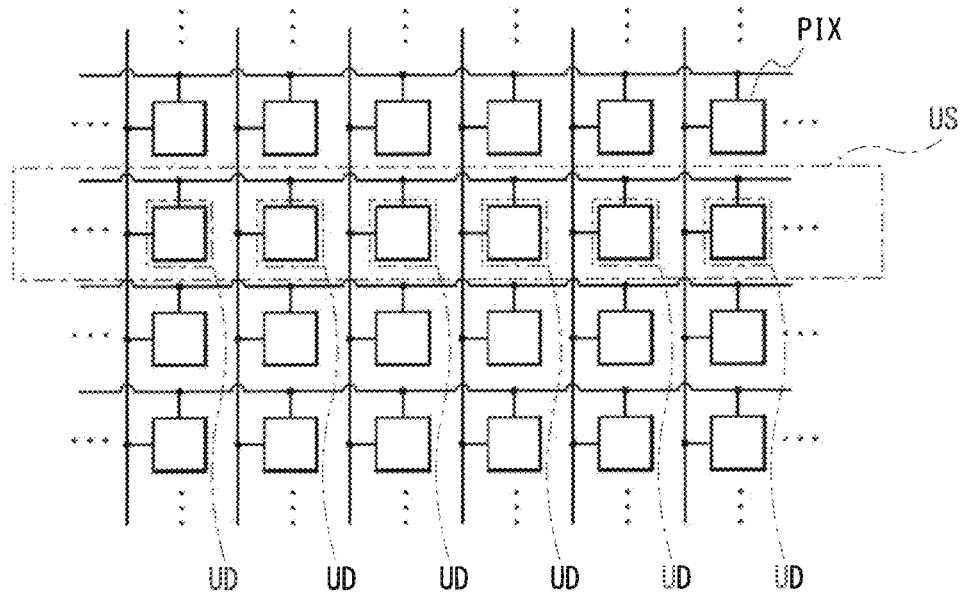

[ FIG. 12 ]
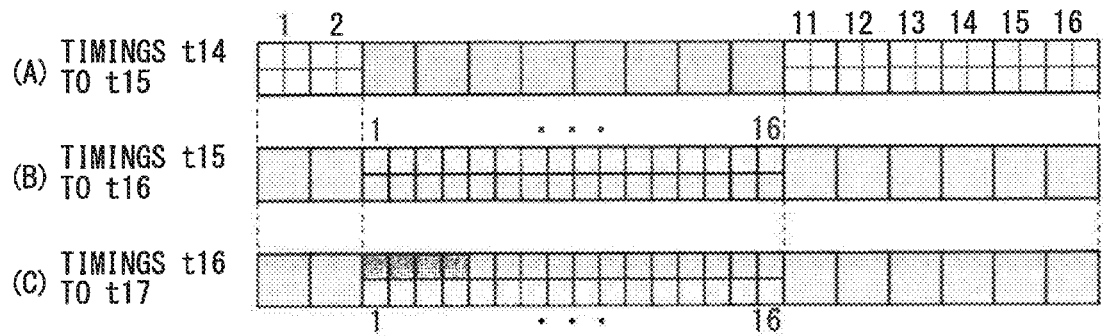
[ FIG. 13 ]
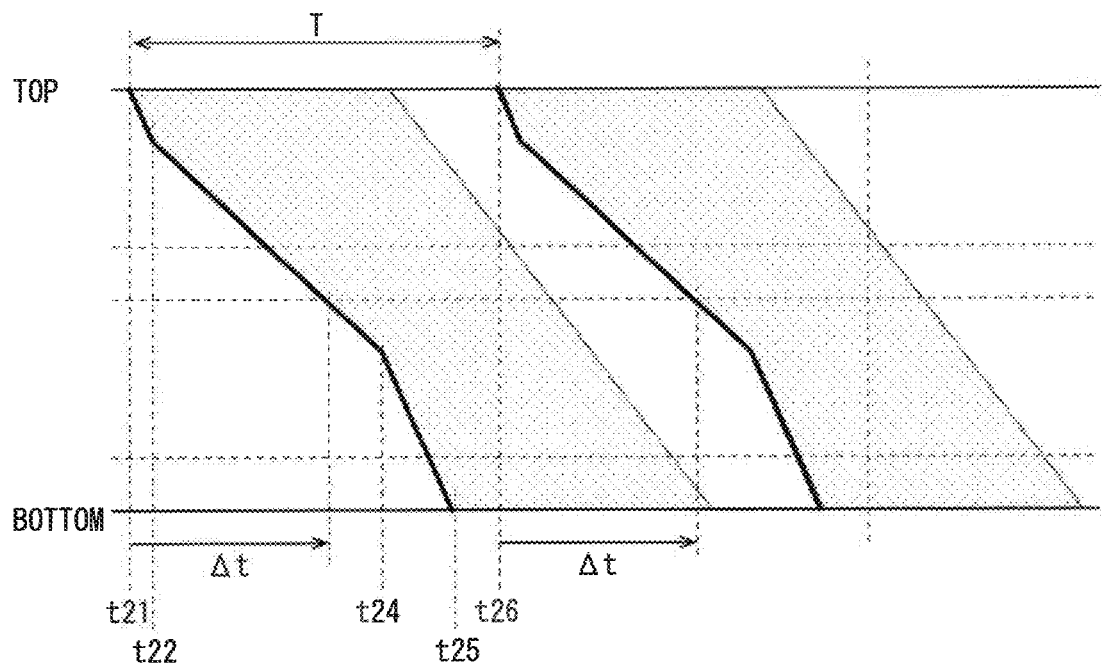

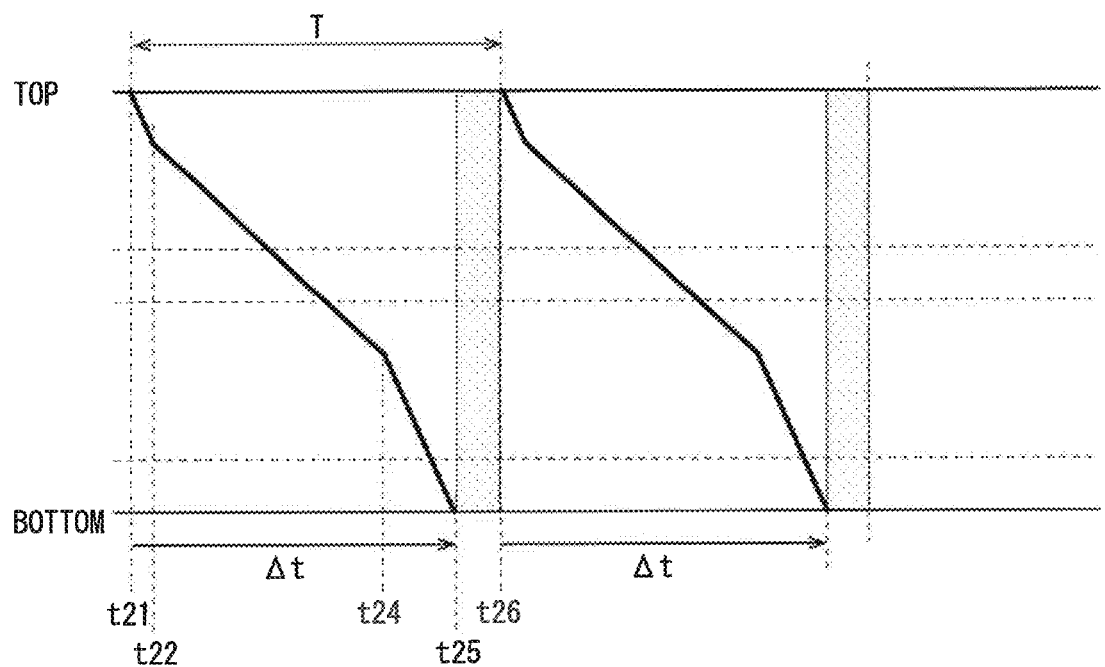
[ FIG. 14 ]

[ FIG. 21 ]
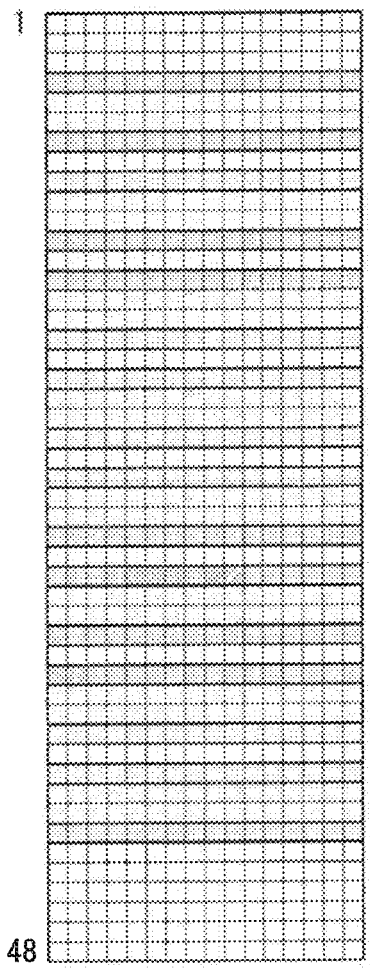

[ FIG. 22 ]
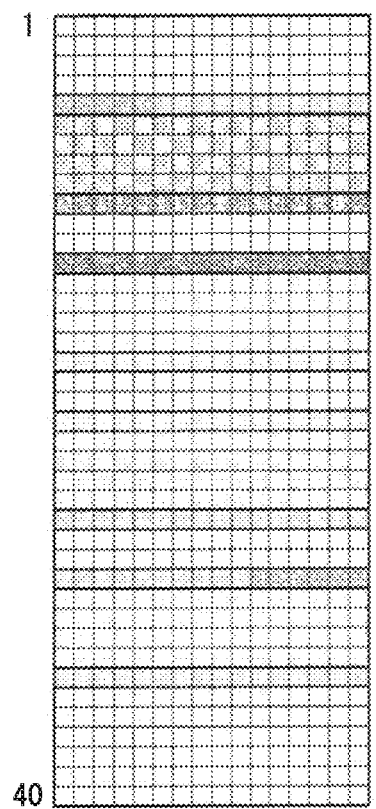

[ FIG. 23 ]
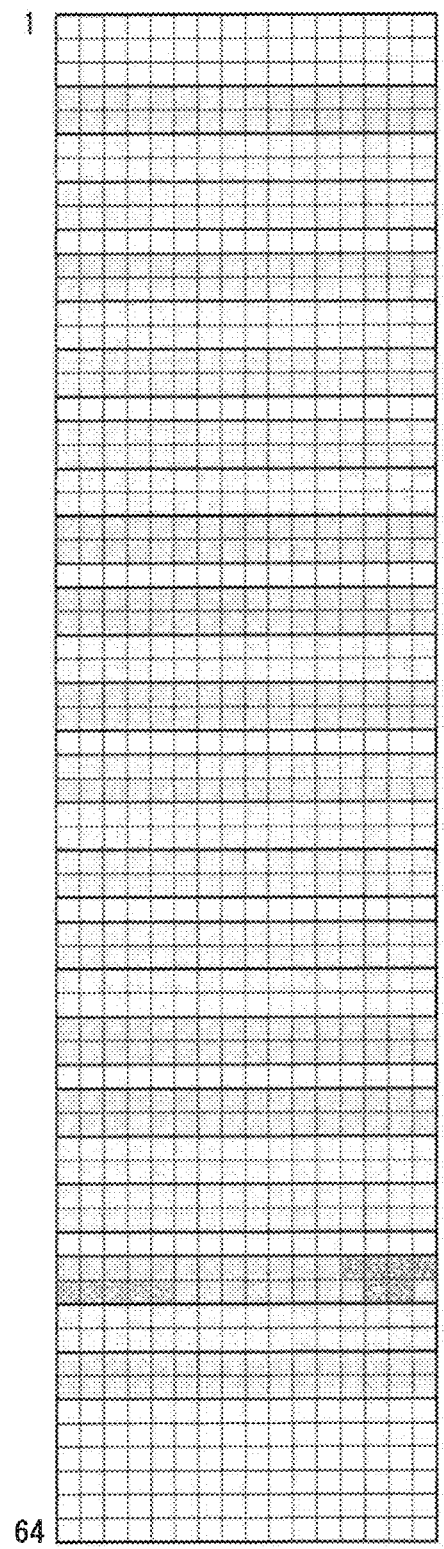

FIG. 24A

| | | CASE C1 | | CASE C2 | |
|---|---|---|---|---|---|
| | | PARTIAL IMAGE P2 | ENTIRE IMAGE P1 | PARTIAL IMAGE P2 | ENTIRE IMAGE P1 |
| COLOR SYSTEM | | RGB444 | RGB444 | YUV444 | YUV444 |
| DISPLAY DRIVING | | 1 | 2×2 | 1 | 2×2 |
| IMAGE DATA | | R1 R2 R3 R4 / R5 R6 R7 R8 / R9 R10 R11 R12 / R13 R14 R15 R16   G1 G2 G3 G4 / G5 G6 G7 G8 / G9 G10 G11 G12 / G13 G14 G15 G16   B1 B2 B3 B4 / B5 B6 B7 B8 / B9 B10 B11 B12 / B13 B14 B15 B16 | R1 R2 / R3 R4   G1 G2 / G3 G4   B1 B2 / B3 B4 | Y1 Y2 Y3 Y4 / Y5 Y6 Y7 Y8 / Y9 Y10 Y11 Y12 / Y13 Y14 Y15 Y16   U1 U2 U3 U4 / U5 U6 U7 U8 / U9 U10 U11 U12 / U13 U14 U15 U16   V1 V2 V3 V4 / V5 V6 V7 V8 / V9 V10 V11 V12 / V13 V14 V15 V16 | Y1 Y2 / Y3 Y4   U1 U2 / U3 U4   V1 V2 / V3 V4 |
| BAND USAGE RATE | | 50% | | 50% | |

FIG. 24B

| COLOR SYSTEM | CASE C3 | | CASE C4 | |
|---|---|---|---|---|
| | PARTIAL IMAGE P2 | ENTIRE IMAGE P1 | PARTIAL IMAGE P2 | ENTIRE IMAGE P1 |
| | YUV420 | YUV444 | ONLY Y | YUV444 |
| DISPLAY DRIVING | 1 | 2×2 | 1 | 2×2 |
| TRANSMISSION DATA | Y1-Y16 / U1-U4 / V1-V4 | Y1-Y4 / U1-U4 / V1-V4 | Y1-Y16 / (YUV420) | Y1-Y4 / U1-U4 / V1-V4 |
| BAND USAGE RATE | 37.5% | | 33% | |

FIG. 24C

| COLOR SYSTEM | CASE C5 | | | | CASE C6 | |
|---|---|---|---|---|---|---|
| | PARTIAL IMAGE P2 | PARTIAL IMAGE P2 (INCLUDING UV) | ONLY ENTIRE IMAGE P1 | | PARTIAL IMAGE P2 | ENTIRE IMAGE P1 |
| COLOR SYSTEM | YUV444 | YUV444 | YUV444 | | YUV444 | YUV444 |
| DISPLAY DRIVING | 1 | 2×2 | 2×2 | | 1 | 2×2 |
| TRANSMISSION DATA | Y1b Y2b Y3b Y4b / Y1c Y1d Y2c Y2d Y3c Y3d Y4c Y4d  (YUV420) | Y1a Y2a / Y3a Y4a ; U1 U2 / U3 U4 ; V1 V2 / V3 V4 | Y1 Y2 / Y3 Y4 ; U1 U2 / U3 U4 ; V1 V2 / V3 V4 | | Y1 Y2 Y3 Y4 / Y5 Y6 Y7 Y8 / Y9 Y10 Y11 Y12 / Y13 Y14 Y15 Y16 ; U1 U2 / U3 U4 ; V1 V2 / V3 V4 | Y1 Y2 / Y3 Y4 ; U1 ; V1 |
| BAND USAGE RATE | 37.5% | | | | 25% | |

[ FIG. 48 ]
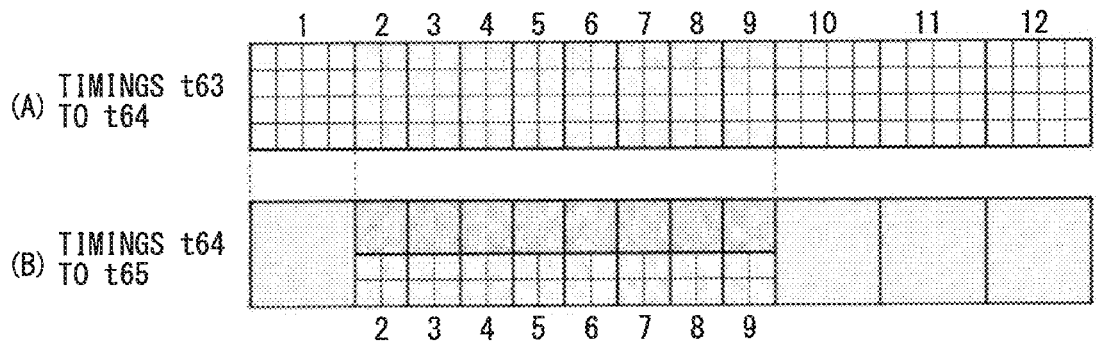
[ FIG. 49 ]
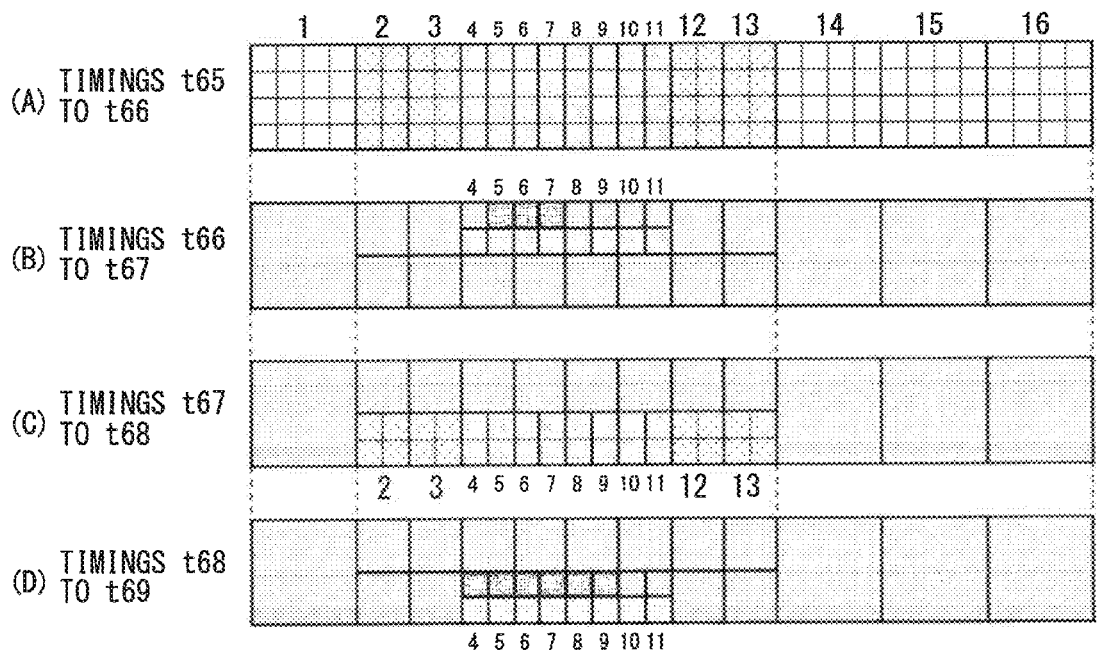

[FIG. 50]
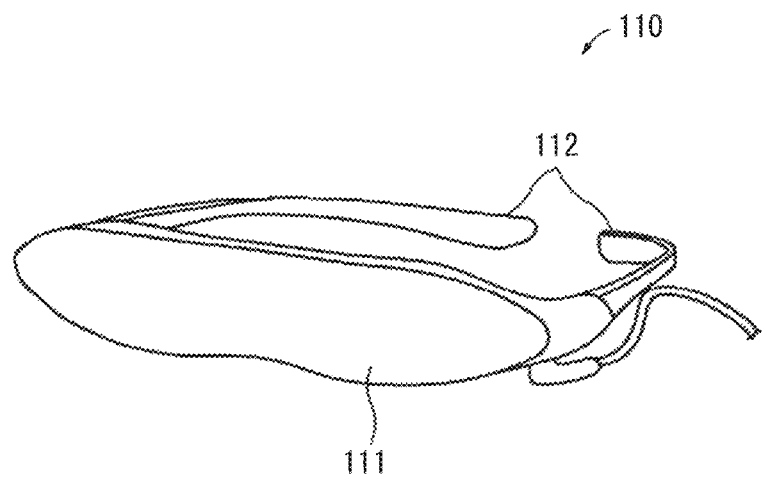
[FIG. 51]
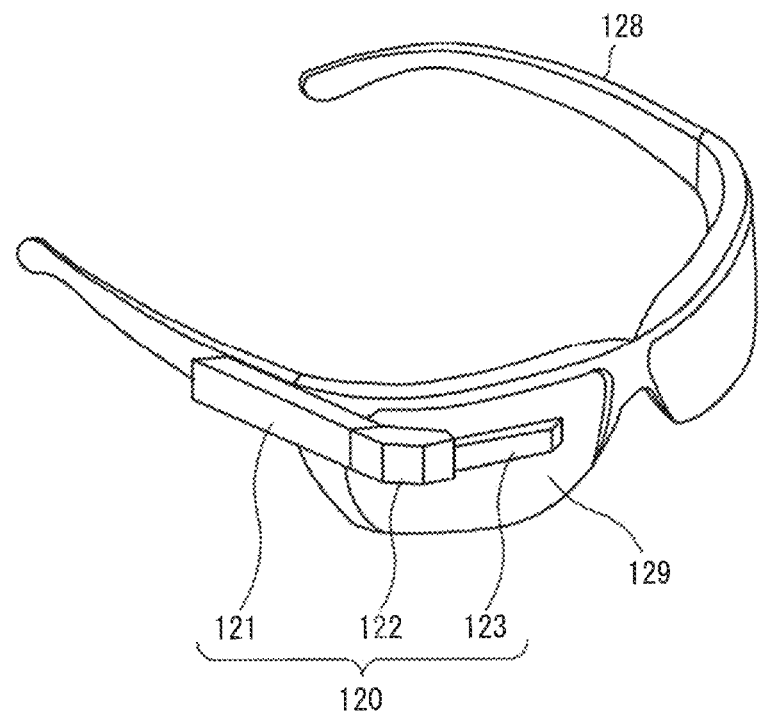

[FIG. 52A]
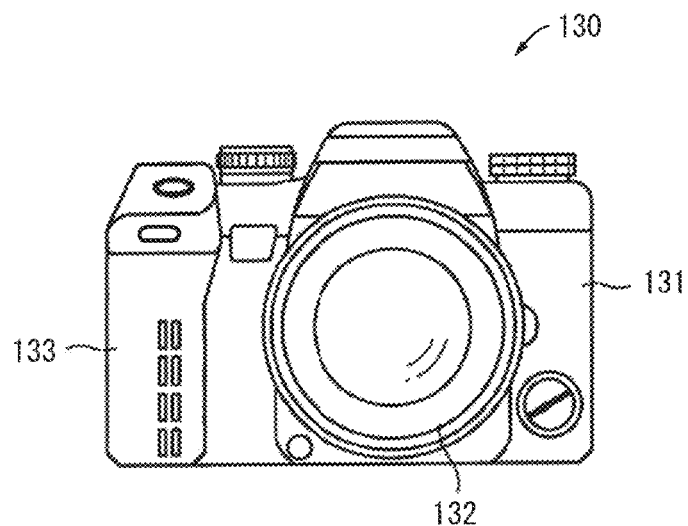
[FIG. 52B]
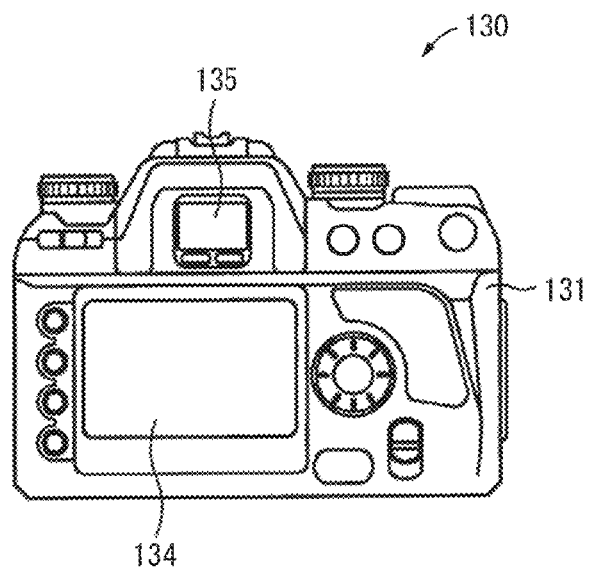

[ FIG. 53 ]
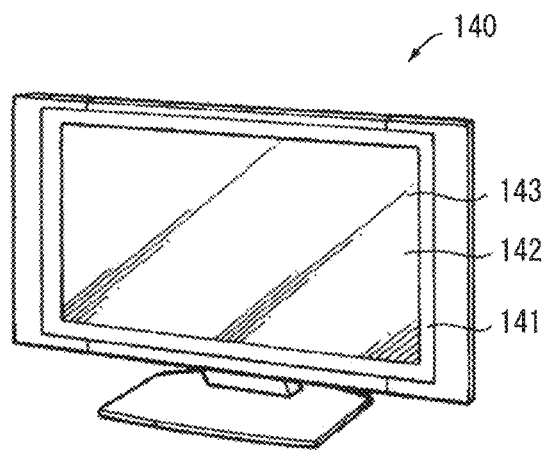
[ FIG. 54 ]
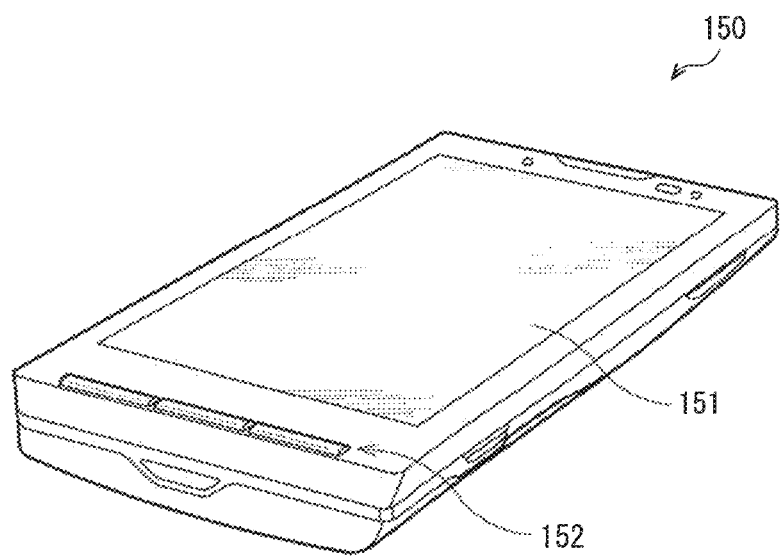

[FIG. 55A]
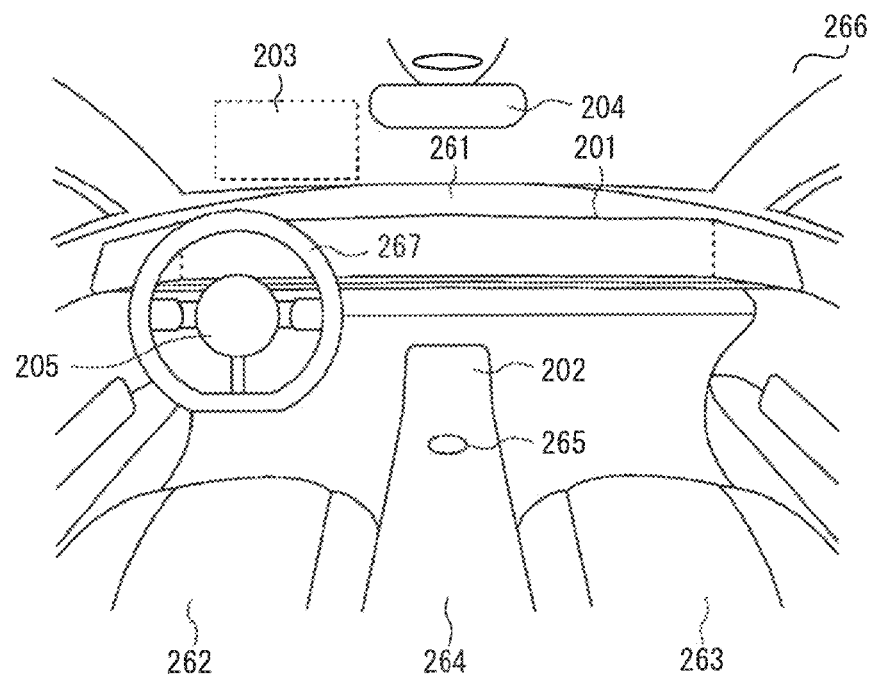
[FIG. 55B]
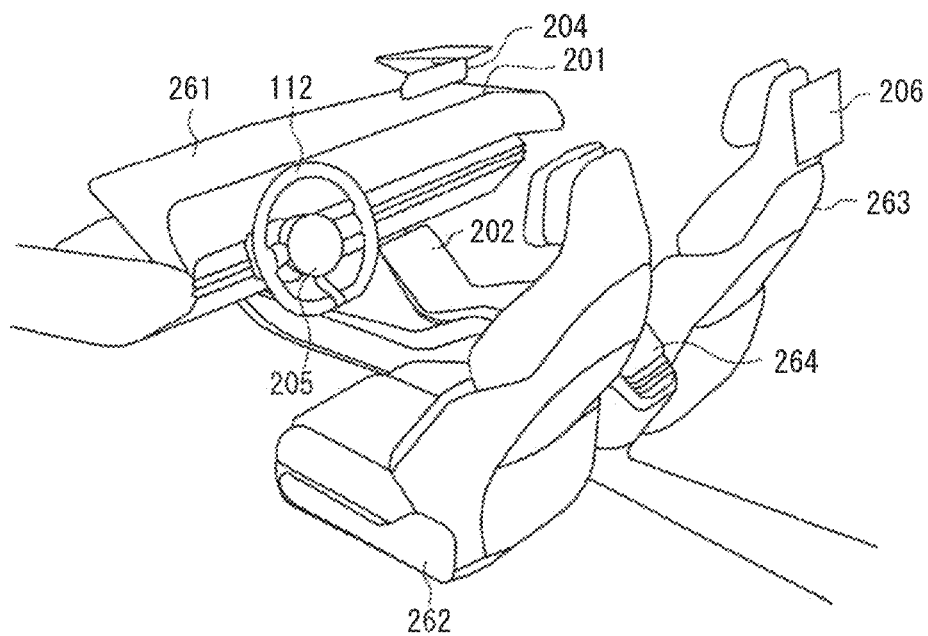

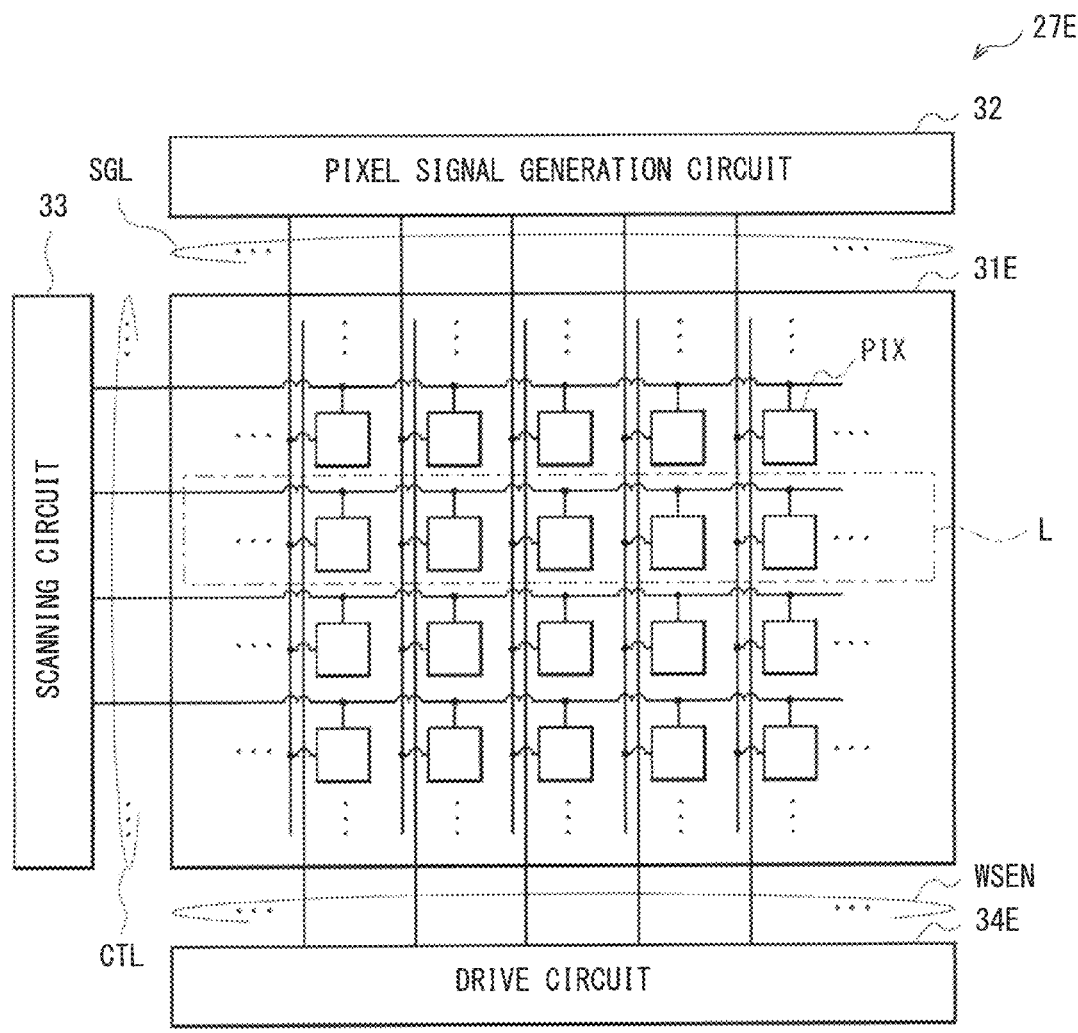
[FIG. 56]

[FIG. 57]
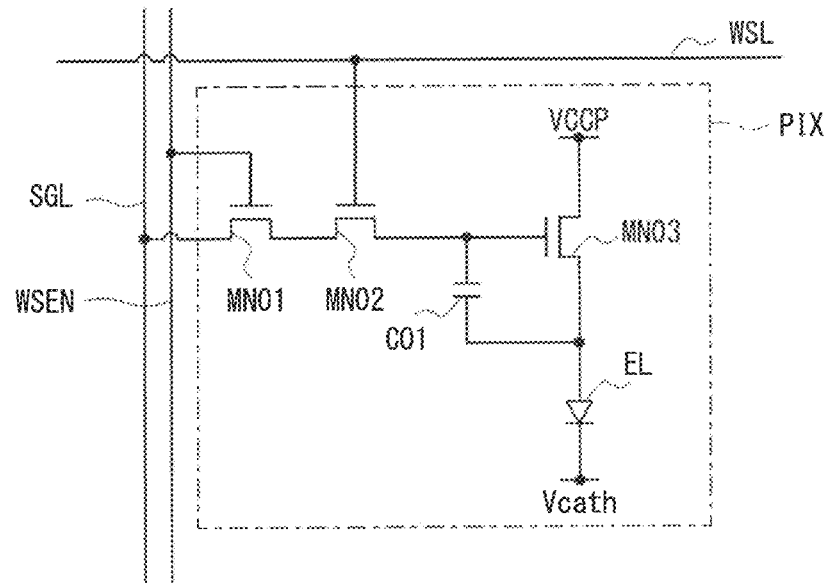
[FIG. 58]
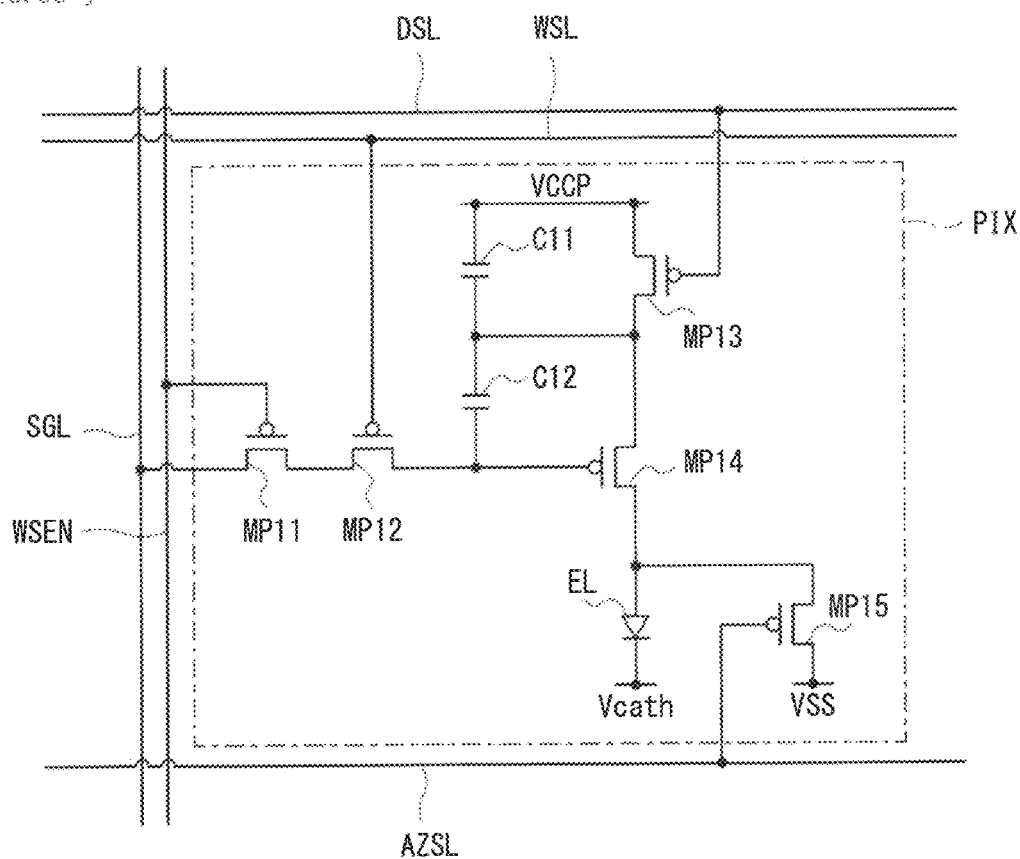

[ FIG. 59 ]
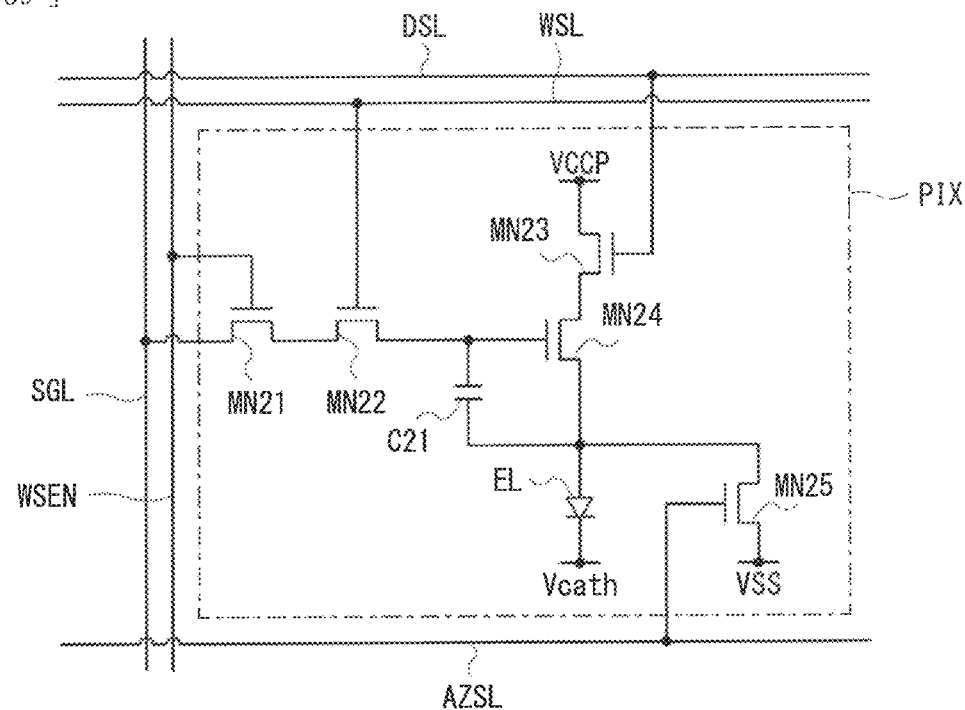
[ FIG. 60 ]
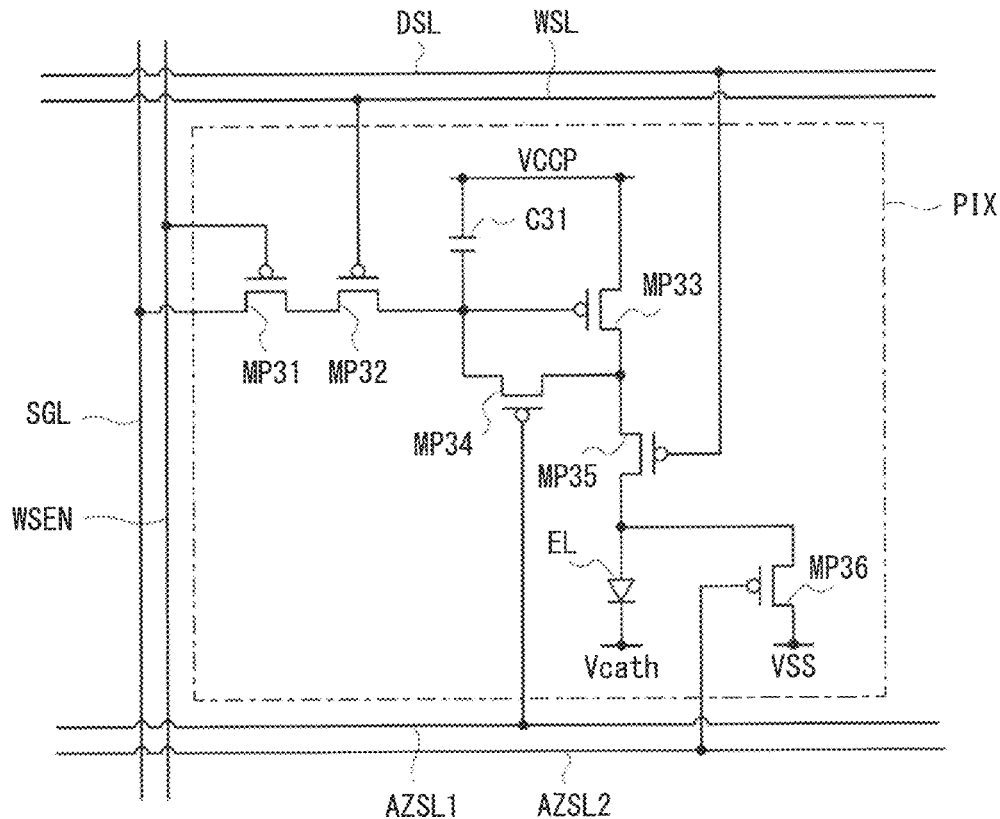

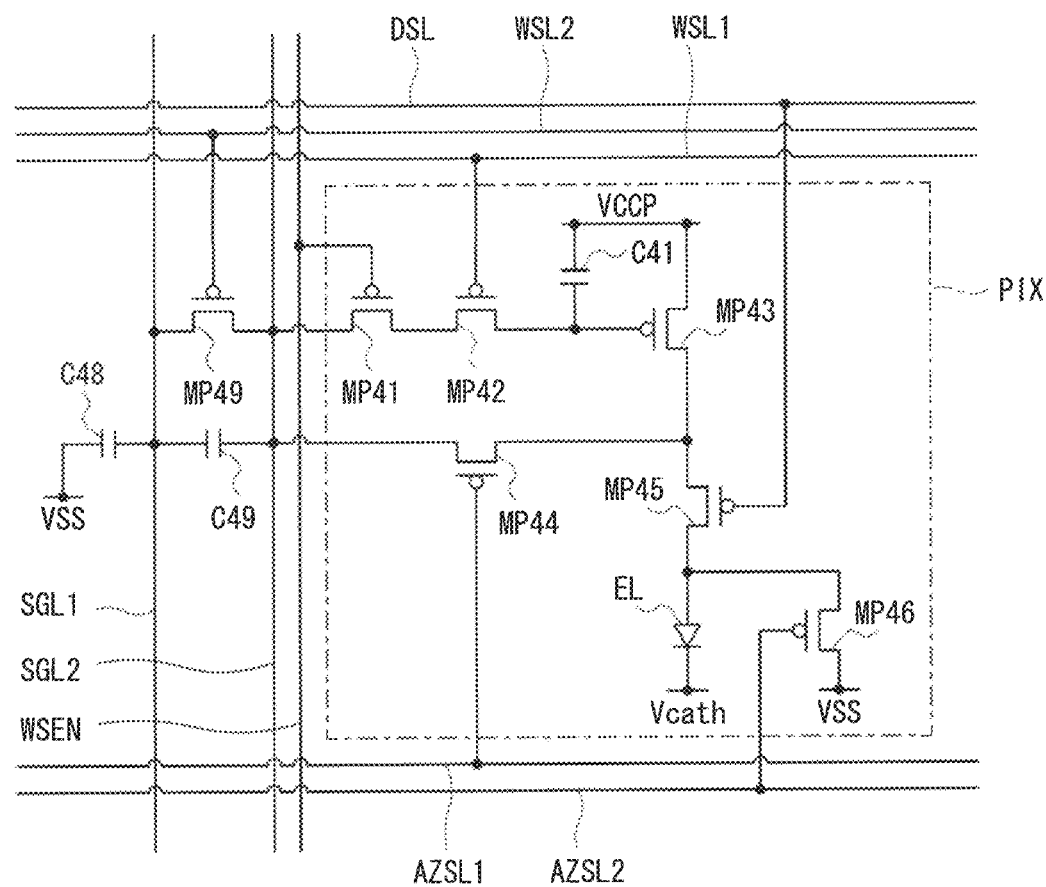
[FIG.61]

[ FIG. 62 ]
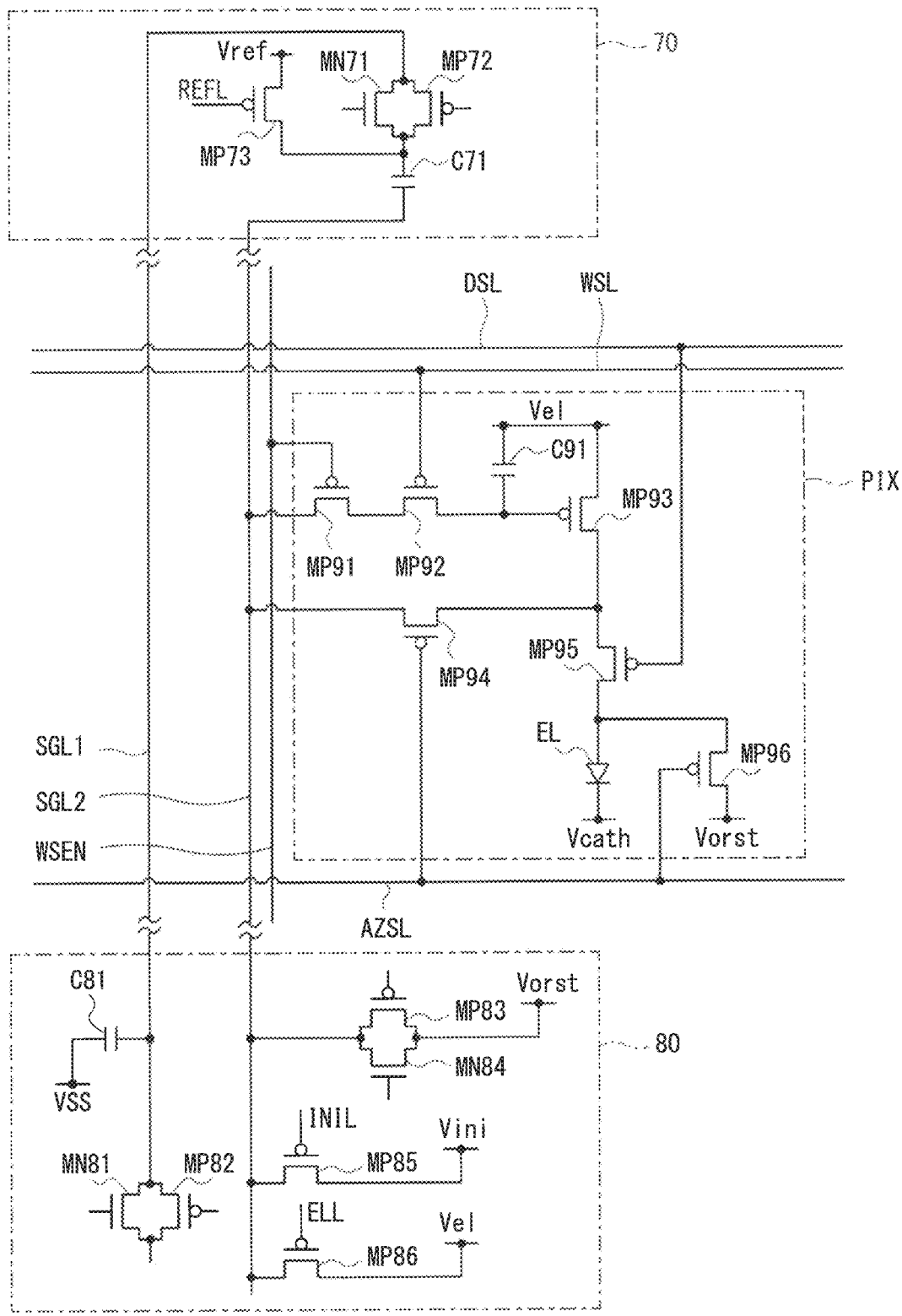

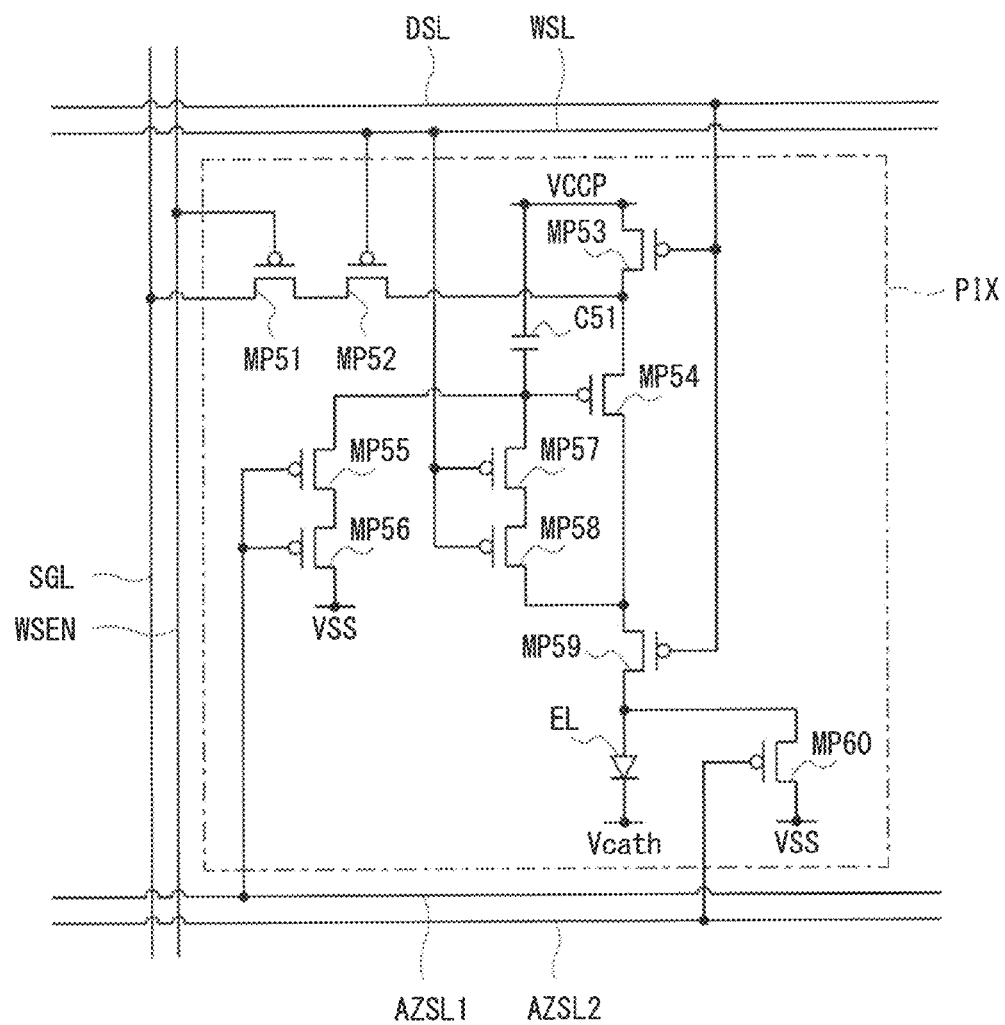
[FIG. 63]

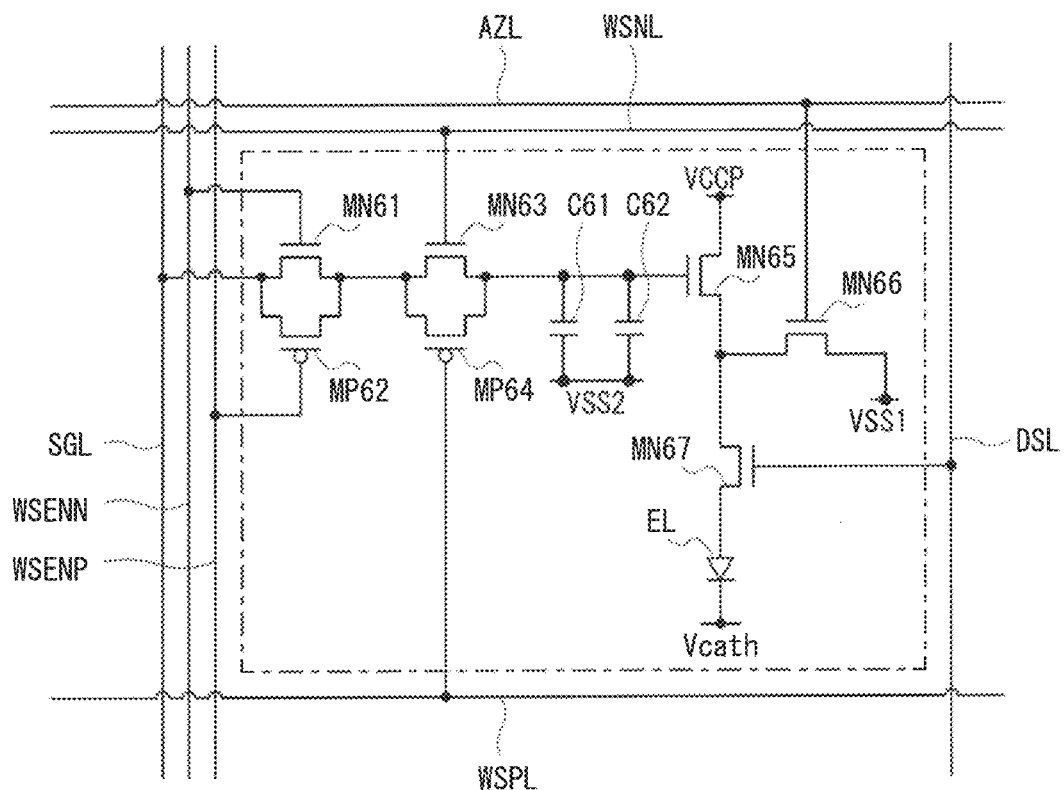
[FIG. 64]

DISPLAY DEVICE, DISPLAY SYSTEM, AND DISPLAY DRIVING METHOD

TECHNICAL FIELD

The present disclosure relates to a display device that displays an image, a display system, and a display driving method.

BACKGROUND ART

For example, there is a display device that generates a frame image on the basis of an entire image having a low resolution and a partial image having a high resolution and displays the generated frame image (for example, PTL 1).

CITATION LIST

Patent Literature

PTL 1: Japanese Unexamined Patent Application Publication No. 2019-197224

SUMMARY OF THE INVENTION

Incidentally, a display device is desired to have low power consumption, and a further reduction in power consumption is expected.

It is desirable to provide a display device, a display system, and a display driving method that make it possible to reduce power consumption.

A display device according to an embodiment of the present disclosure includes a reception circuit, a display section, and a display drive circuit. The reception circuit is configured to receive a piece of first image data, a piece of second image data, and a piece of third image data in this order. The piece of first image data has one or a plurality of pixel values included in an entire image having a first resolution. The piece of second image data has one or a plurality of pixel values included in a partial image having a second resolution higher than the first resolution. The partial image has an image range narrower than the entire image. The piece of third image data has one or a plurality of pixel values included in the entire image. The display section includes a first plurality of pixels, a second plurality of pixels, and a third plurality of pixels. The display drive circuit is configured to perform first driving, second driving, and third driving. In the first driving, the first plurality of pixels is driven in units of a first number of pixels on the basis of the piece of first image data. In the second driving, the second plurality of pixels is driven in units of a second number of pixels on the basis of the piece of second image data. The second number is smaller than the first number. In the third driving, the third plurality of pixels is driven in units of the first number of pixels on the basis of the piece of third image data.

A display system according to an embodiment of the present disclosure includes an image generation device and a display device. The image generation device is configured to transmit a piece of first image data, a piece of second image data, and a piece of third image data in this order. The piece of first image data has one or a plurality of pixel values included in an entire image having a first resolution. The piece of second image data has one or a plurality of pixel values included in a partial image having a second resolution higher than the first resolution. The partial image has an image range narrower than the entire image. The piece of third image data has one or a plurality of pixel values included in the entire image. The display device includes a reception circuit, a display section, and a display drive circuit. The reception circuit is configured to receive the piece of first image data, the piece of second image data, the piece of third image data in this order. The display section includes a first plurality of pixels, a second plurality of pixels, and a third plurality of pixels. The display drive circuit is configured to perform first driving, second driving, and third driving. In the first driving, the first plurality of pixels is driven in units of a first number of pixels on the basis of the piece of first image data. In the second driving, the second plurality of pixels is driven in units of a second number of pixels on the basis of the piece of second image data. The second number is smaller than the first number. In the third driving, the third plurality of pixels is driven in units of the first number of pixels on the basis of the piece of third image data.

A display driving method according to an embodiment of the present disclosure includes: receiving a piece of first image data, a piece of second image data, a piece of third image data in this order, the piece of first image data having one or a plurality of pixel values included in an entire image having a first resolution, the piece of second image data having one or a plurality of pixel values included in a partial image having a second resolution higher than the first resolution, the partial image having an image range narrower than the entire image, and the piece of third image data having one or a plurality of pixel values included in the entire image; performing first driving in which a first plurality of pixels is driven in units of a first number of pixels on the basis of the piece of first image data; performing second driving in which a second plurality of pixels is driven in units of a second number of pixels on the basis of the piece of second image data, the second number being smaller than the first number; and performing third driving in which a third plurality of pixels is driven in units of the first number of pixels on the basis of the piece of third image data.

In the display device, the display system, and the display driving method according to the embodiments of the present disclosure, the piece of first image data, the piece of second image data, and the piece of third image data are received in this order. The piece of first image data has the one or plurality of pixel values included in the entire image having the first resolution. The piece of second image data has the one or plurality of pixel values included in the partial image having the second resolution higher than the first resolution. The partial image has an image range narrower than the entire image. The piece of third image data has the one or plurality of pixel values included in the entire image. Thereafter, the first plurality of pixels is driven in units of the first number of pixels on the basis of the piece of first image data. The second plurality of pixels is driven in units of the second number of pixels smaller than the first number on the basis of the piece of second image data. The third plurality of pixels is driven in units of the first number of pixels on the basis of the piece of third image data.

BRIEF DESCRIPTION OF DRAWINGS

FIG. 10 is an explanatory diagram illustrating an example of a pixel driving operation.

FIG. 11 is an explanatory diagram illustrating another example of the pixel driving operation.

FIG. 12 is an explanatory diagram illustrating an example of a pixel driving operation in a head-mounted display illustrated in FIG. 1.

FIG. 13 is a timing chart illustrating an example of a display operation in the display system illustrated in FIG. 1.

FIG. 14 is a timing chart illustrating another example of the display operation in the display system illustrated in FIG. 1.

FIG. 21 is an explanatory diagram illustrating an example of pieces of image data included in an image signal in the display system illustrated in FIG. 20.

FIG. 22 is an explanatory diagram illustrating another example of the pieces of image data included in the image signal in the display system illustrated in FIG. 20.

FIG. 23 is an explanatory diagram illustrating another example of the pieces of image data included in the image signal in the display system illustrated in FIG. 20.

FIG. 24A is a table illustrating an operation example of a display system according to another modification example of the first embodiment.

FIG. 24B is another table illustrating an operation example of a display system according to another modification example of the first embodiment.

FIG. 24C is another table illustrating an operation example of a display system according to another modification example of the first embodiment.

FIG. 48 is an explanatory diagram illustrating an example of a pixel driving operation according to the modification example of the second embodiment.

FIG. 49 is an explanatory diagram illustrating another example of the pixel driving operation according to the modification example of the second embodiment.

FIG. 50 is a perspective view of an appearance configuration of a head-mounted display according to an application example.

FIG. 51 is a perspective view of an appearance configuration of another head-mounted display according to the application example.

FIG. 52A is a front view of an appearance configuration of a digital still camera according to another application example.

FIG. 52B is a rear view of an appearance configuration of the digital still camera according to another application example.

FIG. 53 is a rear view of an appearance configuration of a television apparatus according to another application example.

FIG. 54 is a rear view of an appearance configuration of a smartphone according to another application example.

FIG. 55A is an explanatory diagram illustrating a configuration example of a vehicle according to another application example.

FIG. 55B is another explanatory diagram illustrating a configuration example of the vehicle according to another application example.

FIG. 56 is a block diagram illustrating a configuration example of a display panel according to another modification example.

FIG. 57 is a circuit diagram illustrating a configuration example of a pixel illustrated in FIG. 56.

FIG. 58 is a circuit diagram illustrating another configuration example of the pixel illustrated in FIG. 56.

FIG. 59 is a circuit diagram illustrating another configuration example of the pixel illustrated in FIG. 56.

FIG. 60 is a circuit diagram illustrating another configuration example of the pixel illustrated in FIG. 56.

FIG. 61 is a circuit diagram illustrating another configuration example of the pixel illustrated in FIG. 56.

FIG. 62 is a circuit diagram illustrating another configuration example of the pixel illustrated in FIG. 56.

FIG. 63 is a circuit diagram illustrating another configuration example of the pixel illustrated in FIG. 56.

FIG. 64 is a circuit diagram illustrating another configuration example of the pixel illustrated in FIG. 56.

MODES FOR CARRYING OUT THE INVENTION

Some embodiments of the present disclosure are described below in detail with reference to the drawings. It is to be noted that description is given in the following order.
1. First Embodiment
2. Second Embodiment
3. Application Examples

1. First Embodiment

Configuration Example

Figure 1:
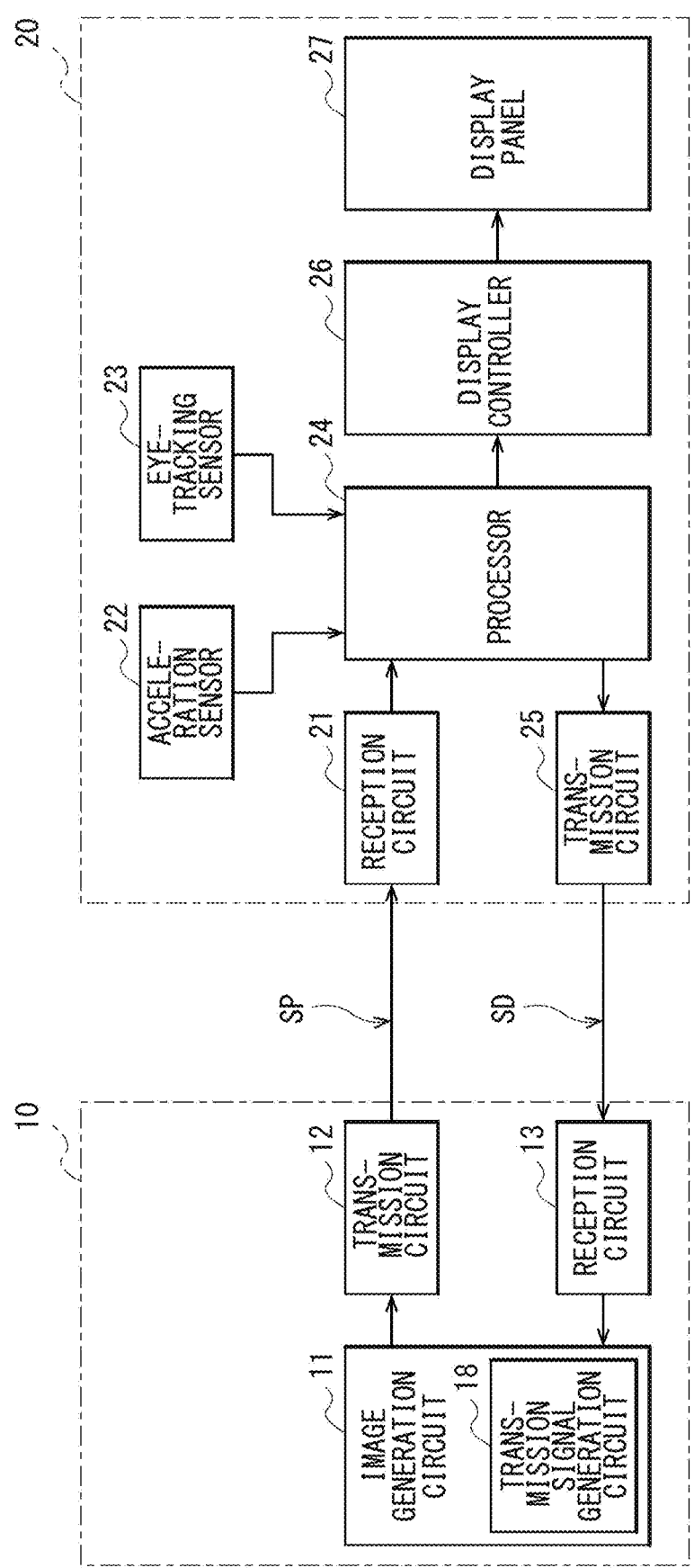
FIG. 1 is a block diagram illustrating a configuration example of a display system according to a first embodiment of the present disclosure.

FIG. 1 illustrates a configuration example of a display system (a display system 1) according to an embodiment. It is to be noted that a display device and a display driving method according to embodiments of the present disclosure are embodied by the present embodiment, and are therefore described together.

The display system 1 includes an image generation device 10 and a head-mounted display 20. The display system 1 is used for augmented reality (AR: Augmented Reality) or virtual reality (VR: Virtual Reality). The display system 1 is configured to perform foveated rendering (Foveated Rendering) in which, in generating an image, a region being gazed at is rendered with a high resolution and another region is rendered with a low resolution. The display system 1 performs communication between the image generation device 10 and the head-mounted display 20 with use of an interface such as HDMI (registered trademark)(High-Definition Multimedia Interface) or MIPI (registered trademark)(Mobile Industry Processor Interface) in this example. It is to be noted that, in this example, this communication is performed by wired communication; however, this communication is not limited thereto, and may be performed by wireless communication.

In the display system 1, the head-mounted display 20 displays an image on the basis of an image signal SP transmitted from the image generation device 10. An acceleration sensor 22 (to be described later) of the head-mounted display 20 detects a motion such as a direction of the head-mounted display 20. In addition, an eye-tracking sensor 23 (to be described later) of the head-mounted display 20 detects the direction of an eye of a user wearing the head-mounted display 20 to thereby detect which portion of a display image the user is looking at. The head-mounted display 20 supplies a detection signal SD including results of such detection to the image generation device 10. The image generation device 10 generates an image (an entire image P1) corresponding to the direction of the head-mounted display 20 on the basis of the result of detection by the acceleration sensor 22. In addition, the image generation device 10 specifies an image (a partial image P2) including a portion at which the user is looking of the entire image P1 on the basis of the result of detection by the eye-tracking sensor 23. Thereafter, the image generation device 10 generates the image signal SP including a piece of image data that has a low resolution and represents the entire image P1 and a piece of image data that has a high resolution and represents the partial image P2, and transmits the generated image signal SP to the head-mounted display 20.

(Image Generation Device 10)

The image generation device 10 is configured to generate an image to be displayed on the head-mounted display 20. The image generation device 10 includes an image generation circuit 11, a transmission circuit 12, and a reception circuit 13.

The image generation circuit 11 is configured to generate an image to be displayed on the head-mounted display 20, for example, by performing predetermined processing such as rendering processing. The image generation circuit 11 includes a transmission signal generation circuit 18. The transmission signal generation circuit 18 is configured to generate the image signal SP to be transmitted, on the basis of the image generated by the image generation circuit 11.

The image generation circuit 11 generates the entire image P1 representing a scenery corresponding to the direction of the head-mounted display 20 in a virtual space on the basis of the result of detection by the acceleration sensor 22 included in a piece of data supplied from the reception circuit 13. In addition, the image generation circuit 11 specifies the partial image P2 representing a portion at which the user is looking of the scenery corresponding to the direction of the head-mounted display 20 in the virtual space on the basis of the result of detection by the eye-tracking sensor 23 included in the piece of data supplied from the reception circuit 13.

Figure 2:
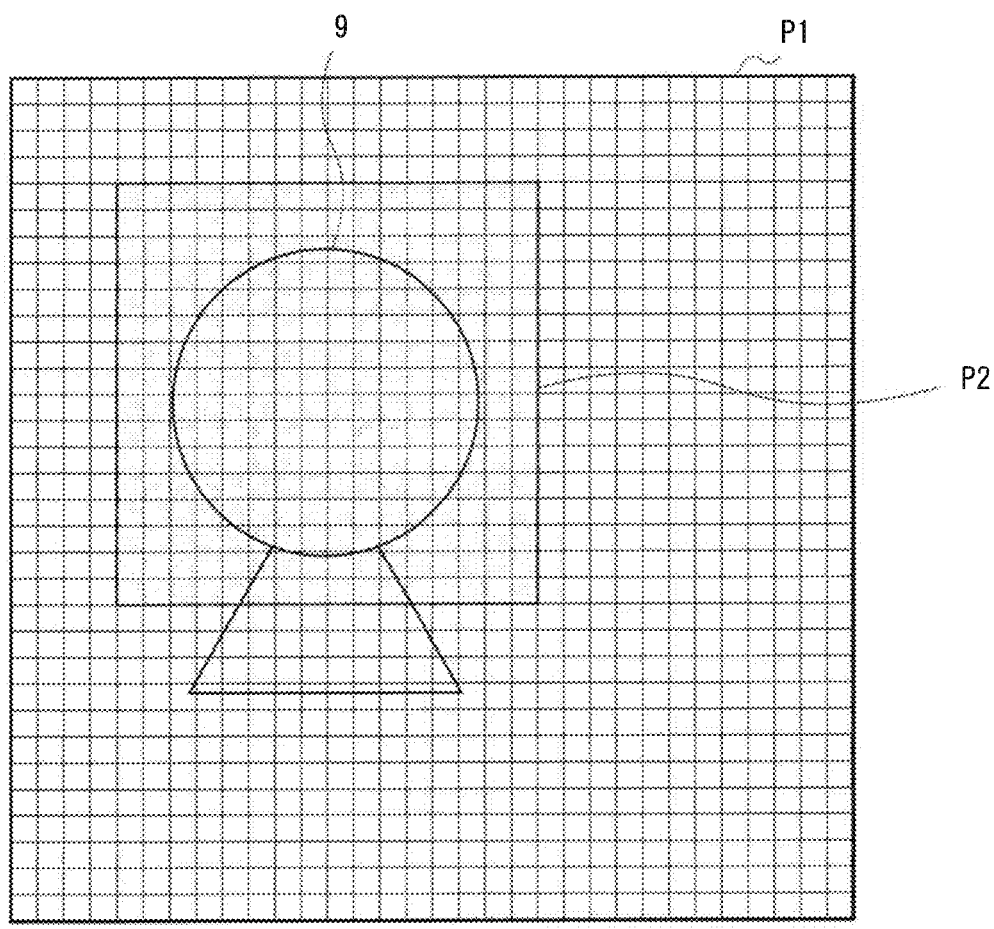
FIG. 2 is an explanatory diagram illustrating an example of an image generated by an image generation circuit illustrated in FIG. 1.

FIG. 2 illustrates an example of an image generated by the image generation circuit 11. In FIG. 2, squares indicate a plurality of pixels in the head-mounted display 20. In this example, for explanatory convenience, 32 pixels are provided side by side in a lateral direction, and 32 pixels are provided side by side in a longitudinal direction similarly.

The entire image P1 includes an image of a person 9. The image generation circuit 11 specifies the partial image P2 including a portion at which the user is looking of the entire image P1, on the basis of a result of detection by the eye-tracking sensor 23 included in the piece of data supplied from the reception circuit 13. In this example, the partial image P2 includes an image of the face of the person 9. In this example, a size in a horizontal direction (a lateral direction in FIG. 2) of the partial image P2 is a half of a size in the horizontal direction of the entire image P1, and a size in a vertical direction (a longitudinal direction in FIG. 2) of the partial image P2 is a half of a size in the vertical direction of the entire image P1. In other words, an area of the partial image P2 is ¼ of an area of the entire image P1.

The transmission signal generation circuit 18 generates the image signal SP to be transmitted, on the basis of such an image generated by the image generation circuit 11.

Figure 3:
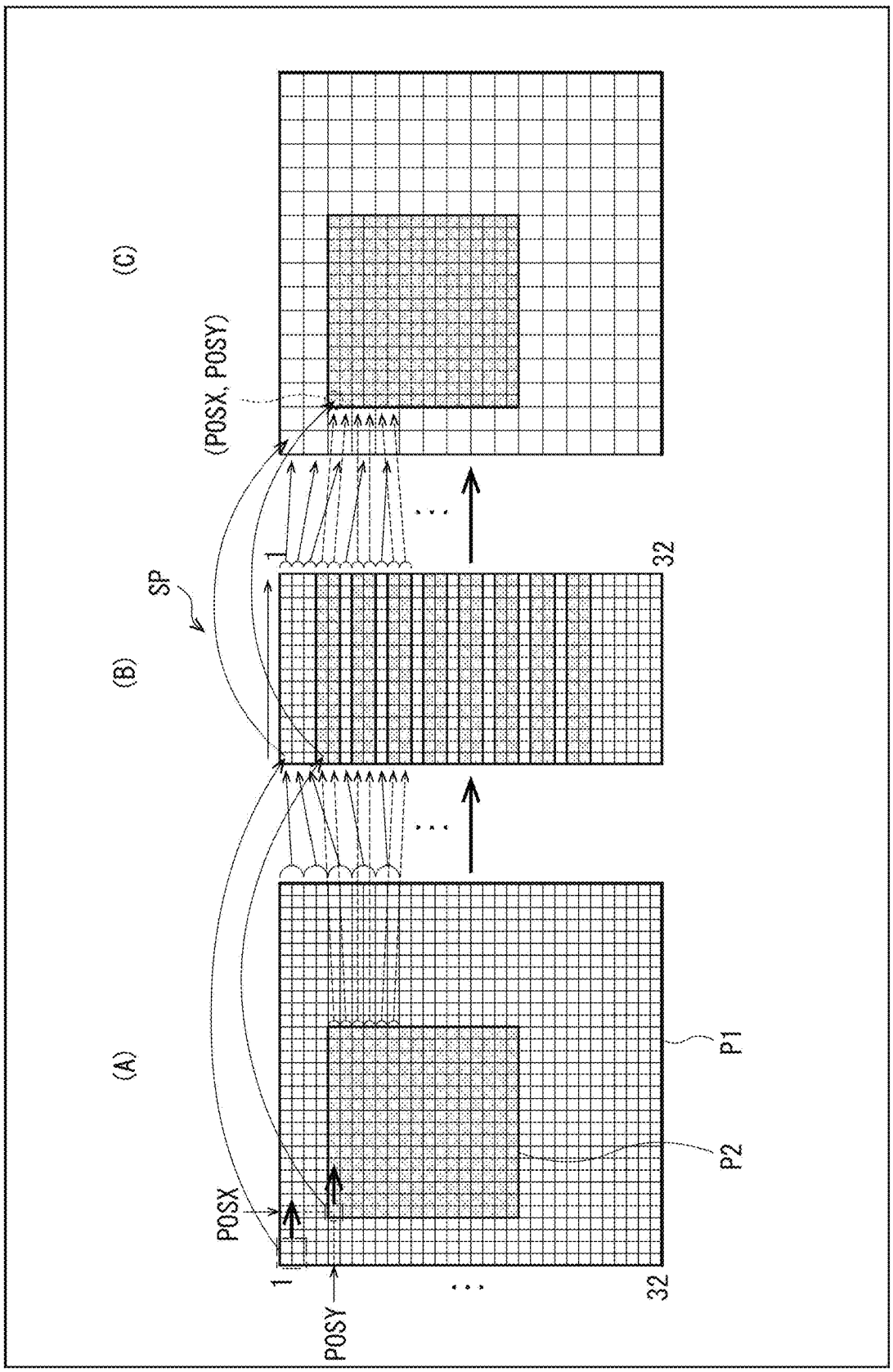
FIG. 3 is an explanatory diagram illustrating an operation example of the display system illustrated in FIG. 1.

FIG. 3 illustrates an operation example of the display system 1, where (A) indicates an image generated by the image generation circuit 11, (B) indicates pieces of image data included in the image signal SP, and (C) indicates a display driving operation in the head-mounted display 20. In FIG. 3, a shaded portion indicates a portion related to the partial image P2. In (A) of FIG. 3, the position of an upper left pixel of the partial image P2 in the entire image P1 is the fifth from the left (POSX=5) and the fifth from the top (POSY=5) in this example.

As illustrated in (A) and (B) of FIG. 3, the transmission signal generation circuit 18 performs left-to-right scanning from top to bottom sequentially on the entire image P1 generated by the image generation circuit 11 to thereby generate the image signal SP. The transmission signal generation circuit 18 converts four pixel values disposed in two rows and two columns in the entire image P1 into one pixel value, and outputs one pixel value as it is in a portion overlapping the partial image P2 of the entire image P1, thereby generating pieces of image data in the image signal SP.

Specifically, in this example, the transmission signal generation circuit 18 converts four pixel values disposed in two rows and two columns into one pixel value on the basis of 64 pixel values included in a first row and a second row of the entire image P1 to thereby generate sixteen pixel values related to the entire image P1. Thus, the transmission signal generation circuit 18 generates a piece of image data in a first row in the image signal SP.

The transmission signal generation circuit 18 converts four pixel values disposed in two rows and two columns into one pixel value on the basis of 64 pixel values included in a third row and a fourth row of the entire image P1 to thereby generate sixteen pixel values related to the entire image P1. Thus, the transmission signal generation circuit 18 generates a piece of image data in a second row in the image signal SP.

The transmission signal generation circuit 18 converts four pixel values disposed in two rows and two columns into one pixel value on the basis of 64 pixel values included in a fifth row and a sixth row of the entire image P1 to thereby generate sixteen pixel values related to the entire image P1. Thus, the transmission signal generation circuit 18 generates a piece of image data in a third row in the image signal SP.

The transmission signal generation circuit 18 outputs sixteen pixel values related to the partial image P2 of 32 pixel values included in the fifth row of the entire image P1 as they are, and outputs sixteen pixel values related to the partial image P2 of 32 pixel values included in the sixth row of the entire image P1 as they are. Thus, the transmission signal generation circuit 18 generates pieces of image data in fourth and fifth rows in the image signal SP.

As described above, the transmission signal generation circuit 18 converts four pixel values disposed in two rows and two columns in the entire image P1 into one pixel value, and outputs pixel values as they are in the portion overlapping the partial image P2 of the entire image P1. Accordingly, the transmission signal generation circuit 18 converts the entire image P1 into the entire image P1 having a lower resolution. Meanwhile, the resolution of the partial image P2 is not changed. As a result, the resolution of the converted entire image P1 becomes lower than the resolution of the partial image P2. The transmission signal generation circuit 18 converts four pixel values disposed in two rows and two columns in an entire image of the entire image P1 into one pixel value; therefore, the converted entire image P1 includes an image corresponding to the partial image P2. In addition, in the example in FIG. 3, the transmission signal generation circuit 18 performs processing sequentially from top to bottom to thereby generate the image signal SP; therefore, for example, in the image signal SP, a portion is generated in which pixel values in one line image included in the entire image P1 and pixel values in two line images included in the partial image P2 are alternately disposed in the longitudinal direction.

Thus, the transmission signal generation circuit 18 generates pieces of image data including a plurality of pixel values as illustrated in (B) of FIG. 3, on the basis of the image generated by the image generation circuit 11. Thereafter, the transmission signal generation circuit 18 generates the image pixel SP including the pieces of image data and a piece of image position data representing the position (parameters POSX and POSY) of the partial image P2 in the entire image P1.

The transmission circuit 12 (FIG. 1) is configured to transmit the image signal SP supplied from the image generation circuit 11 to the head-mounted display 20. The transmission circuit 12 is configured to transmit the piece of image position data with use of a data format of the piece of image data, for example, in a blanking period in which the piece of image data is not transmitted of a vertical period V. In addition, the transmission circuit 12 may transmit the piece of image position data as a piece of control data, for example, in the blanking period. In addition, the transmission circuit 12 may transmit the piece of image position data with use of a general interface such as an I2C or a SPI (Serial Peripheral Interface) different from an interface for transmitting the piece of image data.

Figure 4:
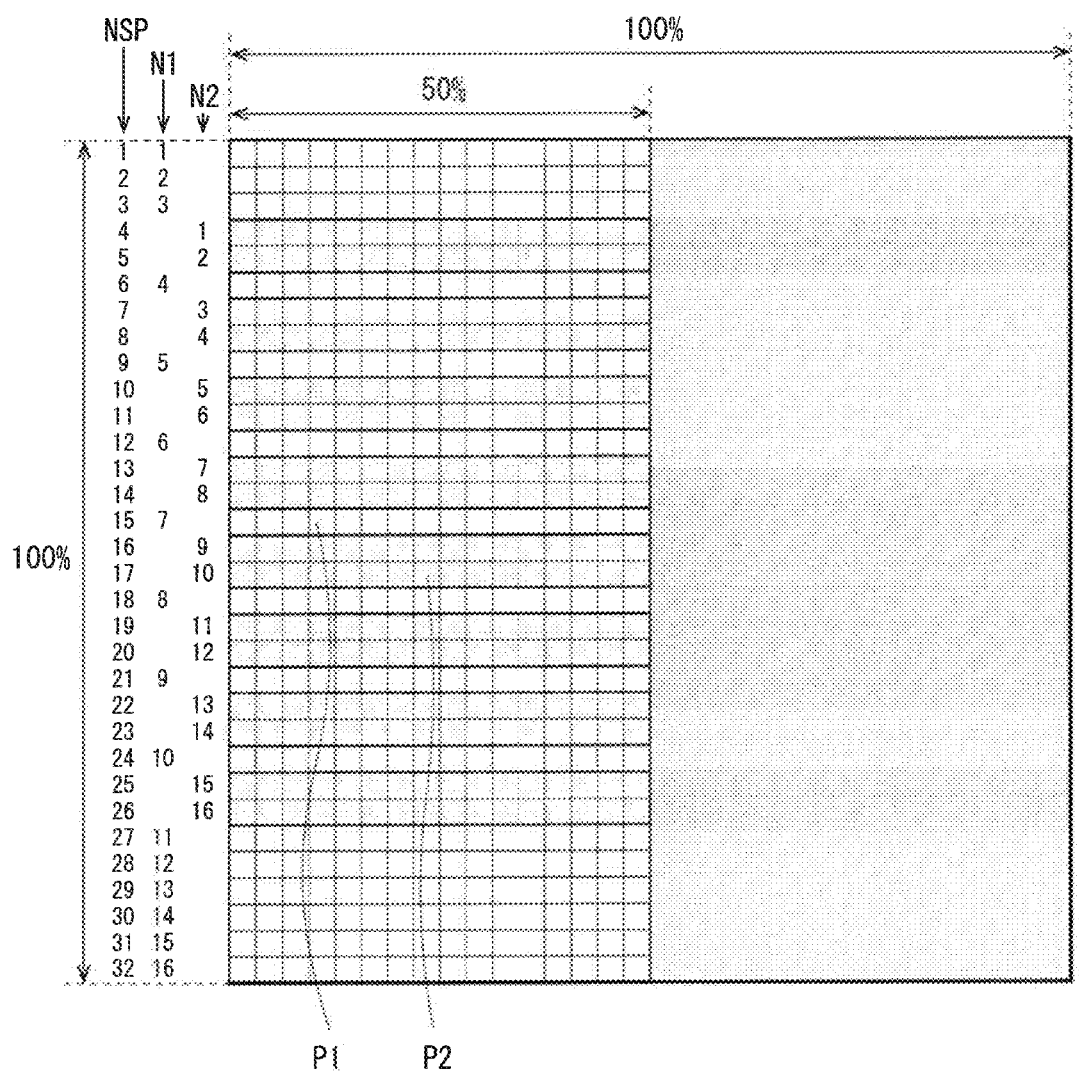
FIG. 4 is an explanatory diagram illustrating a transmission band of the display system illustrated in FIG. 1.

FIG. 4 illustrates a transmission band in the display system 1. In FIG. 4, an unshaded portion indicates a piece of image data related to the entire image P1, and a shaded portion indicates a piece of image data related to the partial image P2. The pieces of image data included in the image signal SP in this example include pieces of image data for 32 rows. For explanatory convenience, each of the pieces of image data for 32 rows is attached with a data number NSP. A piece of image data in each row is a piece of image data related to the entire image P1 or a piece of image data related to the partial image P2. For explanatory convenience, each of pieces of image data for sixteen rows related to the entire image P1 is attached with a data number N1, and each of pieces of image data for sixteen rows related to the partial image P2 is attached with a data number N2.

The number of pixel values in the pieces of image data included in the image signal SP is a half of the number of pixel values included in the entire image P1. Thus, it is possible for the display system 1 to reduce an image data amount to a half, as compared with a case where the entire image P1 before conversion is transmitted as it is.

The reception circuit 13 (FIG. 1) is configured to receive a detection signal SD transmitted from the head-mounted display 20. The reception circuit 13 then supplies, to the image generation circuit 11, a piece of data about the result of detection by the acceleration sensor 22 and the result of detection by the eye-tracking sensor 23. The piece of data is included in this detection signal SD.

(Head-Mounted Display 20)

The head-mounted display 20 includes a reception circuit 21, the acceleration sensor 22, the eye-tracking sensor 23, a processor 24, a transmission circuit 25, a display controller 26, and a display panel 27.

The reception circuit 21 is configured to receive the image signal SP transmitted from the image generation device 10. The reception circuit 21 then supplies, to the processor 24, the pieces of image data and the piece of image position data included in the image signal SP.

The acceleration sensor 22 is configured to detect a motion such as the direction of the head-mounted display 20. It is possible for the acceleration sensor 22 to use, for example, a 6-axis inertial sensor. Accordingly, in the display system 1, it is possible to generate the entire image P1 corresponding to the direction of the head-mounted display 20 in the virtual space.

The eye-tracking sensor 23 is configured to detect the direction of the eye of the user wearing the head-mounted display 20. Accordingly, in the display system 1, it is possible to detect which portion of the display image the user is looking at, and it is possible to specify the partial image P2 including the portion at which the user is looking of the entire image P1.

The processor 24 is configured to control an operation of the head-mounted display 20, and includes, for example, a CPU (Central Processing Unit), a GPU (Graphics Processing Unit), and the like. Specifically, the processor 24 performs, for example, predetermined image processing on the basis of the pieces of image data supplied from the reception circuit 21, and supplies, to the display controller 26, the pieces of image data having been subjected to the image processing together with the piece of image position data. In addition, the processor 24 supplies the result of detection by the acceleration sensor 22 and the result of detection by the eye-tracking sensor 23 to the transmission circuit 25, and causes the transmission circuit 25 to transmit these results of detection.

The transmission circuit 25 is configured to transmit, to the image generation device 10, the detection signal SD including the result of detection by the acceleration sensor 22 and the result of detection by the eye-tracking sensor 23 that are supplied from the processor 24.

The display controller 26 is configured to control an operation of the display panel 27 on the basis of the pieces of image data and the piece of image position data that are supplied from the processor 24.

The display panel 27 is configured to display an image on the basis of control by the display controller 26. The display panel 27 is an organic EL (Electro Luminescence) display panel in this example. It is to be noted that the display panel 27 is not limited thereto, and may be, for example, a liquid crystal display panel.

Figure 5:
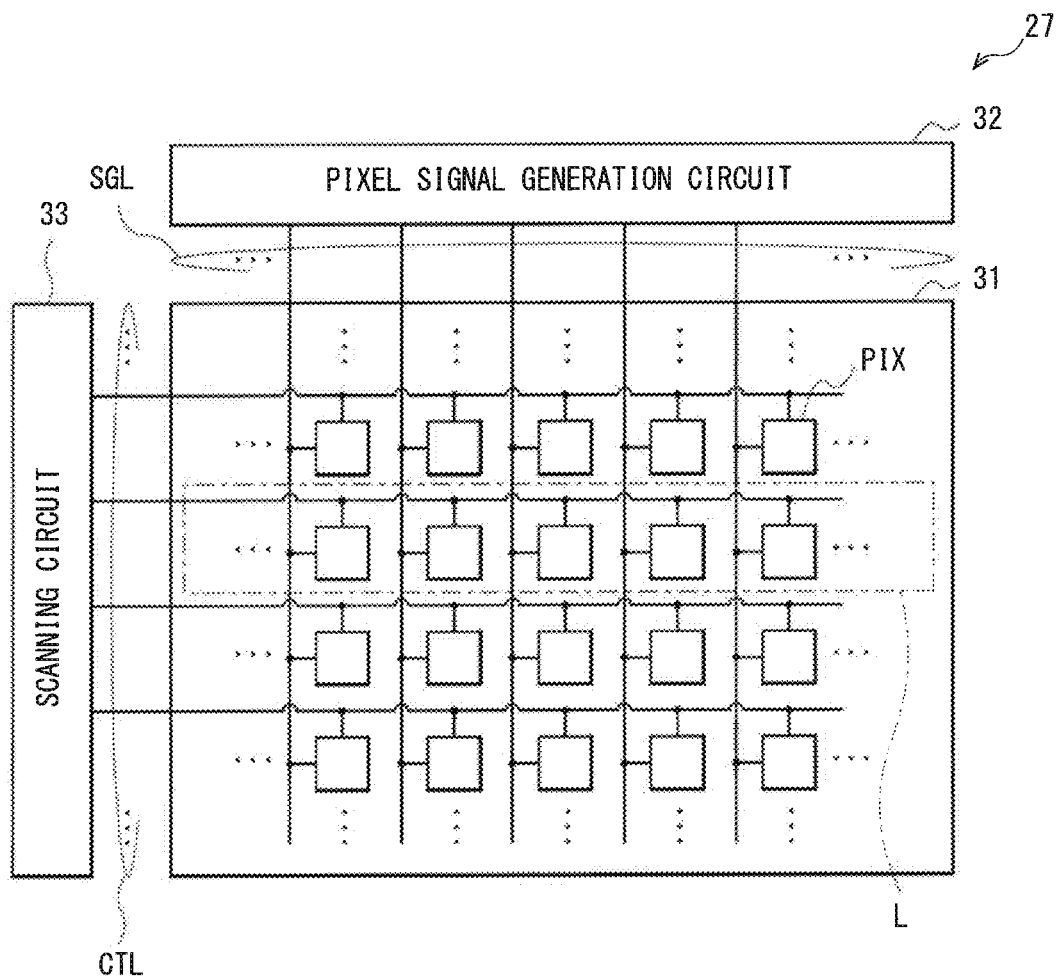
FIG. 5 is a block diagram illustrating a configuration example of a display panel illustrated in FIG. 1.

FIG. 5 illustrates a configuration example of the display panel 27. The display panel 27 includes a pixel array 31, a pixel signal generation circuit 32, and a scanning circuit 33.

The pixel array 31 includes a plurality of signal lines SGL, a plurality of control lines CTL, and a plurality of pixels PIX.

The plurality of signal lines SGL extends in the vertical direction (the longitudinal direction in FIG. 5) and is provided side by side in the horizontal direction (the lateral direction in FIG. 5). The plurality of signal lines SGL each supplies a pixel signal generated by the pixel signal generation circuit 32 to the pixels PIX.

The plurality of control lines CTL extends in the horizontal direction (the lateral direction in FIG. 5), and is provided side by side in the vertical direction (the longitudinal direction in FIG. 5). The plurality of control lines CTL each supplies a control signal generated by the scanning circuit 33 to the pixels PIX.

The plurality of pixels PIX is arranged in a matrix in the pixel array 31. Each of the plurality of pixels PIX is controlled on the basis of the control signal supplied through the control line CTL, and the pixel signal supplied through the pixel signal line SGL is written to each of the plurality of the pixels PIX. Accordingly, each of the plurality of pixels PIX is configured to emit light with luminance corresponding to the written pixel signal. The pixels PIX for one row provided side by side in the horizontal direction configure a pixel line L.

The pixel signal generation circuit 32 is configured to generate the pixel signal on the basis of a piece of image data to be displayed, and apply the generated pixel signal to each of the plurality of signal lines SGL.

The scanning circuit 33 scans the plurality of pixels PIX in units of one or a plurality of pixel lines L as scanning units by generating the control signal and applying the generated control signal to each of the plurality of control lines CTL.

Herein, the reception circuit 21 corresponds to a specific example of a "reception circuit" in the present disclosure. The converted entire image P1 corresponds to a specific example of an "entire image" in the present disclosure. The partial image P2 corresponds to a specific example of a "partial image" in the present disclosure. The pixel array 31 corresponds to a specific example of a "display section" in the present disclosure. The display controller 26, the pixel signal generation circuit 32, and the scanning circuit 33 correspond to specific examples of a "display drive circuit" in the present disclosure. The eye-tracking sensor 23 corresponds to a specific example of a "sensor" in the present disclosure. The transmission circuit 25 corresponds to a specific example of a "transmission circuit" in the present disclosure.

[Operation and Workings]

Next, description is given of an operation and workings of the display system 1 according to the present embodiment.

First, description is given of an overview of an entire operation of the display system 1 with reference to FIG. 1. The reception circuit 13 of the image generation device 10 receives the detection signal SD transmitted from the head-mounted display 20, and supplies, to the image generation circuit 11, the piece of data about the result of detection by the acceleration sensor 22 and the result of detection by the eye-tracking sensor 23. The piece of data is included in this detection signal SD. The image generation circuit 11 generates the entire image P1 representing the scenery corresponding to the direction of the head-mounted display 20 in the virtual space on the basis of the result of detection by the acceleration sensor 22 included in the piece of data supplied from the reception circuit 13. In addition, the image generation circuit 11 specifies the partial image P2 including a portion at which the user is looking of the entire image P1 on the basis of the result of detection by the eye-tracking sensor 23 included in the piece of data supplied from the reception circuit 13. The transmission signal generation circuit 18 generates the image signal SP to be transmitted, on the basis of the image generated by the image generation circuit 11. The image signal SP includes the pieces of image data, and the piece of image position data representing the position of the partial image P2 in the entire image P1. The transmission circuit 12 transmits the image signal SP to the head-mounted display 20.

The reception circuit 21 of the head-mounted display 20 receives the image signal SP transmitted from the image generation device 10, and supplies, to the processor 24, the pieces of image data and the piece of image position data included in the image signal SP. The processor 24 performs predetermined image processing on the basis of the pieces of image data supplied from the reception circuit 21, and supplies, to the display controller 26, the pieces of image data having been subjected to the image processing together with the piece of image position data. The display controller 26 controls the operation of the display panel 27 on the basis of the pieces of image data and the piece of image position data that are supplied from the processor 24. The display panel 27 displays an image on the basis of control by the display controller 26.

The acceleration sensor 22 detects a motion such as the direction of the head-mounted display 20. The eye-tracking sensor 23 detects the direction of the eye of the user wearing the head-mounted display 20. The processor 24 supplies the result of detection by the acceleration sensor 22 and the result of detection by the eye-tracking sensor 23 to the transmission circuit 25. The transmission circuit 25 transmits, to the image generation device 10, the detection signal SD including the result of detection by the acceleration sensor 22 and the result of detection by the eye-tracking sensor 23 that are supplied from the processor 24.

(Detailed Operation)

In the image generation device 10, the image generation circuit 11 generates the entire image P1 representing the scenery corresponding to the direction of the head-mounted display 20 in the virtual space on the basis of the result of detection by the acceleration sensor 22 included in the piece of data supplied from the reception circuit 13. In addition, the image generation circuit 11 specifies the partial image P2 including the portion at which the user is looking of the entire image P1 on the basis of the result of detection by the eye-tracking sensor 23 included in the piece of data supplied from the reception circuit 13.

The transmission signal generation circuit 18 generates the image signal SP to be transmitted, on the basis of the image generated by the image generation circuit 11. Specifically, the transmission signal generation circuit 18 converts four pixel values disposed in two rows and two columns in the entire image P1 into one pixel value. In addition, the transmission signal generation circuit 18 outputs a pixel value as it is in a portion overlapping the partial image P2 of the entire image P1. Thus, the transmission signal generation circuit 18 generates pieces of image data including a plurality of pixel values as illustrated in (B) of FIG. 3 on the basis of the image generated by the image generation circuit 11. The transmission signal generation circuit 18 then generates the image signal SP including the pieces of image data and the piece of image position data representing the position (parameters POSX and POSY) of the partial image P2 in the entire image P1.

Thereafter, the transmission circuit 12 transmits the image signal SP supplied from the image generation circuit 11 to the head-mounted display 20.

In the head-mounted display 20, the reception circuit 21 receives the image signal SP transmitted from the image generation device 10, and supplies, to the processor 24, the pieces of image data and the piece of image position data that are included in the image signal SP. The processor 24 performs predetermined image processing on the basis of the pieces of image data supplied from the reception circuit 21, and supplies, to the display controller 26, the pieces of image data having been subjected to the image processing together with the piece of image position data.

Figure 6:
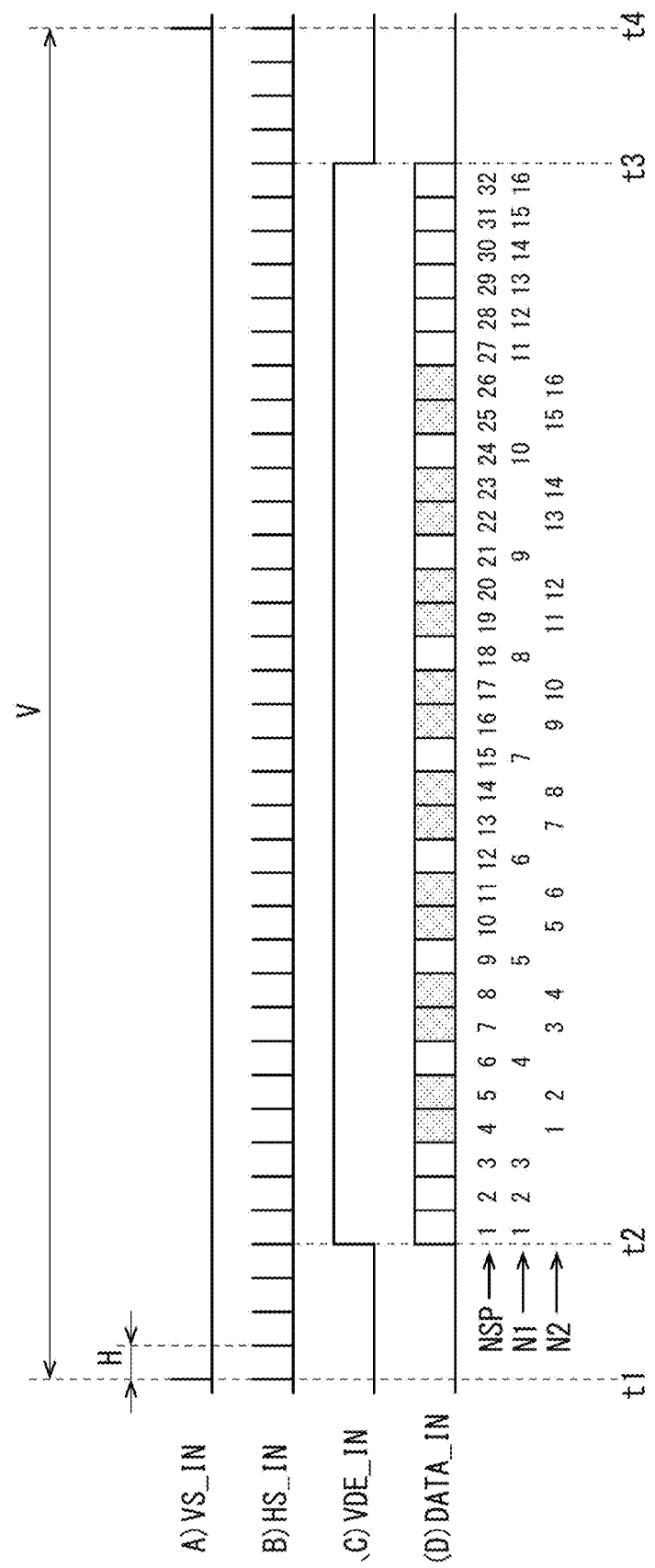
FIG. 6 is a timing chart illustrating an example of input signals of a display controller illustrated in FIG. 1.

FIG. 6 illustrates an example of signals to be inputted to the display controller 26, where (A) indicates a waveform of a vertical synchronization signal VS_IN, (B) indicates a waveform of a horizontal synchronization signal HS_IN, (C) indicates a waveform of a vertical data enable signal VDE_IN, and (D) indicates a data signal DATA_IN. In (D) of FIG. 6, an unshaded portion indicates a piece of image data related to the entire image P1, and a shaded portion indicates a piece of image data related to the partial image P2.

At a timing t1, a pulse of the vertical synchronization signal VS_IN is generated, and the vertical period V starts ((A) of FIG. 6). In addition, a pulse of the horizontal synchronization signal HS_IN is generated every time the horizontal period H starts ((B) of FIG. 6).

Thereafter, at a timing t2, the vertical data enable signal VDE_IN changes from a low level to a high level ((C) of FIG. 6). The data signal DATA_IN in a period in which the vertical data enable signal VDE_IN is in the high level represents a piece of image data ((D) of FIG. 6). In this example, the data signal DATA_IN is supplied over 32 horizontal periods H. The data signal DATA_IN includes 32 pieces of image data corresponding to 32 horizontal periods H. The 32 pieces of image data each correspond to a corresponding one of pieces of image data (with the data number NSP=1 to 32) for 32 rows included in the image signal SP illustrated in FIG. 4. FIG. 6 also illustrates the data numbers N1 and N2 in addition to the data number NSP.

Figure 7:
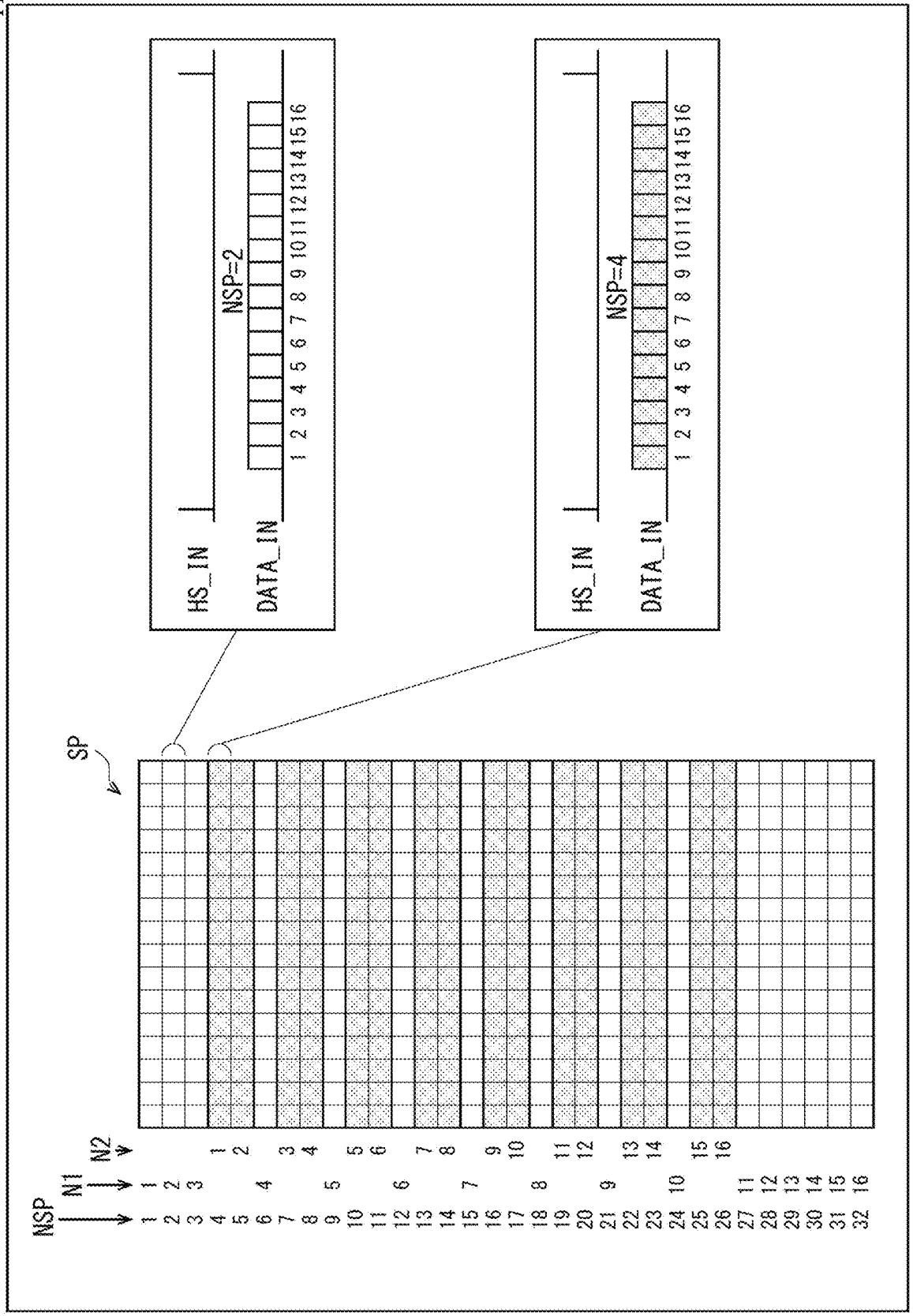
FIG. 7 is another timing chart illustrating an example of input signals of the display controller illustrated in FIG. 1.

FIG. 7 illustrates an example of the data signal DATA_IN. For example, the piece of image data in the second row included in the image signal SP corresponds to a second piece of image data of the 32 pieces of image data included in the data signal DATA_IN. This piece of image data includes sixteen pixel values related to the entire image P1. In addition, for example, the piece of image data in the fourth row included in the image signal SP corresponds to a fourth piece of image data of the 32 pieces of image data included in the data signal DATA_IN. This piece of image data includes sixteen pixel values related to the partial image P2.

Thereafter, at a timing t3, the vertical data enable signal VDE_IN changes from the high level to the low level ((C) of FIG. 6). Thereafter, at a timing t4, this vertical period V ends, and the next vertical period V starts.

The display controller 26 performs predetermined processing on the basis of such pieces of image data supplied from the processor 24 to thereby generate a vertical synchronization signal VS_OUT, a horizontal synchronization signal HS_OUT, a vertical data enable signal VDE_OUT, and a data signal DATA_OUT.

Figure 8:
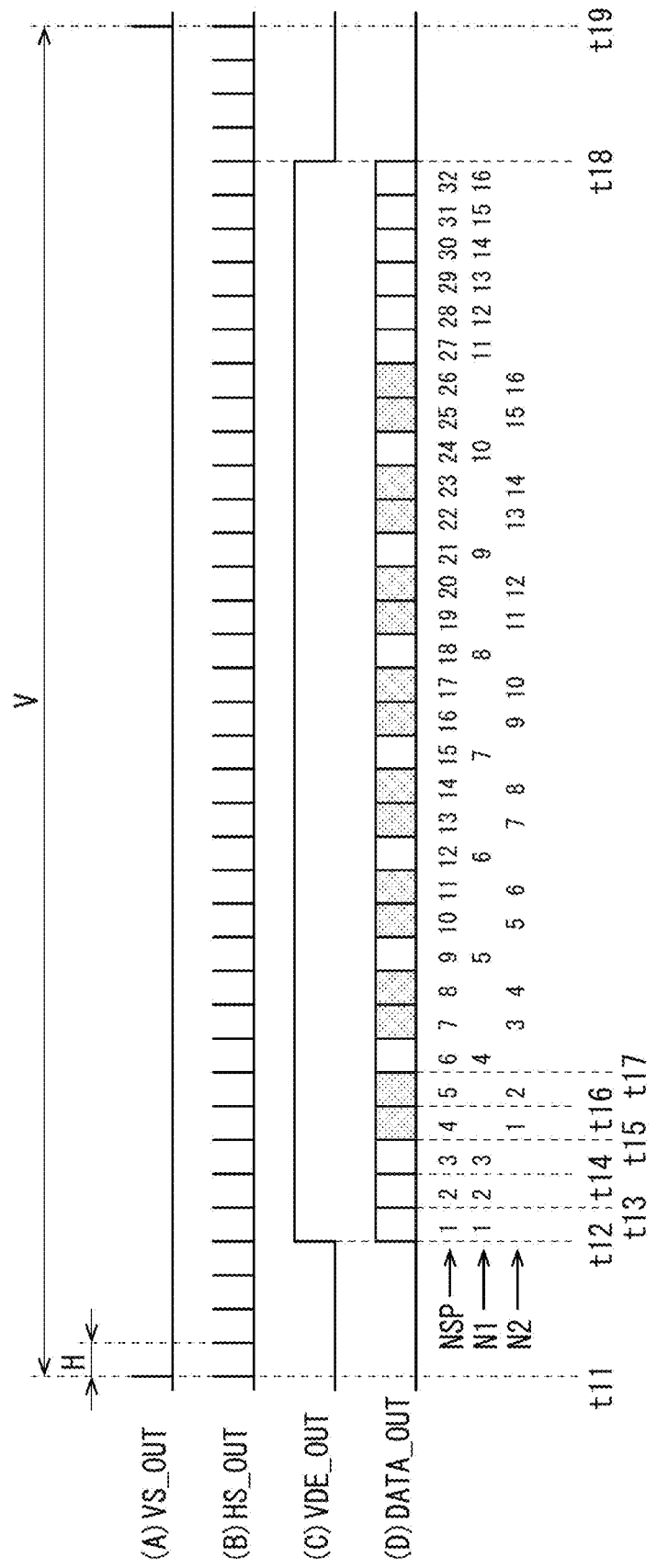
FIG. 8 is a timing chart illustrating an example of output signals of the display controller illustrated in FIG. 1.

FIG. 8 illustrates an example of signals to be outputted from the display controller 26, where (A) indicates a waveform of the vertical synchronization signal VS_OUT, (B) indicates a waveform of the horizontal synchronization signal HS_OUT, (C) indicates a waveform of the vertical data enable signal VDE_OUT, and (D) indicates the data signal DATA_OUT. In (D) of FIG. 8, an unshaded portion indicates a piece of image data related to the entire image P1, and a shaded portion indicates a piece of image data related to the partial image P2.

As with a case in FIG. 6, at a timing t11, a pulse of the vertical synchronization signal VS_OUT is generated, and the vertical period V starts ((A) of FIG. 8). In addition, a pulse of the horizontal synchronization signal HS_OUT is generated every time the horizontal period H starts ((B) of FIG. 8).

Thereafter, at a timing 112, the vertical data enable signal VDE_OUT changes from the low level to the high level ((C) of FIG. 8). In this example, the display controller 26 outputs 32 pieces of image data as the data signal DATA_OUT over 32 horizontal periods H ((D) of FIG. 8). The 32 pieces of image data each correspond to a corresponding one of the 32 pieces of image data in the data signal DATA_IN ((D) of FIG. 6). In other words, the 32 pieces of image data each correspond to a corresponding one of the pieces of image data in 32 rows included in the image signal SP illustrated in (B) of FIG. 3 and FIG. 4.

The display controller 26 performs control to drive the plurality of pixels PIX in the display panel 27 in units of four pixels PIX disposed in two rows and two columns on the basis of the pieces of image data related to the entire image P1 included in the data signal DATA_OUT. In addition, the display controller 26 performs control to drive the plurality of pixels PIX in the display panel 27 in units of one pixel PIX on the basis of pieces of data related to the partial image P2 included in the data signal DATA_OUT.

Figure 9:
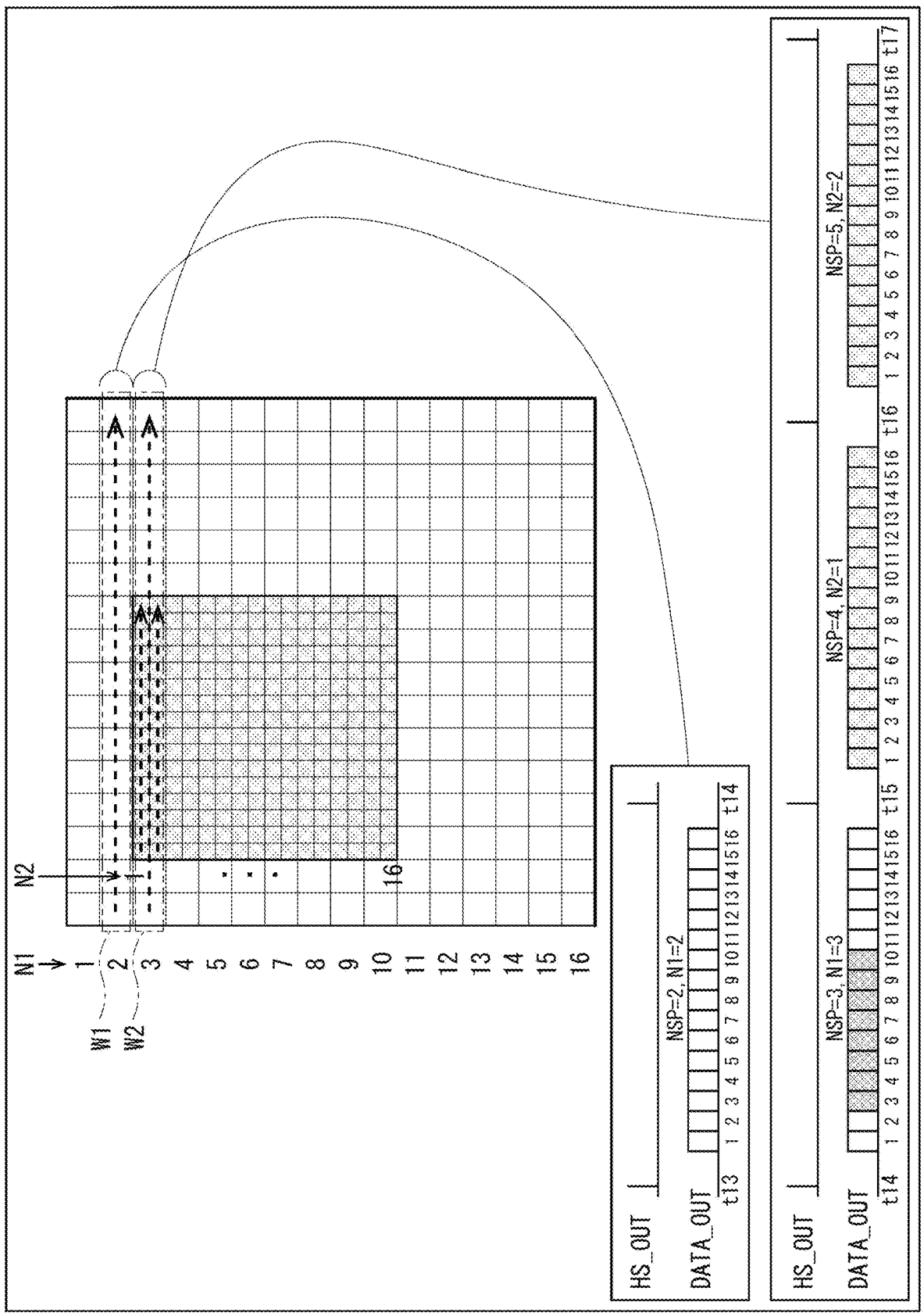
FIG. 9 is another timing chart illustrating an example of output signals of the display controller illustrated in FIG. 1.

FIG. 9 illustrates an example of the data signal DATA_OUT from a timing t13 to a timing t17 in FIG. 8 and a display driving operation based on the data signal DATA_OUT. FIGS. 10 and 11 each illustrate an example of an operation of the display panel 27.

The display panel 27 performs a display driving operation on two pixel lines L indicated by a sign W1 in FIG. 9 in a period from the timing t13 to a timing t14.

In this period from the timing t13 to the timing t14, as illustrated in FIG. 9, the display controller 26 outputs, as the data signal DATA_OUT, a piece of image data including sixteen pixel values related to the entire image P1. The data number NSP of this piece of image data is "2", and the data number N1 thereof is "2". The display controller 26 performs control to drive two pixel lines L corresponding to the data number N1=2 in units of four pixels PIX on the basis of this piece of image data, as illustrated in FIG. 10.

In this case, as illustrated in FIG. 10, the scanning circuit 33 scans the plurality of pixels PIX in scanning units US of two pixel lines L. In addition, the pixel signal generation circuit 32 applies the same pixel signal to two signal lines SGL adjacent to each other. Accordingly, the same pixel signal is written to four pixels PIX in selected two pixel lines L. Thus, the display panel 27 drives the plurality of pixels PIX in units UD of four pixels PIX.

Thus, the pixel signal generation circuit 32 writes a pixel signal related to the entire image P1 to two pixel lines L indicated by the sign W1 in FIG. 9.

Next, the display panel 27 performs the display driving operation on two pixel lines L indicated by a sign W2 in FIG. 9 in a period from the timing t14 to the timing t17.

First, in a period from the timing t14 to a timing t15, as illustrated in FIG. 9, the display controller 26 outputs, as the data signal DATA_OUT, a piece of image data including sixteen pixel values related to the entire image P1. The data number NSP of this piece of image data is "3", the data number N1 thereof is "3". The display controller 26 performs control to drive two pixel lines L corresponding to the data number N1=3 in units of four pixels PIX on the basis of this piece of image data, as illustrated in FIG. 10.

In this example, as illustrated in FIG. 9, the display controller 26 sets third to tenth pixel values of the sixteen pixel values to a pixel value representing black. The display panel 27 performs control not to write the pixel signal to the pixels PIX corresponding to the third to tenth pixel values. It is to be noted that this is not limitative, and the display controller 26 may write the pixel signal to the pixels PIX corresponding to the third to tenth pixel values on the basis of a pixel value having a value of 0. In addition, in this example, the display controller 26 sets the third to tenth pixel values of the sixteen pixel values to the pixel value representing black, but this is not limitative. The third to tenth pixel values may not be set to the pixel value representing black and may be maintained at their original pixel values.

FIG. 12 illustrates an example of the display driving operation on two pixel lines L indicated by the sign W2 in FIG. 9, where (A) indicates an operation from the timing t14 to the timing t15, (B) indicates an operation from the timing t15 to a timing t16, and (C) indicates an operation from the timings t16 to the timing t17. As illustrated in (A) of FIG. 12, from the timing t14 to the timing t15, the pixel signal generation circuit 32 writes the pixel signals corresponding to first, second, and eleventh to sixteenth pixel values to the pixels PIX corresponding to these pixel values. In addition, the pixel signal generation circuit 32 does not write the pixel value to the pixels PIX other than these pixels PIX.

In the next period from the timing t15 to the timing t16, as illustrated in FIG. 9, the display controller 26 outputs, as the data signal DATA_OUT, a piece of image data including sixteen pixel values related to the partial image P2. The data number NSP of this piece of image data is "4", and the data number N2 thereof is "1". The display controller 26 knows that this piece of image data includes the pixel values related to the partial image P2, on the basis of the piece of image position data. Thereafter, the display controller 26 performs control to drive one pixel line L corresponding to the data number N2=1 in units of one pixel PIX on the basis of this piece of image data, as illustrated in FIG. 11.

In this case, as illustrated in FIG. 11, the scanning circuit 33 scans the plurality of pixels PIX in scanning units US of one pixel line L. In addition, the pixel signal generation circuit 32 applies each of a plurality of pixel signals to a corresponding one of the plurality of signal lines SGL. Accordingly, one pixel signal is written to one pixel PIX in selected one pixel line. Thus, the display panel 27 drives the plurality of pixel PIX in units UD of one pixel PIX.

As illustrated in (B) of FIG. 12, from the timing t15 to the timing t16, the pixel signal generation circuit 32 writes the pixel signals corresponding to sixteen pixel values to the pixels PIX corresponding to these pixel values. In addition, the pixel signal generation circuit 32 does not write the pixel value to the pixels PIX other than these pixels PIX.

In the next period from the timing t16 to the timing t17, as illustrated in FIG. 9, the display controller 26 outputs, as the data signal DATA_OUT, a piece of image data including sixteen pixel values related to the partial image P2. The data number NSP of this piece of image data is "5", and the data number N2 thereof is "2". The display controller 26 knows that this piece of image data includes the pixel values related to the partial image P2, on the basis of the piece of image position data. Thereafter, the display controller 26 performs control to drive one pixel line L corresponding to the data number N2=2 in units of one pixel PIX on the basis of this piece of image data, as illustrated in FIG. 11.

As illustrated in (C) of FIG. 12, from the timing t16 to the timing t17, the pixel signal generation circuit 32 writes the pixel signals corresponding to sixteen pixel values to the pixels PIX corresponding to these pixel signals. In addition, the pixel signal generation circuit 32 does not write the pixel value to the pixels PIX other than these pixels PIX.

Thus, as illustrated in (A) to (C) of FIG. 12, the pixel signal generation circuit 32 writes the pixel signals related to the entire image P1 or the pixel signals related to the partial image P2 to all the pixels PIX in two pixel lines L indicated by the sign W2 in FIG. 9 in the period from the timing t14 to the timing t17.

As illustrated in FIG. 8, even after this, the display controller 26 and the display panel 27 operate similarly. Thereafter, at a timing t18, the vertical data enable signal VDE_OUT changes from the high level to the low level ((C) of FIG. 8). Thereafter, at a timing t19, this vertical period V ends, and the next vertical period V starts.

FIG. 13 illustrates an operation example of the display panel 27. In this example, a frame rate is 120 Hz. In this case, a cycle T is 8.3 [msec.] (=1/120 [Hz]).

The scanning circuit 33 performs scanning in scanning units of one pixel line L or two pixel lines L from a top to a bottom of the pixel array 31 in this example. In this example, in a period from a timing t21 to a timing t22 and a period from a timing t24 to a timing t25, scanning speed is fast, and in a period from the timing t22 to the timing t24, the scanning speed is slow. In other words, in the period from the timing t22 to the timing t24, the scanning circuit 33 scans a plurality of pixel lines L corresponding to the position of the partial image P2. In this case, the pixel signal generation circuit 32 writes the pixel signals to a plurality of pixels PIX related to two pixel lines L in three horizontal periods as with an operation in the period from the timing t14 to the timing t17; therefore, the scanning speed is slow. In contrast, in the period from the timing t21 to the timing t22 and the period from the timing t24 to the timing t25, the pixel signal generation circuit 32 writes the pixel signals to a plurality of pixels PIX related to two pixel lines L in one horizontal period as with an operation in the period from the timing t13 to the timing t14; therefore, the scanning speed is fast. Thus, in the display panel 27, scanning is performed in scanning units of one pixel line L or two pixel lines L, which makes it possible to decrease an operation frequency and reduce power consumption, as compared with, for example, a case where scanning is performed in scanning units of one pixel line L.

Thereafter, as indicated by a shaded portion in FIG. 13, the pixel PIX to which the pixel signal is written emits light over a predetermined period after the pixel signal is written in this example. Thus, the display panel 27 displays an image.

Thus, the head-mounted display 20 displays an image on the basis of the entire image P1 and the partial image P2. A latency of the head-mounted display 20 is, for example, time Δt from the timing t21 at which inputting of the piece of image data starts until the pixel PIX at a middle position in an up/down direction of the display panel 27 starts emitting light. This time Δt in this example is about a half of time corresponding to the cycle T. Specifically, for example, in a case where the cycle T is 8.3 [msec.], it is possible to set the time Δt to about 4.1 [msec.].

FIG. 14 illustrates another operation example of the display panel 27. In this example, a light emission operation of the pixels PIX is different from the example in FIG. 13. In other words, in the example in FIG. 13, the display panel 27 emits light in accordance with a scanning timing; however, in this example, the pixels PIX in an entire region emit light at the same timing. The time Δt in this example is substantially the same as the time corresponding to the cycle T. Specifically, for example, in a case where the cycle T is 8.3 [msec.], it is possible to set the time Δt to about 8 [msec.].

In the display system 1, the eye-tracking sensor 23 of the head-mounted display 20 detects the direction of the eye of the user wearing the head-mounted display 20 to thereby detect which portion of a display image the user is looking at. The image generation device 10 specifies an image (the partial image P2) including a portion at which the user is looking of the entire image P1 on the basis of a result of detection by the eye-tracking sensor 23. Thereafter, the image generation device 10 generates the image signal SP including a piece of image data that has a low resolution and represents the entire image P1 and a piece of image data that has a high resolution and represents the partial image P2. Accordingly, in the pieces of image data included in the image signal SP, positions of the piece of image data related to the entire image P1 and the piece of image data related to the partial image P2 may change depending on the result of detection by the eye-tracking sensor 23.

Figure 15:
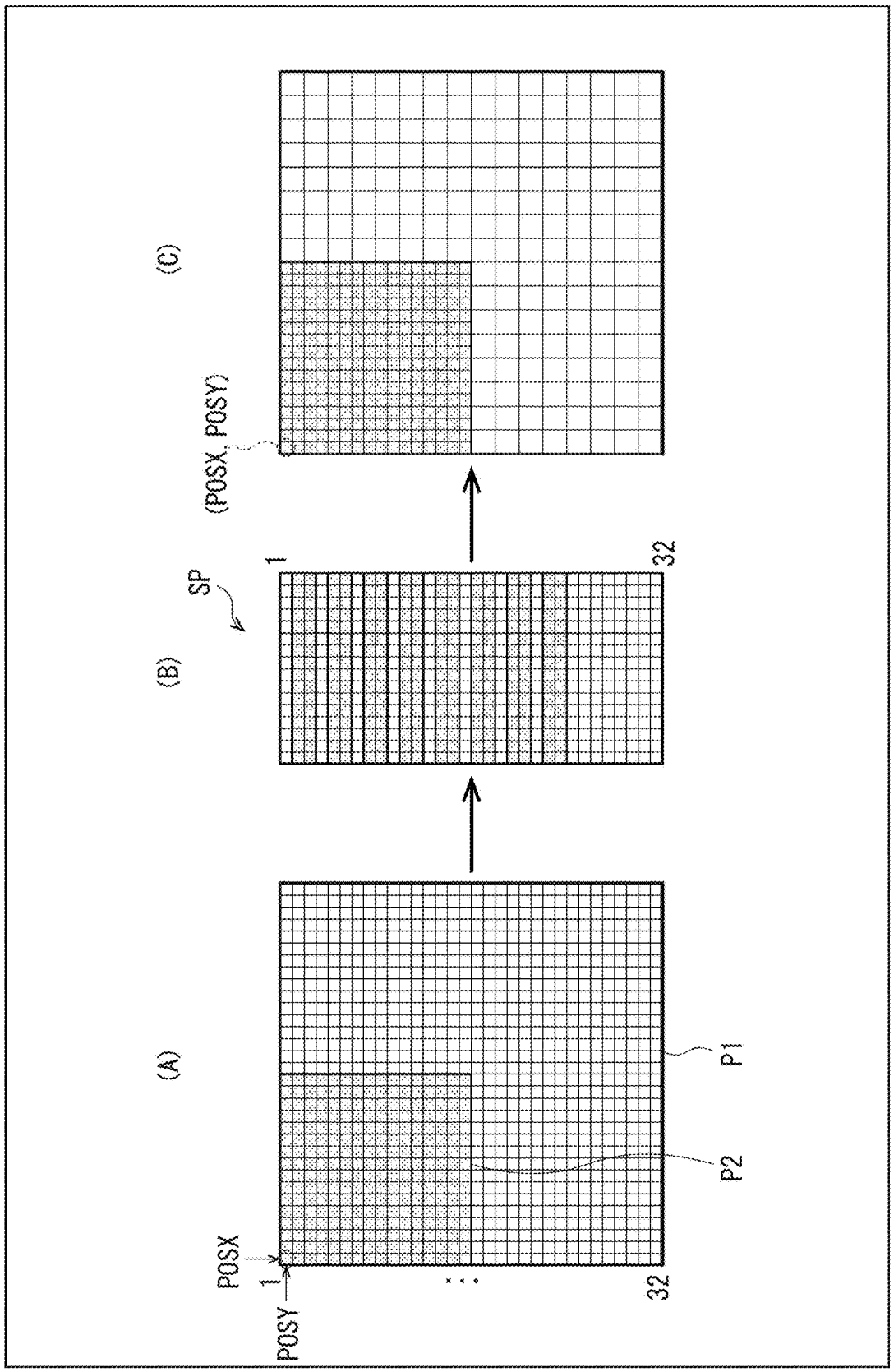
FIG. 15 is an explanatory diagram illustrating an operation example of the display system illustrated in FIG. 1.
Figure 16:
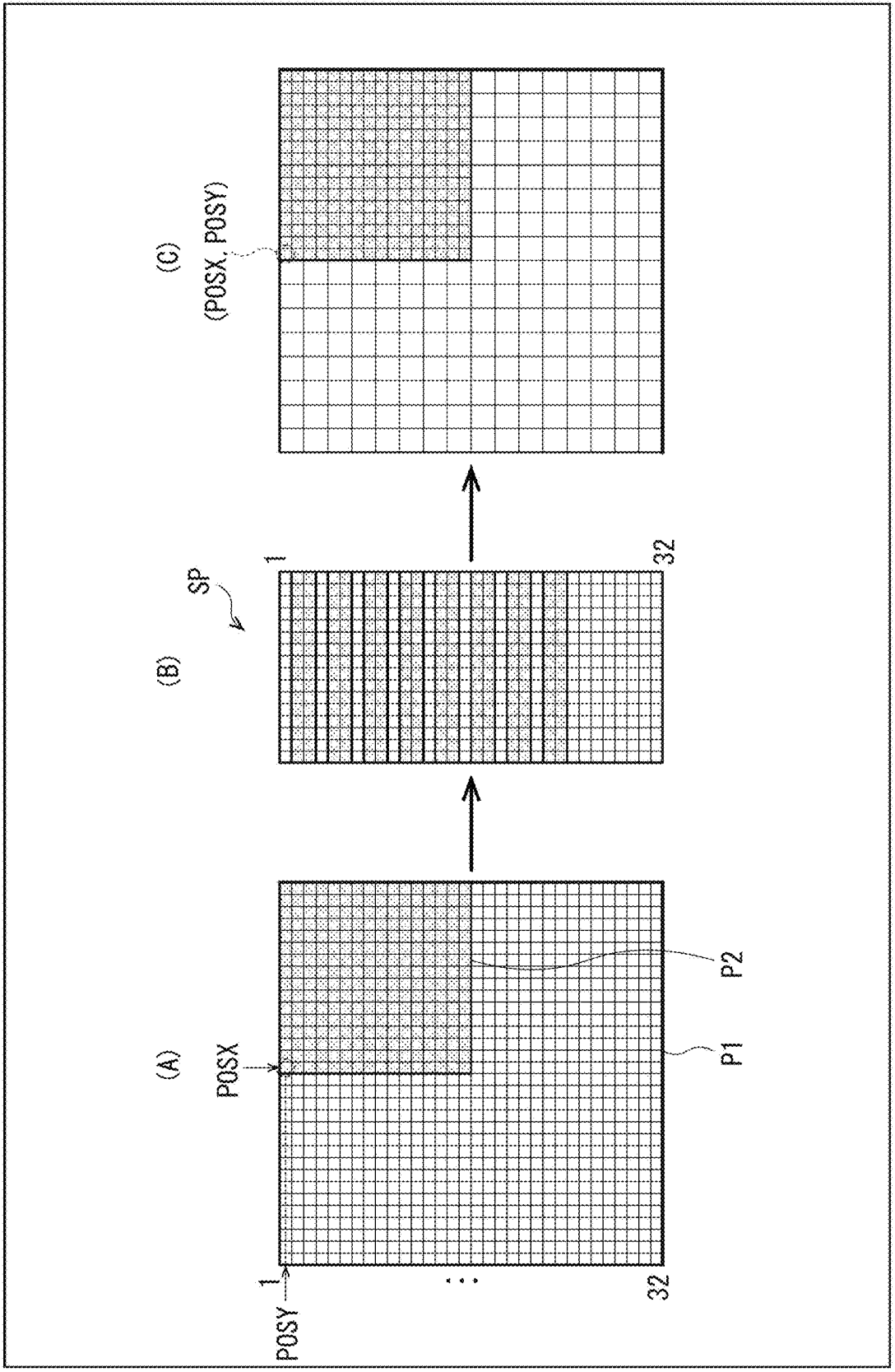
FIG. 16 is an explanatory diagram illustrating another operation example of the display system illustrated in FIG. 1.
Figure 17:
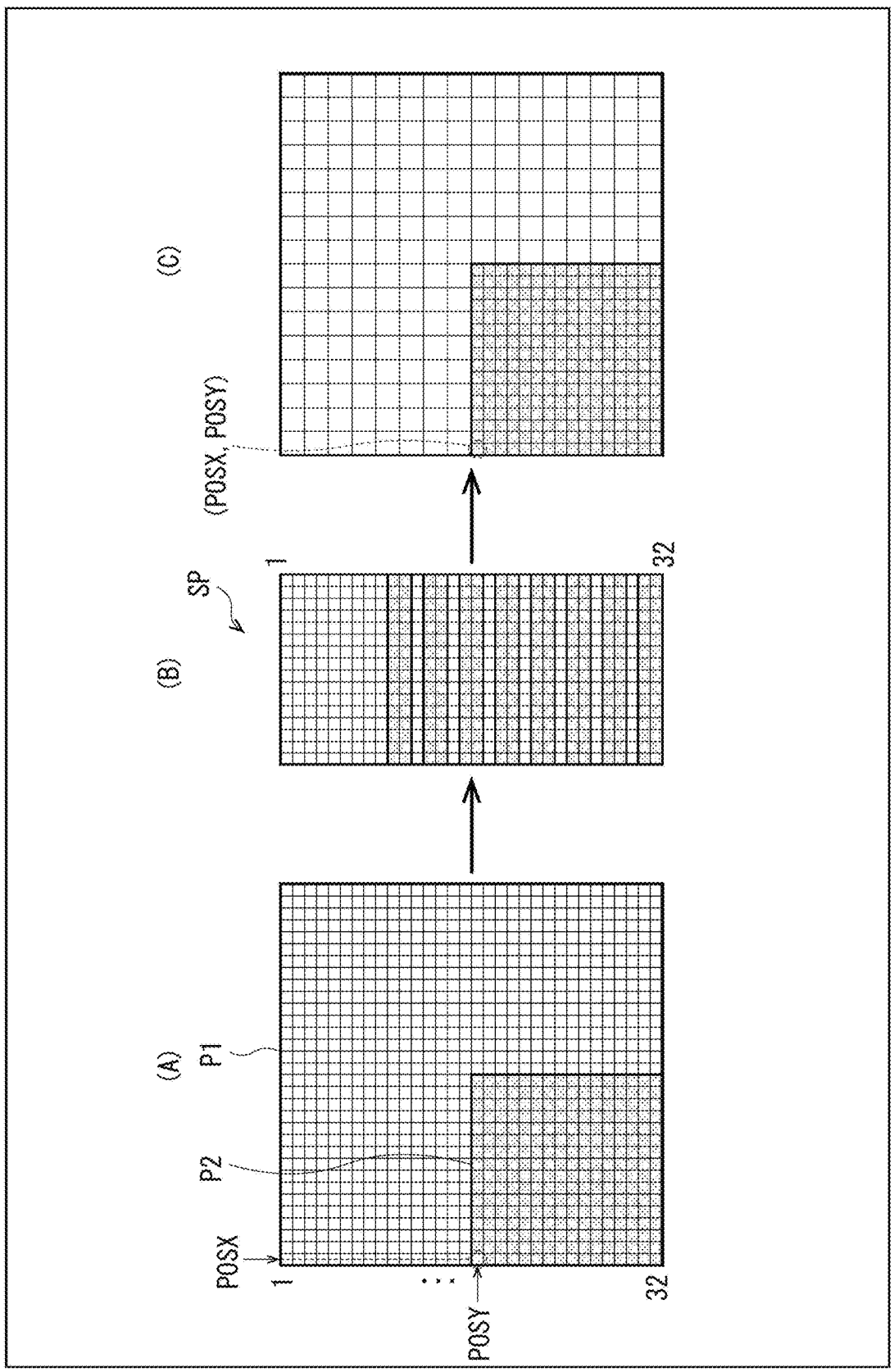
FIG. 17 is an explanatory diagram illustrating another operation example of the display system illustrated in FIG. 1.
Figure 18:
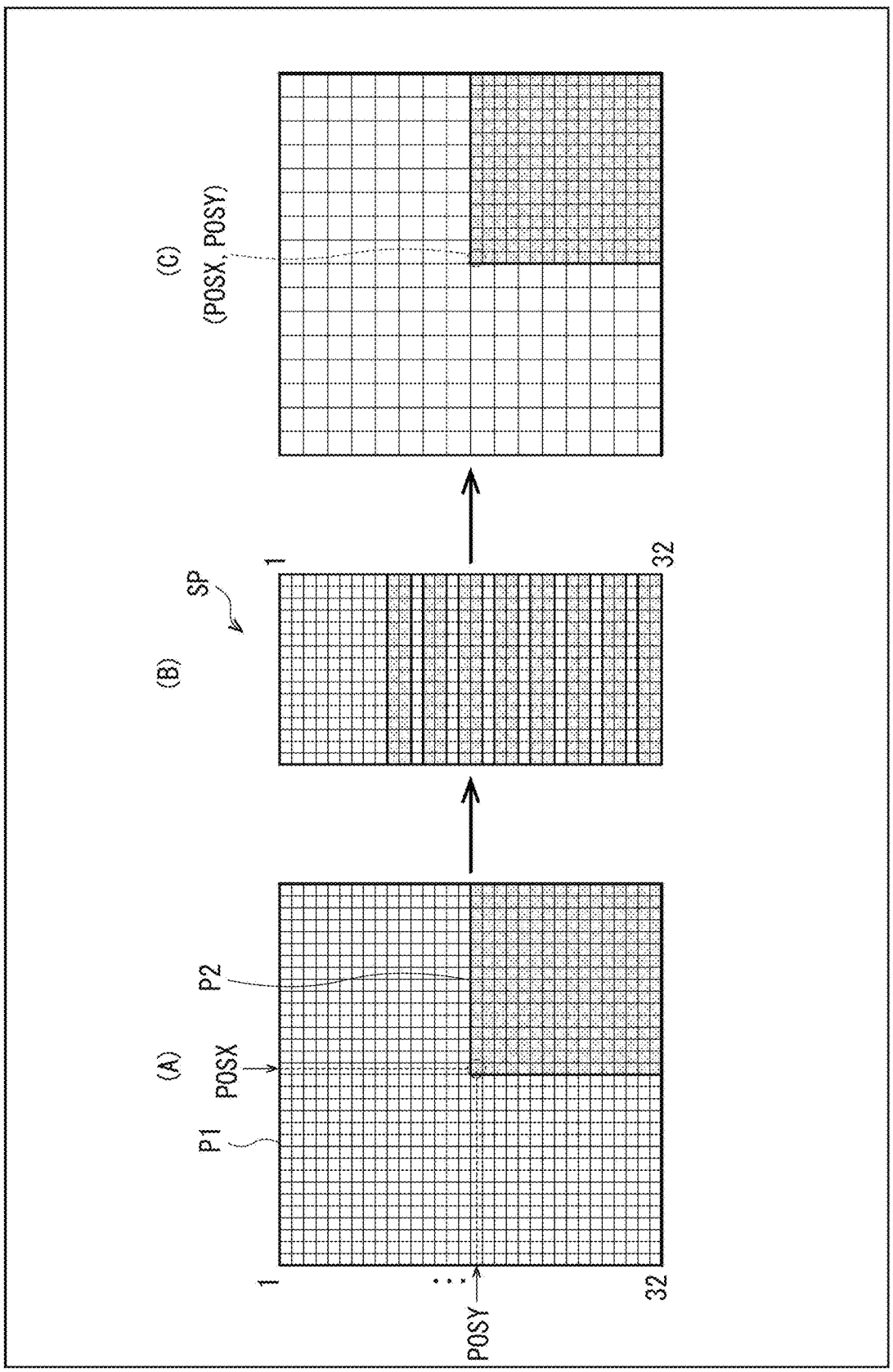
FIG. 18 is an explanatory diagram illustrating another operation example of the display system illustrated in FIG. 1.

FIGS. 15 to 18 each illustrate an operation of the display system 1. FIG. 15 illustrates a case where the user is looking at an upper left portion in a display image of the display panel 27. FIG. 16 illustrates a case where the user is looking at an upper right portion in the display image of the display panel 27. FIG. 17 illustrates a case where the user is looking at a lower left portion in the display image of the display panel 27. FIG. 18 illustrates a case where the user is looking at a lower right portion in the display image of the display panel 27.

For example, in a case where the user is looking at the upper left or the upper right in the display image of the display panel 27 (FIG. 15 or 16), in the pieces of image data in the image signal SP, the piece of image data related to the partial image P2 is located at an upper position as illustrated in (B) of FIG. 15 or (B) of FIG. 16. In contrast, for example, in a case where the user is looking at the lower left or the lower right in the display image of the display panel 27 (FIG. 17 or 18), in the pieces of image data in the image signal SP, the piece of image data related to the partial image P2 is located at a lower position as illustrated in (B) of FIG. 17 or (B) of FIG. 18. The positions of the piece of image data related to the entire image P1 and the piece of image data related to the partial image P2 in the pieces of image data included in the image signal SP may change depending on the result of detection by the eye-tracking sensor 23 in such a manner.

Thus, in the display system 1, the head-mounted display 20 receives a piece of first image data having a plurality of pixel values in one or a plurality of line images included in the entire image P1 having a first resolution, a piece of second image data having a plurality of pixel values in a plurality of line images included in the partial image P2 having a second resolution higher than the first resolution, and a piece of third image data having a plurality of pixel values in one or a plurality of line images included in the entire image P1 in this order. Here, the piece of first image data includes, for example, a piece of image data with the data number NSP=3 in FIG. 4. The piece of second image data includes, for example, pieces of image data with the data number NSP=4 and 5 in FIG. 4. The piece of third image data includes, for example, a piece of image data with the data number NSP=6 in FIG. 4. Thereafter, the head-mounted display 20 performs first driving, second driving, and third driving. In the first driving, a plurality of pixels PIX is driven in units of four pixels PIX on the basis of the piece of first image data. In the second driving, a plurality of pixels PIX is driven in units of one pixel PIX on the basis of the piece of second image data. In the third driving, a plurality of pixels PIX is driven in units of four pixels PIX on the basis of the piece of third image data. Here, the first driving is, for example, driving illustrated in (A) of FIG. 12 based on the piece of image data with the data number NSP=3. The second driving is, for example, driving illustrated in (B) and (C) of FIG. 12 based on the pieces of image data with the data number NSP=4 and 5. The third driving is, for example, driving illustrated in (A) of FIG. 12 based on the piece of image data with the data number NSP of 6. This allows the head-mounted display 20 to perform a display driving operation in order of reception on the basis of the piece of first image data, the piece of second image data, and the piece of third image data, which makes it possible to omit, for example, a frame memory. In other words, if a head-mounted display alternately receives a piece of image data for one frame of the entire image P1 and a piece of image data for one frame of the partial image P2, the head-mounted display performs scaling processing or merging processing on the basis of the two pieces of image data to thereby generate one display image. In this case, the head-mounted display needs a frame memory. In contrast, in the head-mounted display 20 according to the present embodiment, it is possible to perform the display driving operation in order of reception, which makes it possible to omit, for example, a frame memory. Thus, in the head-mounted display 20, it is possible to reduce, for example, power to be consumed by a frame memory or the like, which makes it possible to reduce power consumption. In addition, the head-mounted display 20 performs scanning, for example, in scanning units of one pixel line L or two pixel lines L when driving the plurality of pixels PIX in units of one pixel or four pixels. Accordingly, in the head-mounted display 20, it is possible to decrease the operation frequency and reduce power consumption, as compared with, for example, a case where scanning is performed in scanning units of one pixel line L.

In addition, in the display system 1, it is possible to perform the display driving operation in order of reception in such a manner, which makes it possible to omit, for example, a frame memory. It is possible to omit a frame memory in such a manner, which makes it possible to shorten time (latency) from when the image signal is inputted until when an image is displayed.

[Effects]

As described above, in the present embodiment, the piece of first image data having a plurality of pixel values in one or a plurality of line images included in an entire image having the first resolution, the piece of second image data having a plurality of pixel values in a plurality of line images included in a partial image having the second resolution higher than the first resolution, and the piece of third image data having a plurality of pixel values in one or a plurality of line images included in the entire image are received in this order. Thereafter, the first driving, the second driving, and the third driving are performed. In the first driving, a plurality of pixels is driven in units of four pixels on the basis of the piece of first image data. In the second driving, a plurality of pixels is driven in units of one pixel on the basis of the piece of second image data. In the third driving, a plurality of pixels is driven in units of four pixels on the basis of the piece of third image data. This makes it possible to reduce power consumption. In addition, this makes it possible to shorten the latency.

Modification Example 1-1

In the embodiment described above, the image generation circuit 11 generates the entire image P1 having a high resolution, specifies a part of the entire image P1 as the partial image P2, and converts four pixel values disposed in two rows and two columns in the entire image P1 into one pixel value to thereby convert the entire image P1 having a high resolution into the entire image P1 having a low resolution, but the embodiment is not limited thereto. Instead of this, the image generation circuit 11 may individually generate the entire image P1 having a low resolution and the partial image P2 having a high resolution. In this case, the transmission signal generation circuit 18 generates pieces of image data included in the image signal SP on the basis of the entire image P1 having a low resolution and the partial image P2 having a high resolution.

Modification Example 1-2

Figure 19:
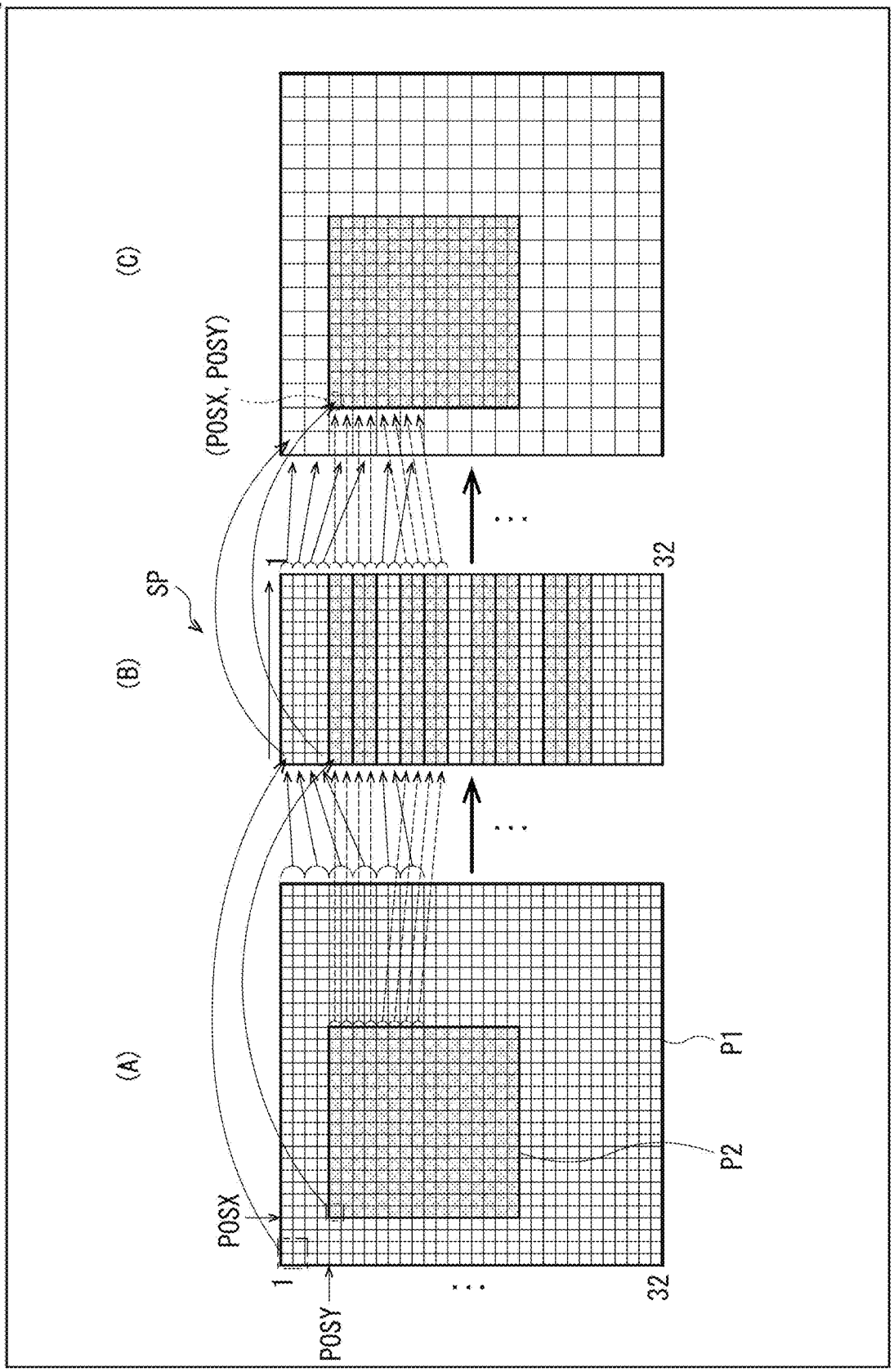
FIG. 19 is an explanatory diagram illustrating an operation example of a display system according to a modification example of the first embodiment.

In the embodiment described above, as illustrated in FIG. 3, in the image signal SP, pixel values in one line image included in the entire image P1 and pixel values in two line images included in the partial image P2 are alternately disposed in the longitudinal direction, but the embodiment is not limited thereto. Instead of this, for example, as illustrated in FIG. 19, pixel values in two line images included in the entire image P1 and pixel values in four line images included in the partial image P2 may be alternately disposed in the longitudinal direction.

Specifically, in this example, the transmission signal generation circuit 18 converts four pixel values disposed in two rows and two columns into one pixel value on the basis of 64 pixel values included in the first row and the second row of the entire image P1 to thereby generate sixteen pixel values related to the entire image P1. Thus, the transmission signal generation circuit 18 generates a piece of image data in the first row in the image signal SP.

In addition, the transmission signal generation circuit 18 converts four pixel values disposed in two rows and two columns into one pixel value on the basis of 64 pixel values included in the third row and the fourth row of the entire image P1 to thereby generate sixteen pixel values related to the entire image P1. Thus, the transmission signal generation circuit 18 generates a piece of image data in the second row in the image signal SP.

In addition, the transmission signal generation circuit 18 converts four pixel values disposed in two rows and two columns into one pixel value on the basis of 128 pixel values included in fifth to eighth rows of the entire image P1 to thereby generate 32 pixel values. Thus, the transmission signal generation circuit 18 generates pieces of image data in the third and fourth rows in the image signal SP.

In addition, the transmission signal generation circuit 18 outputs sixteen pixel values related to the partial image P2 of 32 pixel values included in the fifth row of the entire image P1 as they are, outputs sixteen pixel values related to the partial image P2 of 32 pixel values included in the sixth row of the entire image P1 as they are, outputs sixteen pixel values related to the partial image P2 of 32 pixel values included in the seventh row of the entire image P1 as they are, and outputs sixteen pixel values related to the partial image P2 of 32 pixel values included in the eighth row of the entire image P1 as they are. Thus, the transmission signal generation circuit 18 generates pieces of image data in fifth to eighth rows in the image signal SP.

As a result, the image signal SP includes a portion in which pixel values in two line images included in the entire image P1 and pixel values in four line images included in the partial image P2 are alternately disposed in the longitudinal direction.

Modification Example 1-31

In the embodiment described above, the image signal SP generated by the transmission signal generation circuit 18 is transmitted as it is, but the embodiment is not limited thereto. Compression processing may be performed on pieces of image data, and the image signal SP including the pieces of compressed image data may be transmitted. The present modification example is described in detail below with reference to some examples.

Figure 20:
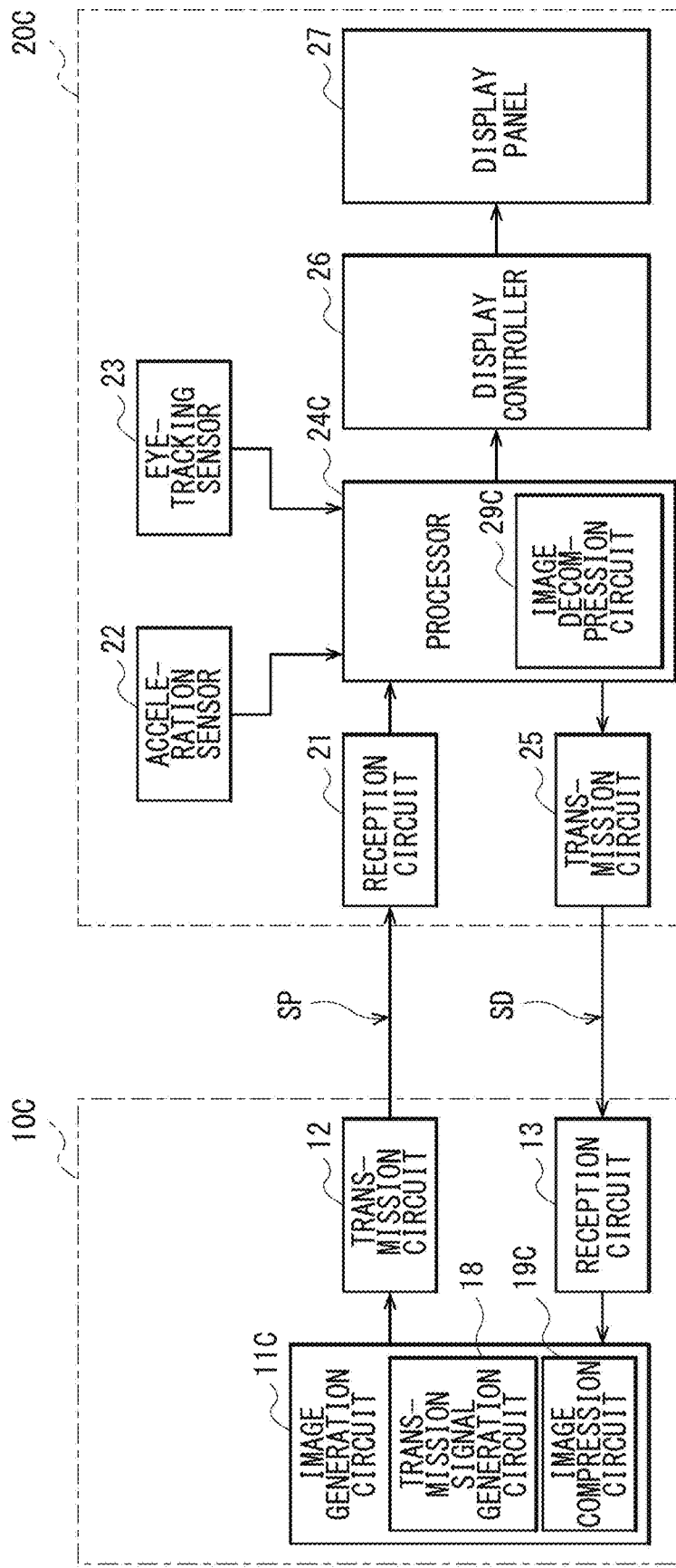
FIG. 20 is a block diagram illustrating a configuration example of a display system according to another modification example of the first embodiment.

FIG. 20 illustrates a configuration example of a display system 1C according to the modification example. The display system 1C includes an image generation device 10C and a head-mounted display 20C.

The image generation device 10C includes an image generation circuit 11C. The image generation circuit 11C includes an image compression circuit 19C. The image compression circuit 19C is configured to perform compression processing on a piece of image data included in the image signal SP generated by the transmission signal generation circuit 18. Specifically, the image compression circuit 19C inserts a piece of image data for one row having pixel values representing black between a piece of image data related to the entire image P1 and a piece of image data related to the partial image P2 in the pieces of image data (for example, (B) of FIG. 3) included in the image signal SP, and thereafter compresses a piece of image data in each row with use of a piece of image data in the previous row. It is possible to use, for example, VESA DSC (Display Stream Compression) for the compression processing.

FIG. 21 illustrates an example of pieces of image data. In this example, a piece of image data having black pixel values is inserted into the pieces of image data illustrated in (B) of FIG. 3. For example, pieces of image data in the first to third rows are pieces of image data related to the entire image P1. A piece of image data in the fourth row is a piece of inserted image data having black pixel values. Pieces of image data in the fifth and sixth rows are pieces of image data related to the partial image P2. A piece of image data in the seventh row is a piece of inserted image data having black pixel values. A piece of image data in the eighth row is a piece of image data related to the entire image P1.

The head-mounted display 20C includes a processor 24C. The processor 24C includes an image decompression circuit 29C. The image decompression circuit 29C is configured to perform decompression processing on the basis of the pieces of compressed image data. Specifically, the image decompression circuit 29C performs decompression processing on the pieces of image data (FIG. 21) included in the image signal SP, and thereafter deletes a piece of image data for one row having pixel values representing black between a piece of image data related to the entire image P1 and a piece of image data related to the partial image P2.

With this configuration, in the display system 1C, it is possible to reduce an compression error. In other words, the image compression circuit 19C uses similarity or continuity of images to compress a line image with use of a line image in the previous row in this example. However, no similarity is basically present between the entire image P1 and the partial image P2. Accordingly, for example, in a case where the image compression circuit 19C compresses a line image related to the entire image P1 with use of a line image related to the partial image P2 in the previous row, a compression error may be increased. In contrast, in the display system 1C, the piece of image data having black pixel values is inserted between the piece of image data related to the entire image P1 and the piece of image data related to the partial image P2, which makes it possible to reduce the compression error. A data amount is increased by inserting the piece of image data having black pixel values; however, performing the compression processing makes it possible to decrease a data amount of the image signal SP to be finally transmitted.

FIG. 22 illustrates another example of pieces of image data according to the present modification example. In this example, a piece of image data having black pixel values is inserted into pieces of image data illustrated in (B) of FIG. 19. For example, pieces of image data in the first to fourth rows are pieces of image data related to the entire image P1. A piece of image data in the fifth row is a piece of inserted image data having black pixel values. Pieces of image data in sixth to ninth rows are pieces of image data related to the partial image P2. A piece of image data in a tenth row is a piece of inserted image data having black pixel values. Pieces of image data in eleventh and twelfth rows are pieces of image data related to the entire image P1. In this example, it is possible to reduce a data amount of the pieces of inserted image data, as compared with the example in FIG. 21, which makes it possible to reduce the data amount of the image signal SP to be finally transmitted.

In this example, the image compression circuit 19C compresses a piece of image data in each row with use of a piece of image data in the previous row, but this is not limitative. Instead of this, for example, the image compression circuit 19C may compress a piece of image data in each row with use of a piece of image data in the previous row and a piece of image data in the second previous row.

FIG. 23 illustrates another example of pieces of image data according to the present modification example. In a case where the image compression circuit 19C compresses a piece of image data in each row with use of a piece of image data in the previous row and a piece of image data in the second previous row in such a manner, the image compression circuit 19C inserts pieces of image data for two rows having pixel values representing black between a piece of image data related to the entire image P1 and a piece of image data related to the partial image P2 in advance. In this example, the pieces of image data for two rows having black pixel values are inserted into the pieces of image data illustrated in (B) of FIG. 3. For example, pieces of image data in the first to third rows are pieces of image data related to the entire image P1. Pieces of image data in the fourth and fifth rows are pieces of inserted image data having black pixel values. Pieces of image data in the sixth and seventh rows are pieces of image data related to the partial image P2. Pieces of image data in the eighth and ninth rows are pieces of inserted image data having black pixel values. A piece of image data in the tenth row is a piece of image data related to the entire image P1. This makes it possible to reduce a compression error in the display system 1C also in a case where compression is performed with use of two previous line images.

Modification Example 1-41

The embodiment described above is applicable to various color systems as illustrated in FIGS. 24A to 24C.

For example, as illustrated in a case C1 (FIG. 24A), application may be made to a RGB system. In this example, a red image (R), a green image (G), and a blue image (B) of the entire image P1 are images having a low resolution. The display panel 27 performs a display driving operation related to the entire image P1 in units of four pixels PIX disposed in two rows and two columns on the basis of these images. In addition, a red image (R), a green image (B), and a blue image (B) of the partial image P2 are images having a high resolution. The display panel 27 performs a display driving operation related to the partial image P2 in units of one pixel PIX on the basis of these images. The band usage rate in this case is 50% as with the case of the embodiment described above (FIG. 4).

In addition, for example, as illustrated in cases C2 to C6, application may be made to a YUV system using a luminance signal a color difference signal.

For example, in an example illustrated in a case C2 (FIG. 24A), a luminance image (Y), a first color difference image (U), and a second color difference image (V) of the entire image P1 are images having a low resolution. The display controller 26 generates a red image (R), a green image (G), and a blue image (B) each having a low resolution on the basis of these images, and the display panel 27 performs a display driving operation related to the entire image P1 in units of four pixels PIX disposed in two rows and two columns on the basis of the generated images. In addition, a luminance image (Y), a first color difference image (U), and a second color difference image (V) of the partial image P2 are images having a high resolution. The display controller 26 generates a red image (R), a green image (G), and a blue image (B) each having a high resolution on the basis of these images, and the display panel 27 performs a display driving operation related to the partial image P2 in units of one pixel PIX on the basis of the generated images. The band usage rate in this case is 50% as with the case of the embodiment described above (FIG. 4).

For example, in an example illustrated in a case C3 (FIG. 24B), a luminance image (Y), a first color difference image (U), and a second color difference image (V) of the entire image P1 are images having a low resolution. The display controller 26 generates a red image (R), a green image (G), and a blue image (B) each having a low resolution on the basis of these images, and the display panel 27 performs a display driving operation related to the entire image P1 in units of four pixels PIX disposed in two rows and two columns on the basis of the generated images. In addition, a luminance image (Y) of the partial image P2 is an image having a high resolution, and a first color difference image (U) and a second color difference signal (V) are images having a low resolution. In other words, human visibility for luminance is high, but human visibility for a color difference is low; therefore, the luminance image has a high resolution, and the color difference images have a low resolution. The display controller 26 generates a red image (R), a green image (G), and a blue image (B) each having a high resolution on the basis of these images, and the display panel 27 performs a display driving operation related to the partial image P2 in units of one pixel PIX on the basis of the generated images. The band usage rate in this case is 37.5%.

For example, in an example illustrated in the case C4, as with the case 3, the first color difference image (U) and the second color difference image (V) each having a low resolution in the first entire image P1 are used in the partial image P2.

Figure 25:
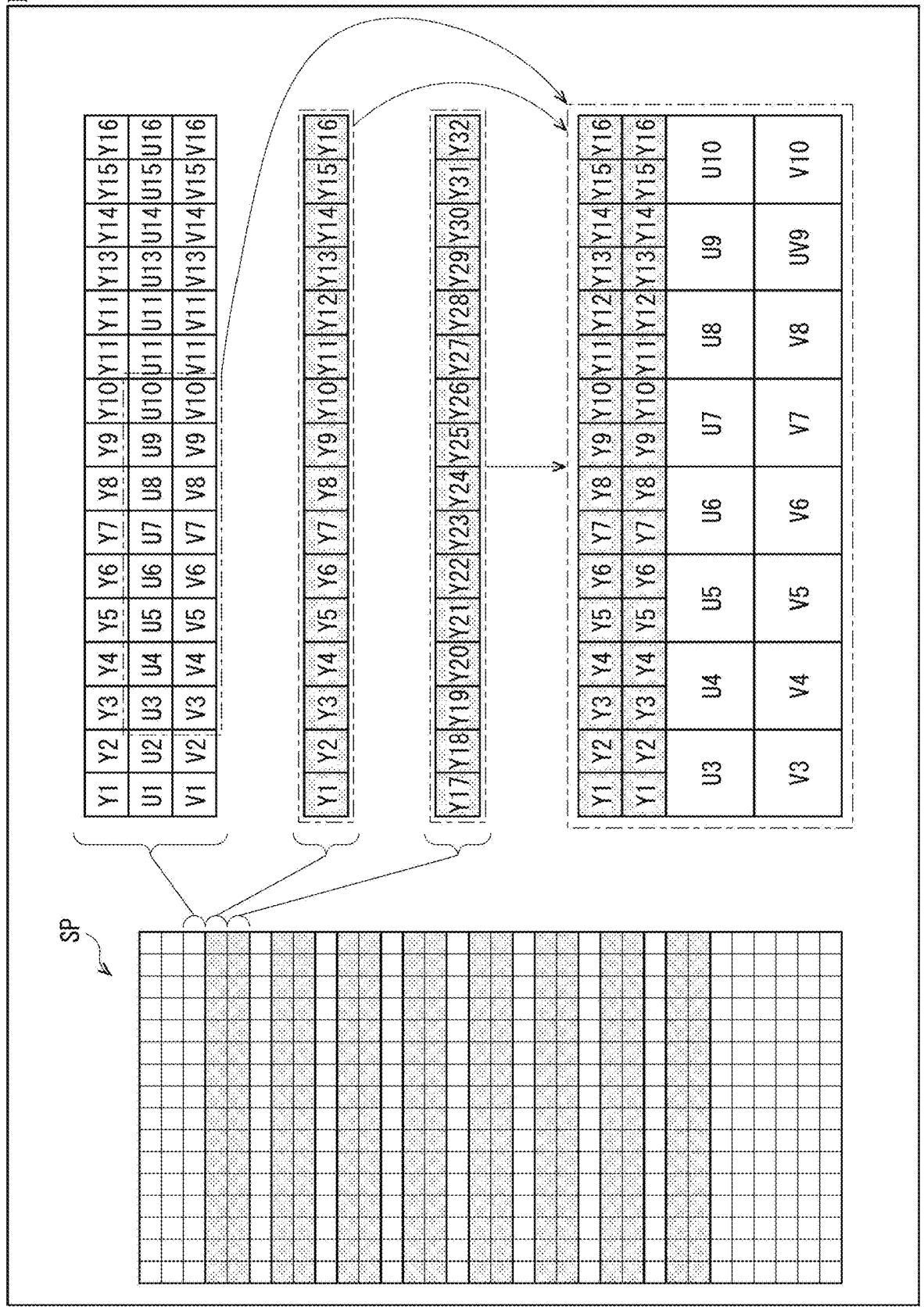
FIG. 25 is an explanatory diagram illustrating an operation example of a display system according to another modification example of the first embodiment.
Figure 26:
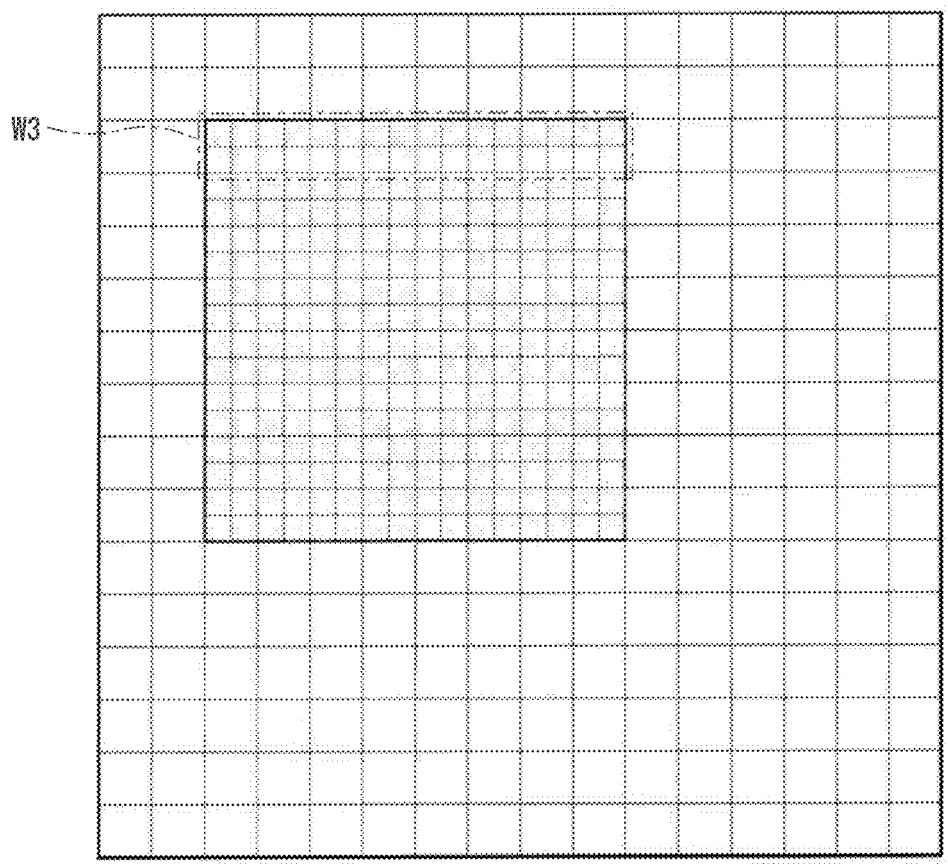
FIG. 26 is an explanatory diagram illustrating an operation example of the display system according to another modification example of the first embodiment.

FIG. 25 illustrates an operation example of the display system 1 in the case C4. The head-mounted display 20 is configured to generate pieces of image data indicated by a sign W3 in FIG. 26 on the basis of pieces of image data in the third to fifth rows in the image signal SP.

The piece of image data in the third row in the image signal SP is a piece of image data having a low resolution related to the entire image P1, and includes pieces of data Y1 to Y16 representing a luminance value, pieces of data U1 to U16 representing a first color difference value, and pieces of data V1 to V16 representing a second color difference value. The piece of image data in the fourth row in the image signal SP is a piece of image data having a high resolution related to the partial image P2, and includes only the pieces of data Y1 to Y16 representing the luminance value. The piece of image data in the fifth row in the image signal SP is a piece of image data having a high resolution related to the partial image P2, and includes only the pieces of data Y1 to Y16 representing the luminance value.

The pieces of data U3 to U10 representing the first color difference value and the pieces of data V3 to V10 representing the second color difference value included in the piece of image data in the third row, the pieces of data Y1 to Y16 representing the luminance value included in the piece of image data in the fourth row, and pieces of data Y17 to Y32 representing a luminance value included in the piece of image data in the fifth row are pieces of image data indicated by the sign W3. The display controller 26 is configured to generate pieces of image data of a red image (R), a green image (G), and a blue image (B) each having a high resolution related to the partial image P2 on the basis of these pieces of image data. The display panel 27 performs a display driving operation related to the partial image P2 in units of one pixel PIX on the basis of the pieces of image data generated. The band usage rate in this case is 33%

In this example, as illustrated in FIG. 25, the piece of image data in the fourth row and the piece of image data in the fifth row have a data amount smaller than that of each of pieces of image data in other rows. It is possible to achieve this case C4 with use of such a special data format. In contrast, in a case where a normal data format is used, it is possible to use the case C5 (FIG. 24C).

Figure 27:
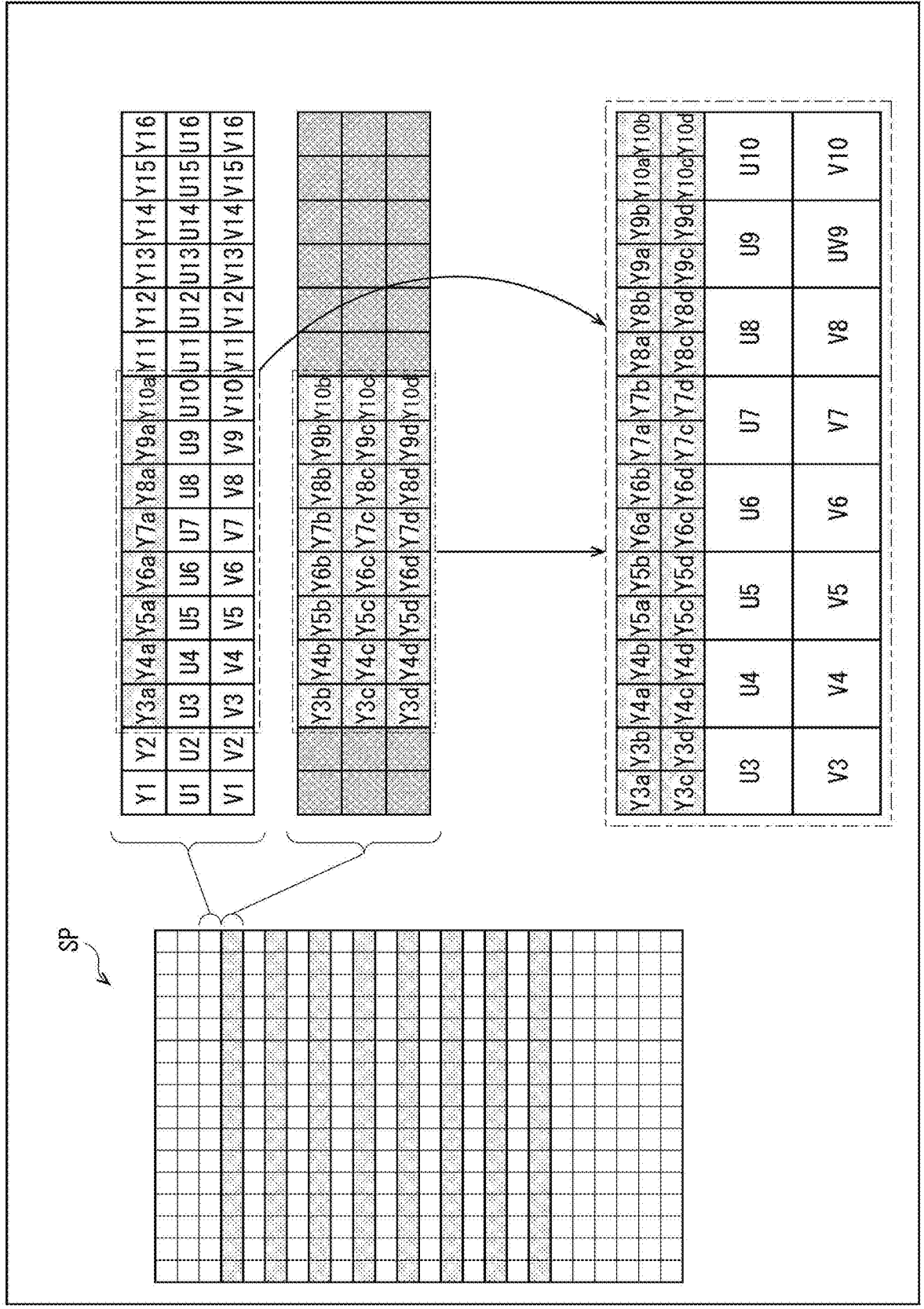
FIG. 27 is an explanatory diagram illustrating an operation example of a display system according to another modification example of the first embodiment.

FIG. 27 illustrates an operation example of the display system 1 in the case C5. The head-mounted display 20 generates pieces of image data indicated by the sign W3 in FIG. 28 on the basis of the pieces of image data in the third and fourth rows in the image signal SP.

Figure 28:
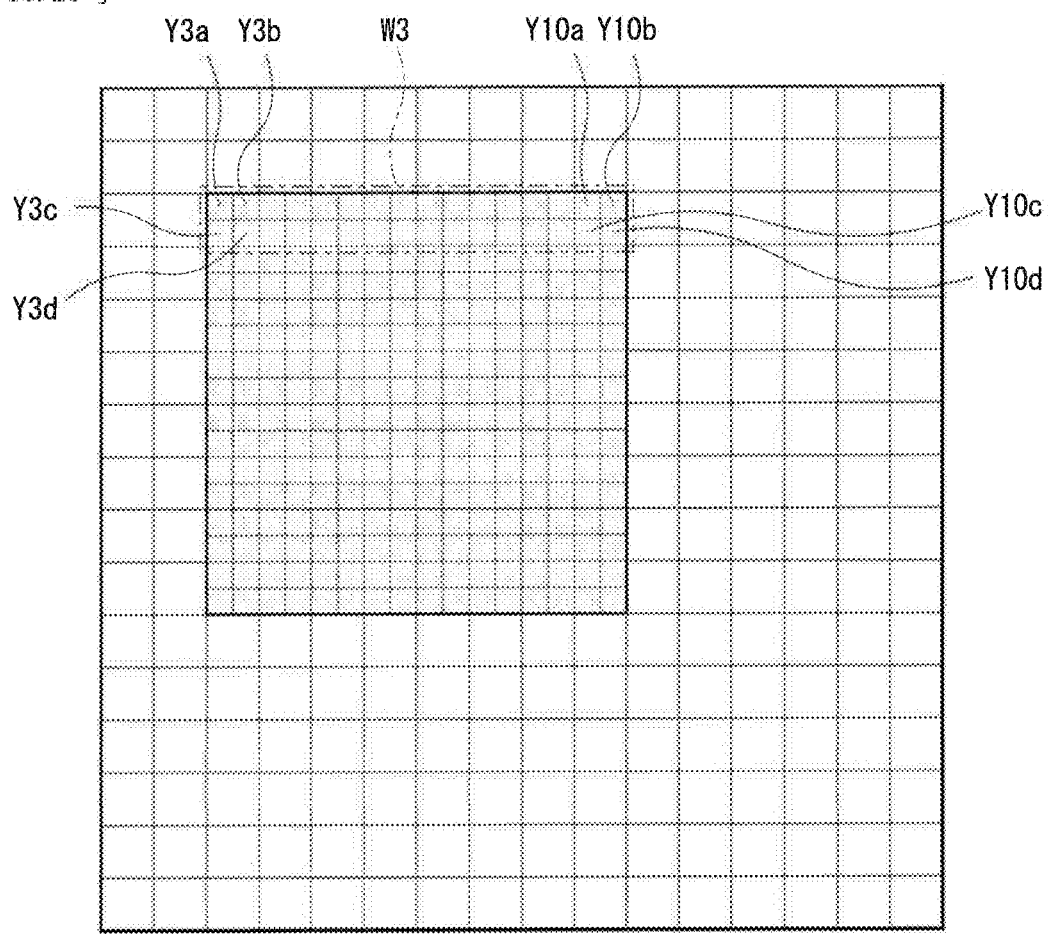
FIG. 28 is an explanatory diagram illustrating an operation example of the display system according to another modification example of the first embodiment.

The piece of image data in the third row in the image signal SP includes a piece of image data having a low resolution related to the entire image P1 and a piece of image data having a high resolution related to the partial image P2. The piece of image data having a low resolution related to the entire image P1 includes the pieces of data Y1, Y2, and Y11 to Y16 representing the luminance value, the pieces of data U1 to U16 representing the first color difference value, and the pieces of data V1 to V16 representing the second color difference value. The piece of image data having a high resolution related to the partial image P2 includes pieces of data Y3a to Y10a representing a luminance value. The piece of image data in the fourth row is a piece of image data having a high resolution related to the partial image P2, and includes pieces of data Y3b to Y10b, Y3c to Y10c, and Y3d to Y10d representing a luminance value. Attached letters a, b, c, and d in the pieces of data Y3a to Y10a, Y3b to Y10b, Y3c to Y10c, and Y3d to Y10d indicate positions of four pixels PIX disposed in two rows and two columns as illustrated in FIG. 28. Specifically, for example, the piece of data Y3a represents a luminance value in the upper left pixel PIX. The piece of data Y3b represents a luminance value in the upper right pixel PIX. The piece of data Y3c represents a luminance value in the lower left pixel PIX. The piece of data Y3d represents a luminance value in the lower right pixel PIX.

The pieces of data Y3a to Y10a representing the luminance value, the pieces of data U3 to U10 representing the first color difference value, and the pieces of data V3 to V10 representing the second color difference value that are included in the piece of image data in the third row, and the pieces of data Y3b to Y10b, Y3c to Y10c, and Y3d to Y10d representing the luminance value that are included in the piece of image data in the fourth row are pieces of image data indicated by the sign W3 in FIG. 28. The display controller 26 is configured to generate pieces of image data of a red image (R), a green image (G), and a blue image (B) each having a high resolution related to the partial image P2 on the basis of these pieces of image data. The display panel 27 performs a display driving operation related to the partial image P2 in units of one pixel PIX on the basis of the pieces of image data generated. The band usage rate in this case is 37.5%

For example, in an example illustrated in the case C6 (FIG. 24C), a luminance image (Y) of the entire image P1 is an image having a low resolution, and a first color difference image (U) and a second color difference image (V) are images having a lower resolution. The display controller 26 generates a red image (R), a green image (G), and a blue image (B) each having a low resolution on the basis of these images, and the display panel 27 performs a display driving operation related to the entire image P1 in units of four pixels PIX disposed in two rows and two columns on the basis of the generated images. In addition, a luminance image (Y) of the partial image P2 is an image having a high resolution, and a first color difference image (U) and a second color difference signal (V) are images having a low resolution. The display controller 26 generates a red image (R), a green image (G), and a blue image (B) each having a high resolution on the basis of these images, and the display panel 27 performs a display driving operation related to the partial image P2 in units of one pixel PIX on the basis of the generated images. The band usage rate in this case is 25%.

Modification Example 1-51

In the embodiment described above, the entire image P1 and the partial image P2 are used, but the embodiment is not limited thereto. Instead of this, for example, three or more images may be used. An example in a case where three images are used is described in detail below.

The image generation circuit 11 according to the present modification example generates the entire image P1 representing a scenery corresponding to the direction of the head-mounted display 20 in a virtual space on the basis of a result of detection by the acceleration sensor 22 included in a piece of data supplied from the reception circuit 13. In addition, the image generation circuit 11 specifies partial images P2 and P3 each representing a portion at which the user is looking of the scenery corresponding to the direction of the head-mounted display 20 in the virtual space on the basis of a result of detection by the eye-tracking sensor 23 included in the piece of data supplied from the reception circuit 13.

Figure 29:
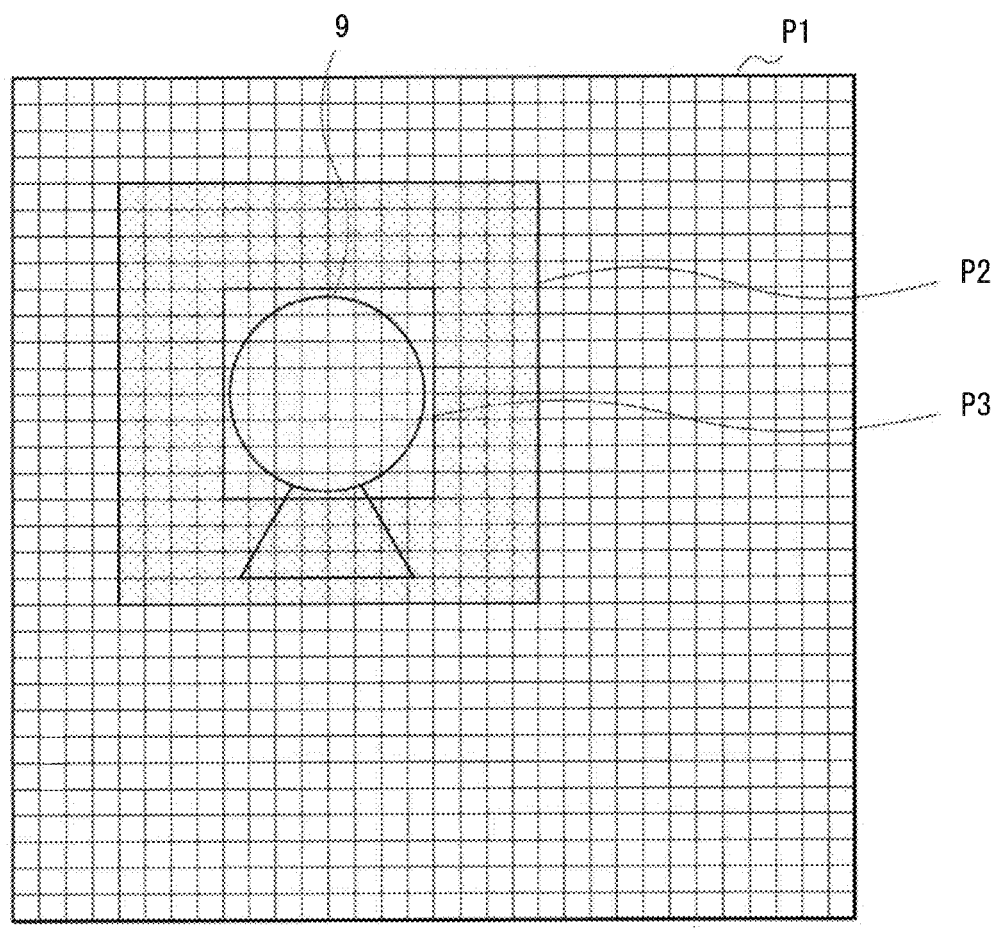
FIG. 29 is an explanatory diagram illustrating an example of an image generated by an image generation circuit according to another modification example of the first embodiment.

FIG. 29 illustrates an example of an image generated by the image generation circuit 11. The image generation circuit 11 specifies the partial images R2 and R3 including a portion at which the user is looking of the entire region R1 on the basis of a result of detection by the eye-tracking sensor 23 included in the piece of data supplied from the reception circuit 13. In this example, the size in the horizontal direction (the lateral direction in FIG. 29) of the partial image R2 is a half of the size in the horizontal direction of the entire region R1, and the size in the vertical direction (the longitudinal direction in FIG. 29) of the partial image R2 is a half of the size in the vertical direction of the entire region R1. In other words, the area of the partial image R2 is ¼ of the area of the entire region R1. In addition, a size in the horizontal direction of the partial image R3 is a half of the size in the horizontal direction of the partial image R2, and a size in the vertical direction of the partial image R3 is a half of the size in the vertical direction of the partial image R2. In other words, the area of the partial image R3 is ¼ of the area of the partial image R2. In this example, a center position of the partial image R3 is the same as the center position of the partial image R2.

Figure 30:
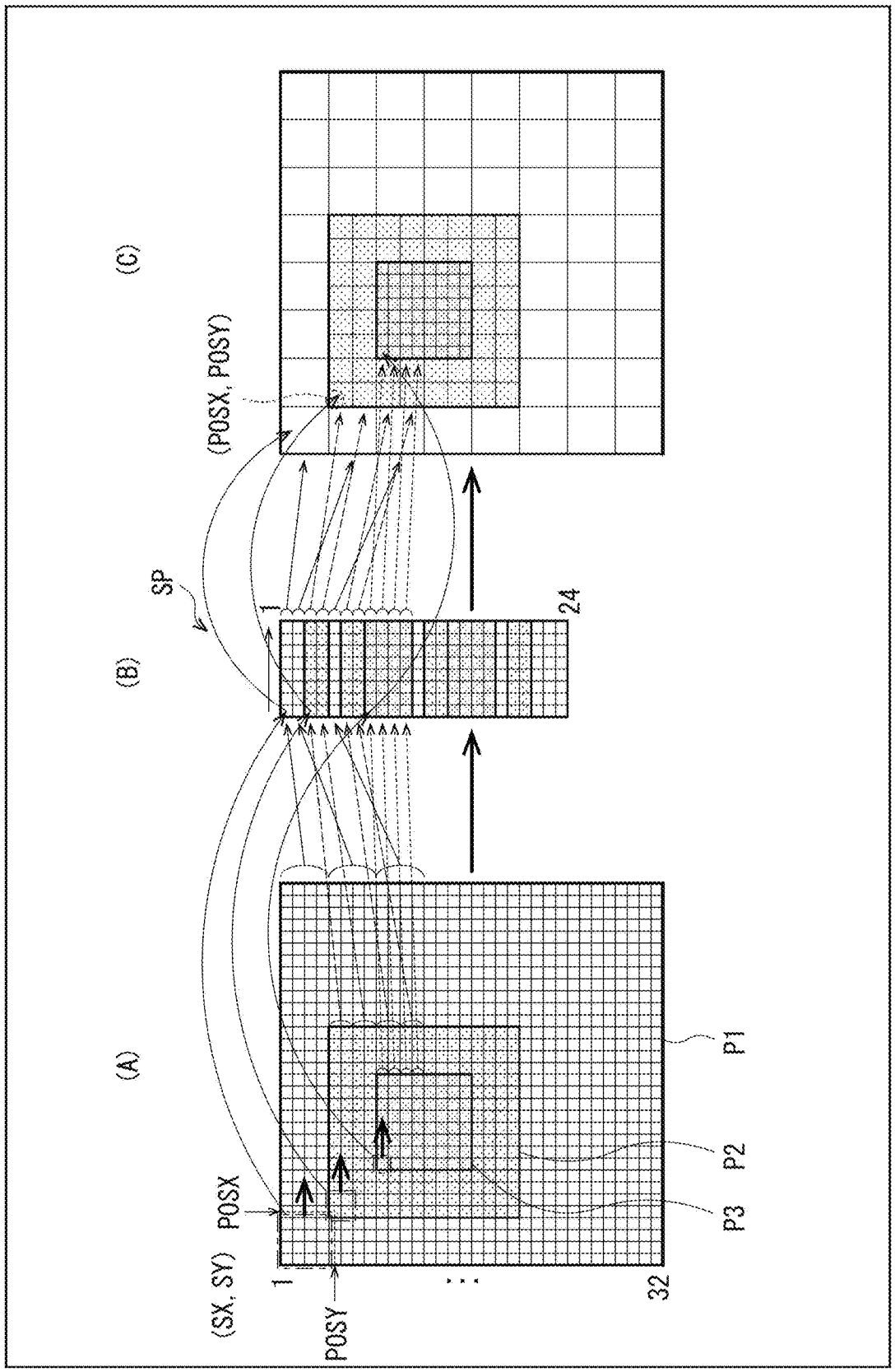
FIG. 30 is an explanatory diagram illustrating an operation example of a display system according to another modification example of the first embodiment.

FIG. 30 illustrates an operation example of the display system 1 according to the present modification example, where (A) indicates an image generated by the image generation circuit 11, (B) indicates pieces of image data included in the image signal SP, and (C) indicates a display driving operation in the head-mounted display 20 according to the present modification example.

As illustrated in (A) and (B) of FIG. 30, the transmission signal generation circuit 18 according to the present modification example performs left-to-right scanning from top to bottom sequentially on the entire image P1 generated by the image generation circuit 11 to thereby generate the image signal SP. The transmission signal generation circuit 18 converts sixteen pixel values disposed in four rows and four columns in the entire image P1 into one pixel value, converts four pixel values disposed in two rows and two columns in a portion overlapping the partial image P2 of the entire image P1 into one pixel value, and outputs one pixel value as it is in a portion overlapping the partial image P3 of the entire image P1, thereby generating pieces of image data in the image signal SP.

Specifically, in this example, the transmission signal generation circuit 18 converts sixteen pixel values disposed in four rows and four columns into one pixel value on the basis of 128 pixel values included in the first to fourth rows of the entire image P1 to thereby generate eight pixel values related to the entire image P1. Thus, the transmission signal generation circuit 18 generates a piece of image data in the first row in the image signal SP.

In addition, the transmission signal generation circuit 18 converts sixteen pixel values disposed in four rows and four columns into one pixel value on the basis of 128 pixel values included in the fifth to eighth rows of the entire image P1 to thereby generate eight pixel values related to the entire image P1. Thus, the transmission signal generation circuit 18 generates a piece of image data in the second row in the image signal SP.

In addition, the transmission signal generation circuit 18 converts four pixel values disposed in two rows and two columns into one pixel value on the basis of 32 pixel values related to the partial image P2 of 64 pixel values included in the fifth and sixth rows of the entire image P1 to thereby generate eight pixel values related to the partial image P2. Thus, the transmission signal generation circuit 18 generates a piece of image data in the third row in the image signal SP.

In addition, the transmission signal generation circuit 18 converts four pixel values disposed in two rows and two columns into one pixel value on the basis of 32 pixel values related to the partial image P2 of 64 pixel values included in the seventh and eighth rows of the entire image P1 to thereby generate eight pixel values related to the partial image P2. Thus, the transmission signal generation circuit 18 generates a piece of image data in the fourth row in the image signal SP.

In addition, the transmission signal generation circuit 18 converts sixteen pixel values disposed in four rows and four columns into one pixel value on the basis of 128 pixel values included in the ninth to twelfth rows of the entire image P1 to thereby generate eight pixel values related to the entire image P1. Thus, the transmission signal generation circuit 18 generates a piece of image data in the fifth row in the image signal SP.

In addition, the transmission signal generation circuit 18 converts four pixel values disposed in two rows and two columns into one pixel value on the basis of 32 pixel values related to the partial image P2 of 64 pixel values included in the ninth and tenth rows of the entire image P1 to thereby generate eight pixel values related to the partial image P2. Thus, the transmission signal generation circuit 18 generates a piece of image data in the sixth row in the image signal SP.

In addition, the transmission signal generation circuit 18 converts four pixel values disposed in two rows and two columns into one pixel value on the basis of 32 pixel values related to the partial image P2 of 64 pixel values included in the eleventh and twelfth rows of the entire image P1 to thereby generate eight pixel values related to the partial image P2. Thus, the transmission signal generation circuit 18 generates a piece of image data in the seventh row in the image signal SP.

In addition, the transmission signal generation circuit 18 outputs eight pixel values related to the partial image P3 of 32 pixel values included in the ninth row of the entire image P1 as they are, outputs eight pixel values related to the partial image P3 of 32 pixel values included in the tenth row of the entire image P1 as they are, outputs eight pixel values related to the partial image P3 of 32 pixel values included in the eleventh row of the entire image P1 as they are, and outputs eight pixel values related to the partial image P3 of 32 pixel values included in the twelfth row of the entire image P1 as they are. Thus, the transmission signal generation circuit 18 generates pieces of image data in the eighth to eleventh rows in the image signal SP.

As described above, the transmission signal generation circuit 18 converts sixteen pixel values disposed in four rows and four columns in the entire image P1 into one pixel value. The transmission signal generation circuit 18 converts four pixel values disposed in two rows and two columns in the portion overlapping the partial image P2 of the entire image P1 into one pixel value. In addition, the transmission signal generation circuit 18 outputs pixel values as they are in the portion overlapping the partial image P3 of the entire image P1. As a result, in the image signal SP, the resolution of the entire image P1 becomes lower than the resolution of the partial image P2, and the resolution of the partial image P2 becomes lower than the resolution of the partial image P3.

Thus, the transmission signal generation circuit 18 generates pieces of image data including a plurality of pixel values as lustrated in (B) of FIG. 30, on the basis of the image generated by the image generation circuit 11. Thereafter, the transmission signal generation circuit 18 generates the image pixel SP including the pieces of image data and the piece of image position data representing the position (parameters POSX and POSY) of the partial image P2 in the entire image P1.

Figure 31:
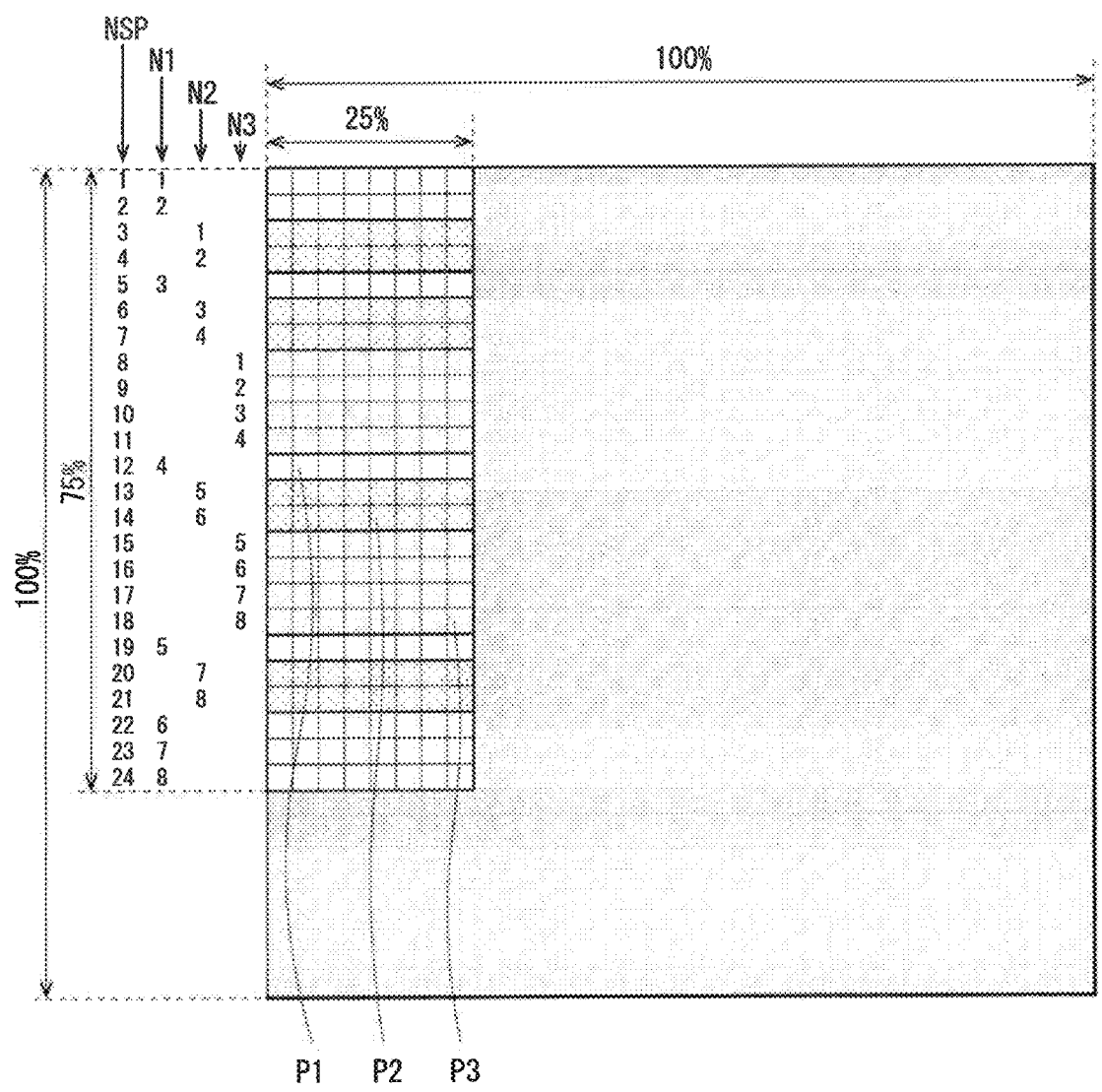
FIG. 31 is an explanatory diagram illustrating a transmission band of the display system according to another modification example of the first embodiment.

FIG. 31 illustrates a transmission band in the display system 1 according to the present modification example. The pieces of image data included in the image signal SP in this example include pieces of image data for 24 rows. For explanatory convenience, each of pieces of image data for eight rows related to the entire image P1 is attached with the data number N1, each of pieces of image data for eight rows related to the partial image P2 is attached with the data number N2, and each of pieces of image data for eight rows related to the partial image P3 is attached with a data number N3.

The number of pixel values in the pieces of image data included in the image signal SP is 18.75% (=0.75×0.25) of the number of pixel values included in the entire image P1. Thus, it is possible for the display system 1 to reduce an image data amount, as compared with a case where the entire image P1 before conversion is transmitted as it is.

Figure 32:
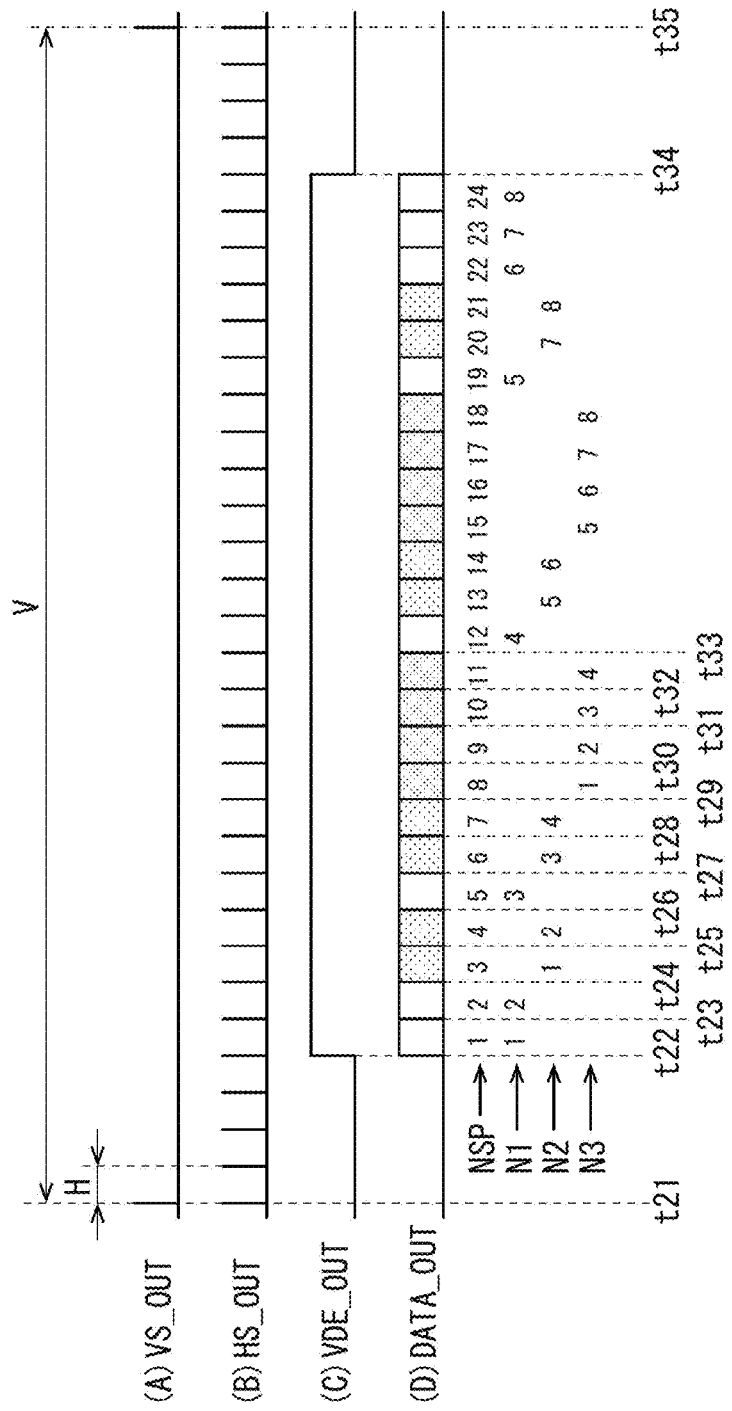
FIG. 32 is a timing chart illustrating an example of output signals of a display controller according to another modification example of the first embodiment.

FIG. 32 illustrates an example of signals to be outputted from the display controller 26 according to the present modification example, where (A) indicates the waveform of the vertical synchronization signal VS_OUT, (B) indicates the waveform of the horizontal synchronization signal HS_OUT, (C) indicates the waveform of the vertical data enable signal VDE_OUT, and (D) indicates the data signal DATA_OUT.

At the timing t21, a pulse of the vertical synchronization signal VS_OUT is generated, and the vertical period V starts ((A) of FIG. 32). In addition, a pulse of the horizontal synchronization signal HS_OUT is generated every time the horizontal period H starts ((B) of FIG. 32).

Thereafter, at the timing t22, the vertical data enable signal VDE_OUT changes from the low level to the high level ((C) of FIG. 32). In this example, the display controller 26 outputs 24 pieces of image data as the data signal DATA_OUT over 24 horizontal period H ((D) of FIG. 32).

The display controller 26 performs control to drive the plurality of pixels PIX in the display panel 27 in units of sixteen pixels PIX disposed in four rows and four columns on the basis of the pieces of image data related to the entire image P1 included in the data signal DATA_OUT. In addition, the display controller 26 performs control to drive the plurality of pixels PIX in the display panel 27 in units of four pixels PIX disposed in two rows and two columns on the basis of pieces of data related to the partial image P2 included in the data signal DATA_OUT. In addition, the display controller 26 performs control to drive the plurality of pixels PIX in the display panel 27 in units of one pixel PIX on the basis of pieces of data related to the partial image P3 included in the data signal DATA_OUT.

Figure 33:
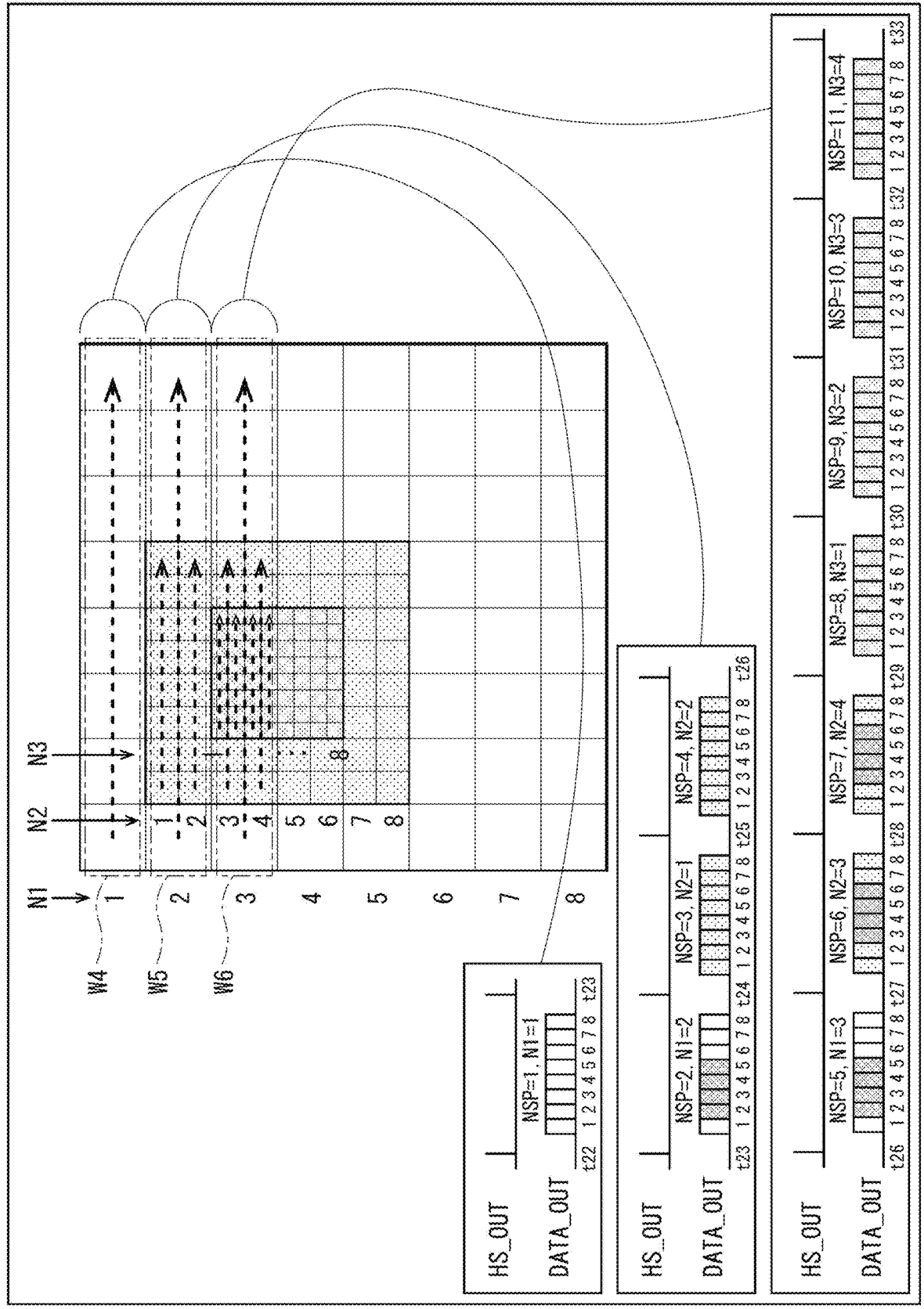
FIG. 33 is another timing chart illustrating an example of output signals of the display controller according to another modification example of the first embodiment.

FIG. 33 illustrates an example of the data signal DATA_OUT from the timing t22 to a timing t33 in FIG. 32 and a display driving operation based on the data signal DATA_OUT.

The display panel 27 performs a display driving operation on four pixel lines L indicated by a sign W4 in FIG. 33 in a period from the timing t22 to the timing t23.

In this period from the timing t22 to the timing t33, as illustrated in FIG. 33, the display controller 26 outputs, as the data signal DATA_OUT, a piece of image data including eight pixel values related to the entire image P1. The data number NSP of this piece of image data is "1", and the data number N1 there of is "1". The display controller 26 performs control to drive four pixel lines L corresponding to the data number N1=1 in units of sixteen pixels PIX on the basis of this piece of image data.

In this case, the scanning circuit 33 scans the plurality of pixels PIX in scanning units US of four pixel lines L. In addition, the pixel signal generation circuit 32 applies the same pixel signal to four signal lines SGL adjacent to each other. Accordingly, the same pixel signal is written to sixteen pixels PIX in selected four pixel lines L. Thus, the display panel 27 drives the plurality of pixels PIX in units UD of sixteen pixels PIX.

Thus, the pixel signal generation circuit 32 writes a pixel signal related to the entire image P1 to four pixel lines L indicated by the sign W4 in FIG. 33

Next, the display panel 27 performs the display driving operation on four pixel lines L indicated by a sign W5 in FIG. 33 in a period from the timing t23 to a timing t26.

First, in a period from the timing t23 to the timing t24, as illustrated in FIG. 33, the display controller 26 outputs, as the data signal DATA_OUT, a piece of image data including eight pixel values related to the entire image P1. The data number NSP of this piece of image data is "2", and the data number N1 thereof is "2". The display controller 26 performs control to drive four pixel lines L corresponding to the data number N1=2 in units of sixteen pixels PIX on the basis of this piece of image data.

In this example, as illustrated in FIG. 33, the display controller 26 sets second to fifth pixel values of the eight pixel values to a pixel value representing black. The display panel 27 performs control not to write the pixel signal to the pixels PIX corresponding to the second to fifth pixel values.

Figure 34:
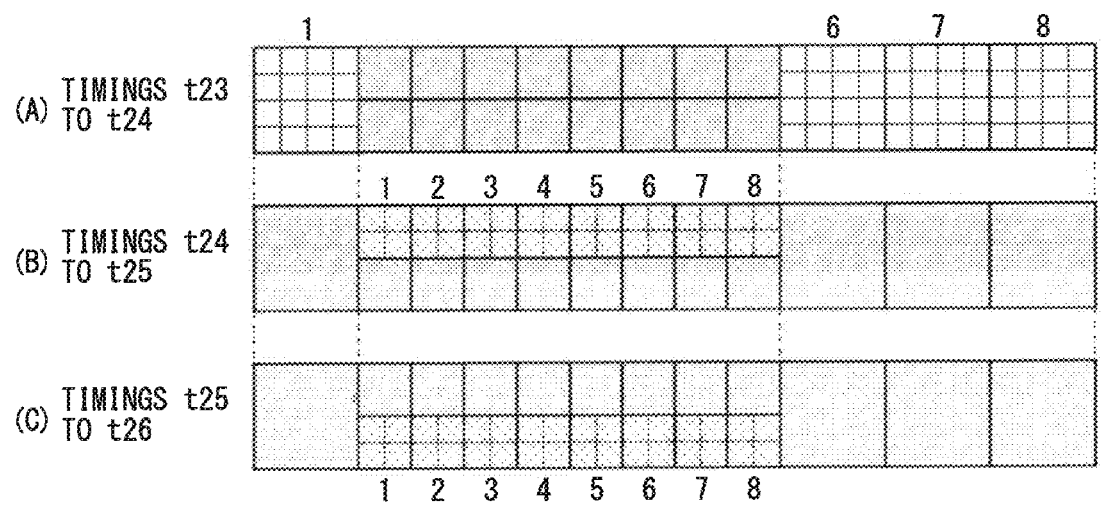
FIG. 34 is an explanatory diagram illustrating an example of a pixel driving operation according to another modification example of the first embodiment.

FIG. 34 illustrates an example of a display driving operation on four pixel lines L indicated by the sign W5 in FIG. 33, where (A) indicates an operation from the timing t23 to the timing t24, (B) indicates an operation from the timing t24 to the timing t25, and (C) indicates an operation from the timing t25 to the timing t26. As illustrated in (A) of FIG. 34, from the timing t23 to the timing t24, the pixel signal generation circuit 32 writes the pixel signals corresponding to first and sixth to eighth pixel values to the pixels PIX corresponding to these pixel values. In addition, the pixel signal generation circuit 32 does not write the pixel value to the pixels PIX other than these pixels PIX.

In the next period from the timing t24 to the timing t25, as illustrated in FIG. 33, the display controller 26 outputs, as the data signal DATA_OUT, a piece of image data including eight pixel values related to the partial image P2. The data number NSP of this piece of image data is "3", and the data number N2 thereof is "1". The display controller 26 knows that this piece of image data includes the pixel values related to the partial image P2, on the basis of the piece of image position data. Thereafter, the display controller 26 performs control to drive two pixel lines L corresponding to the data number N1=2 in units of four pixels PIX on the basis of this piece of image data.

As illustrated in (B) of FIG. 34, from the timing t24 to the timing t25, the pixel signal generation circuit 32 writes the pixel signals corresponding to eight pixel values to the pixels PIX corresponding to these pixel values. In addition, the pixel signal generation circuit 32 does not write the pixel value to the pixels PIX other than these pixels PIX.

An operation in the next period from the timing t25 to the timing t26 is similar to the operation in the period from the timing t24 to the timing t25. As illustrated in (C) of FIG. 34, in the period from the timing t25 to the timing t26, the pixel signal generation circuit 32 writes the pixel signals corresponding to eight pixel values to the pixels PIX corresponding to these pixel values.

Thus, as illustrated in (A) to (C) of FIG. 34, the pixel signal generation circuit 32 writes the pixel signals related to the entire image P1 or the pixel signals related to the partial image P2 to all the pixels PIX in four pixel lines L indicated by the sign W5 in FIG. 33 in the period from the timing t23 to the timing t26.

Next, the display panel 27 performs a display driving operation on four pixel lines L indicated by a sign W6 in FIG. 33 in a period from the timing t26 to the timing t33.

First, in a period from the timing t26 to a timing t27, as illustrated in FIG. 33, the display controller 26 outputs, as the data signal DATA_OUT, a piece of image data including eight pixel values related to the entire image P1. The data number NSP of this piece of image data is "5", and the data number N1 thereof is "3". The display controller 26 performs control to drive four pixel lines L corresponding to the data number N1=3 in units of sixteen pixels PIX on the basis of this piece of image data.

In this example, as illustrated in FIG. 33, the display controller 26 sets second to fifth pixel values of the eight pixel values to the pixel value representing black. The display panel 27 performs control not to write the pixel signal to the pixels PIX corresponding to the second to fifth pixel values.

Figure 35:
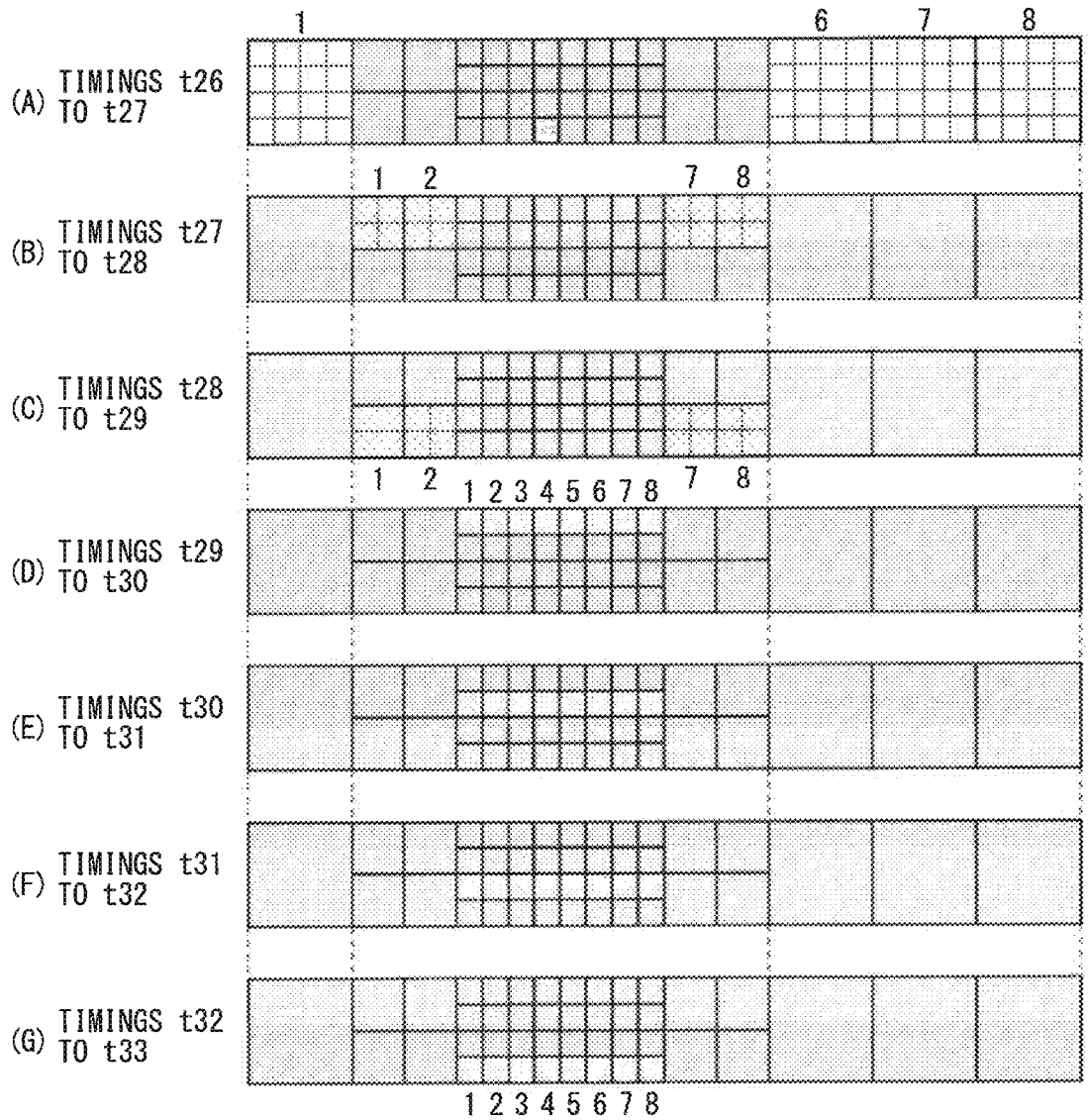
FIG. 35 is an explanatory diagram illustrating another example of a pixel driving operation according to another modification example of the first embodiment.

FIG. 35 illustrates an example of a display driving operation on four pixel lines L indicated by the sign W6 in FIG. 33, where (A) indicates an operation from the timing t26 to the timing t27, (B) indicates an operation from the timing t27 to a timing t28, (C) indicates an operation from the timing t28 to a timing t29, (D) indicates an operation from the timing t29 to a timing t30, (E) indicates an operation from the timing t30 to a timing t31, (F) indicates an operation from the timing t31 to a timing t32, and (G) indicates an operation from the timing t32 to the timing t33. As illustrated in (A) of FIG. 35, from the timing t26 to the timing t27, the pixel signal generation circuit 32 writes the pixel signals corresponding to first and sixth to eighth pixel values to the pixels PIX corresponding to these pixel values. In addition, the pixel signal generation circuit 32 does not write the pixel value to the pixels PIX other than these pixels PIX.

In the next period from the timing t27 to the timing t28, as illustrated in FIG. 33, the display controller 26 outputs, as the data signal DATA_OUT, a piece of image data including eight pixel values related to the partial image P2. The data number NSP of this piece of image data is "6", and the data number N2 thereof is "3". The display controller 26 knows that this piece of image data includes the pixel values related to the partial image P2, on the basis of the piece of image position data. Thereafter, the display controller 26 performs control to drive two pixel lines L corresponding to the data number N2=3 in units of four pixels PIX on the basis of this piece of image data.

In this example, as illustrated in FIG. 33, the display controller 26 sets third to sixth pixel values of the eight pixel values to the pixel value representing black. The display panel 27 performs control not to write the pixel signal to the pixels PIX corresponding to the third to sixth pixel values.

As illustrated in (B) of FIG. 35, from the timing t27 to the timing t28, the pixel signal generation circuit 32 writes the pixel signals corresponding to first, second, seventh, and eighth pixel values to the pixels PIX corresponding to these pixel values. In addition, the pixel signal generation circuit 32 does not write the pixel value to the pixels PIX other than these pixels PIX.

An operation in the next period from the timing t28 to the timing t29 is similar to the operation in the period from the timing t27 to the timing t28. As illustrated in (C) of FIG. 35, in the period from the timing t28 to the timing t29, the pixel signal generation circuit 32 writes the pixel signals corresponding to first, second, seventh and eighth pixel values to the pixels PIX corresponding to these pixel values.

In a period from the timing t29 to the timing t30, as illustrated in FIG. 33, the display controller 26 outputs, as the data signal DATA_OUT, a piece of image data including eight pixel values related to the partial image P3. The data number NSP of this piece of image data is "8", and the data number N3 thereof is "1". The display controller 26 knows that this piece of image data includes the pixel values related to the partial image P3, on the basis of the piece of image position data. Thereafter, the display controller 26 performs control to drive one pixel line L corresponding to the data number N3=1 in units of one pixel PIX on the basis of this piece of image data.

As illustrated in (D) of FIG. 35, from the timing t29 to the timing t30, the pixel signal generation circuit 32 writes the pixel signals corresponding to eight pixel values to the pixels PIX corresponding to these pixel values. In addition, the pixel signal generation circuit 32 does not write the pixel value to the pixels PIX other than these pixels PIX.

Operations in a period from the timing t30 to the timing t31, a period from the timing 131 to the timing t32, and a period from the timing 132 to the timing 133 are similar to the operation in the period from the timing t29 to the timing t30. As illustrated in (E) to (G) of FIG. 35, in each of the period from the timing 130 to the timing 131, the period from the timing t31 to the timing t32, and the period from the timing t32 to the timing 33, the pixel signal generation circuit 32 writes the pixel signals corresponding to eight pixel values to the pixels PIX corresponding to these pixel values.

Thus, as illustrated in (A) to (G) of FIG. 35, the pixel signal generation circuit 32 writes the pixel signals related to the entire image P1, the pixel signals related to the partial image P2, or the pixel signals related to the partial image P3 to all the pixels PIX in four pixel lines L indicated by the sign W6 in FIG. 33 in the period from the timing t26 to the timing t33.

As illustrated in FIG. 32, even after this, the display controller 26 and the display panel 27 operate similarly. Thereafter, at a timing t34, the vertical data enable signal VDE_OUT changes from the high level to the low level ((C) of FIG. 32). Thereafter, at a timing t35, this vertical period V ends, and the next vertical period V starts.

OTHER MODIFICATION EXAMPLES

In addition, two or more of these modification examples may be combined.

2. Second Embodiment

Next, description is given of a display system 2 according to a second embodiment. The present embodiment differs from the first embodiment described above in the structure of pieces of image data in the pixel signal SP. It is to be noted that components substantially the same as those of the display system 1 according to the first embodiment described above are denoted by the same reference signs, and description thereof is omitted as appropriate.

Figure 36:
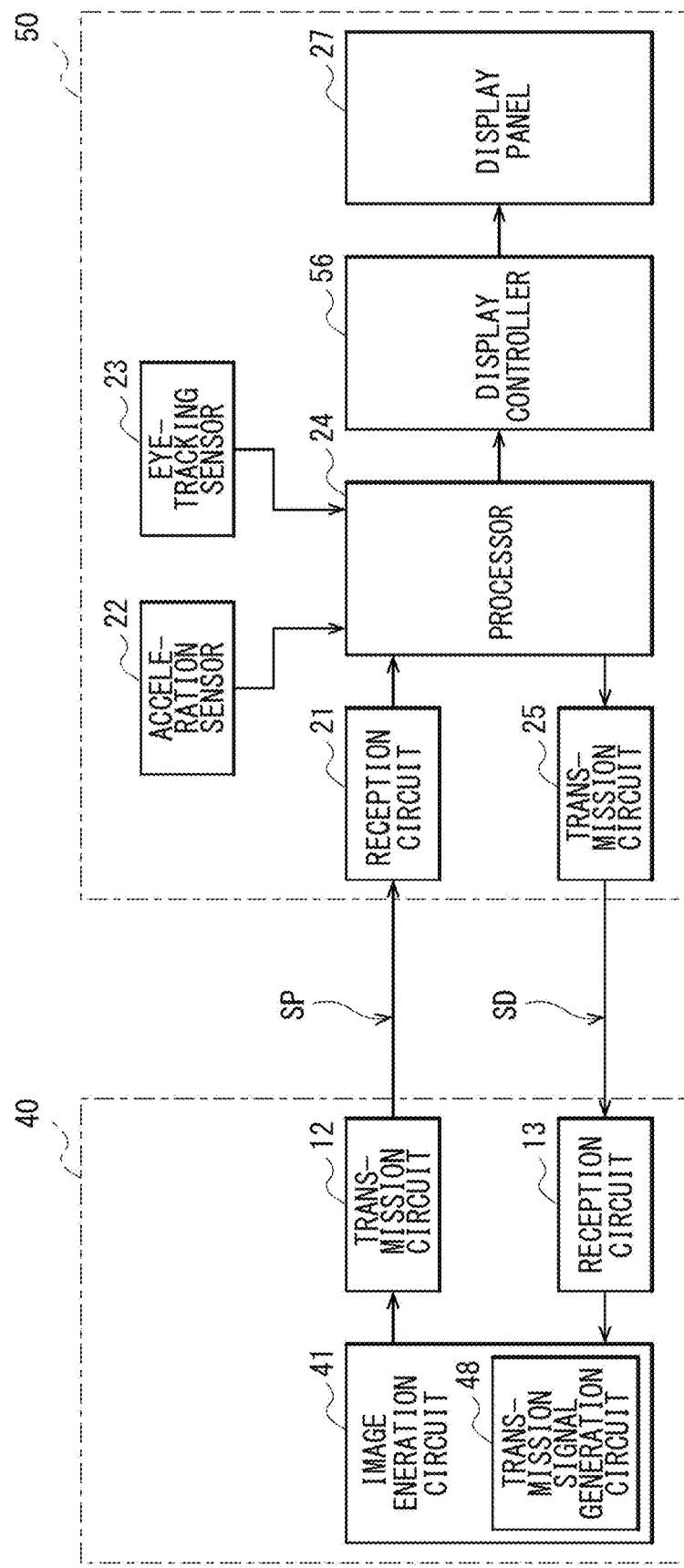
FIG. 36 is a block diagram illustrating a configuration example of a display system according to a second embodiment.

FIG. 36 illustrates a configuration example of the display system 2 according to the present embodiment. The display system 2 includes an image generation device 40 and a head-mounted display 50.

The image generation device 40 includes an image generation circuit 41. The image generation circuit 41 includes a transmission signal generation circuit 48. The transmission signal generation circuit 48 is configured to generate the image signal SP to be transmitted, on the basis of an image generated by the image generation circuit 41.

Figure 37:
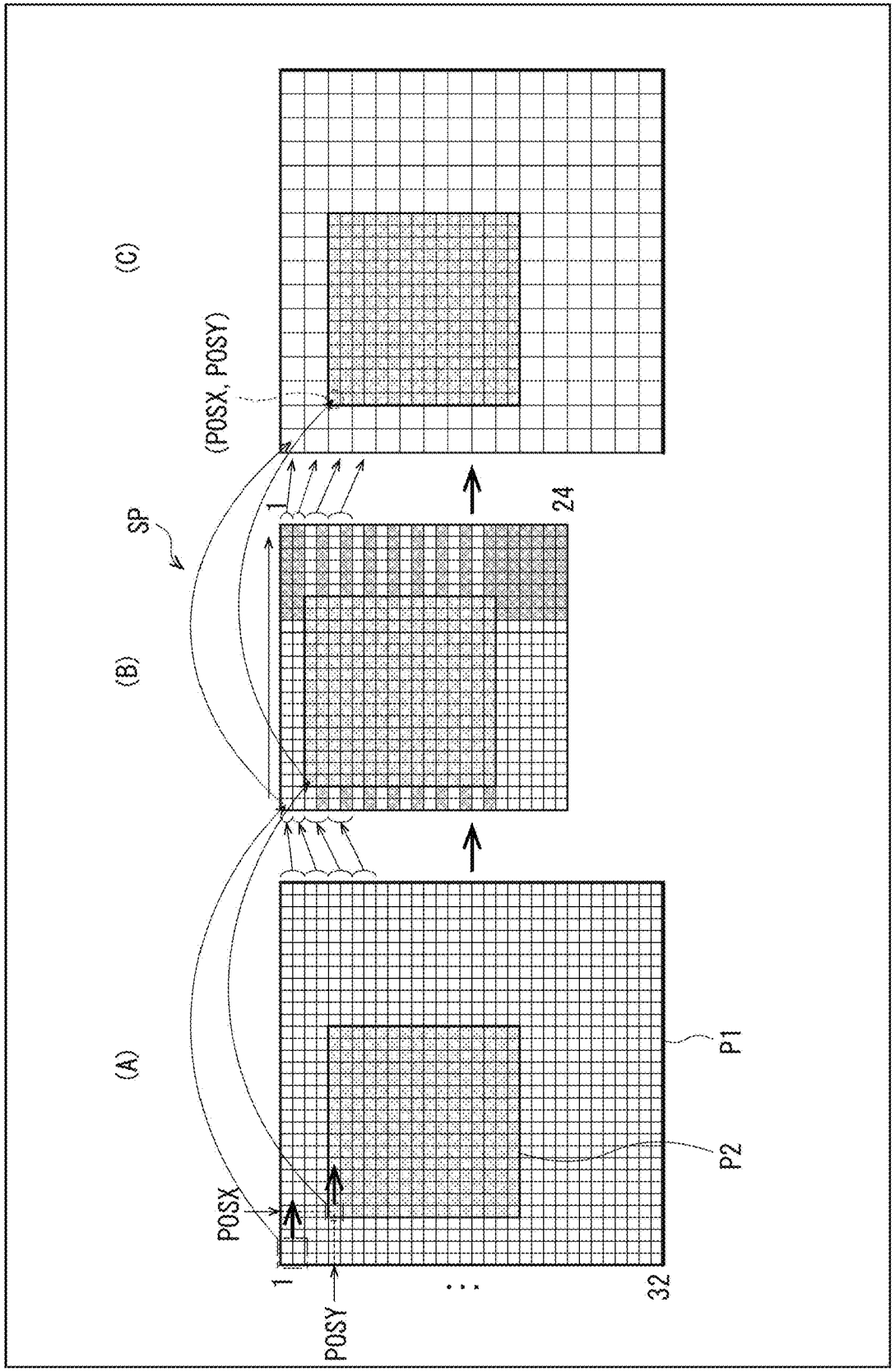
FIG. 37 is an explanatory diagram illustrating an operation example of the display system illustrated in FIG. 36.

FIG. 37 illustrates an operation example of the display system 2, where (A) indicates an image generated by the image generation circuit 41, (B) indicates pieces of image data included in the image signal SP, and (C) indicates a display driving operation in the head-mounted display 50.

As illustrated in (A) and (B) of FIG. 37, the transmission signal generation circuit 48 performs left-to-right scanning from top to bottom sequentially on the entire image P1 generated by the image generation circuit 41 to thereby generate the image signal SP. The transmission signal generation circuit 48 converts four pixel values disposed in two rows and two columns in a portion not overlapping the partial image P2 of the entire image P1 into one pixel value, and outputs one pixel value as it is in a portion overlapping the partial image P2 of the entire image P1, thereby generating pieces of image data in the image signal SP.

Specifically, in this example, the transmission signal generation circuit 48 converts four pixel values disposed in two rows and two columns into one pixel value on the basis of 64 pixel values included in a first row and a second row of the entire image P1 to thereby generate sixteen pixel values related to the entire image P1. Thereafter, the transmission signal generation circuit 48 generates eight pixel values representing black. Thus, the transmission signal generation circuit 48 generates a piece of image data in a first row in the image signal SP.

In addition, the transmission signal generation circuit 48 converts four pixel values disposed in two rows and two columns into one pixel value on the basis of 64 pixel values included in third and fourth rows of the entire image P1 to thereby generate sixteen pixel values related to the entire image P1. Thereafter, the transmission signal generation circuit 48 generates eight pixel values representing black. Thus, the transmission signal generation circuit 48 generates a piece of image data in a second row in the image signal SP.

In addition, the transmission signal generation circuit 48 converts four pixel values disposed in two rows and two columns into one pixel value on the basis of eight pixel values belonging to first to fourth columns of 64 pixel values included in fifth and sixth rows of the entire image P1 to thereby generate two pixel values related to the entire image P1. The transmission signal generation circuit 48 outputs sixteen pixel values related to the partial image P2 of 32 pixel values included in the fifth row of the entire image P1 as they are. Thereafter, the transmission signal generation circuit 48 converts four pixel values disposed in two rows and two columns into one pixel value on the basis of 24 pixel values belonging to 21st to 32nd columns of 64 pixel values included in the fifth and sixth rows of the entire image P1 to thereby generate six pixel values related to the entire image P1. Thus, the transmission signal generation circuit 48 generates a piece of image data in a third row in the image signal SP.

In addition, the transmission signal generation circuit 48 generates two pixel values representing black. The transmission signal generation circuit 48 outputs sixteen pixel values related to the partial image P2 of 32 pixel values included in the sixth row of the entire image P1 as they are. Thereafter, the transmission signal generation circuit 48 generates six pixel values representing black. Thus, the transmission signal generation circuit 48 generates a piece of image data in a fourth row in the image signal SP.

In this example, the transmission signal generation circuit 48 converts four pixel values disposed in two rows and two columns in the portion not overlapping the partial image P2 of the entire image P1 into one pixel value. Accordingly, the converted entire image P1 does not include an image corresponding to the partial image P2. The transmission signal generation circuit 48 converts the portion not overlapping the partial image P2 of the entire image P1 into the entire image P1 having a lower resolution. In contrast, the resolution of the partial image P2 is not changed. As a result, the resolution of the converted entire image P1 becomes lower than the resolution of the partial image P2. In the example in FIG. 37, the transmission signal generation circuit 48 performs left-to-right scanning from top to bottom sequentially to thereby generate the image signal SP; therefore, for example, in the image signal SP, one or a plurality of pixel values related to the entire image P1 and one or a plurality of pixel values related to the partial image P2 are alternately disposed.

Thus, the transmission signal generation circuit 48 generates pieces of image data including a plurality of pixel values as illustrated in (B) of FIG. 37, on the basis of the image generated by the image generation circuit 41. The pieces of image data includes pixel values representing black. Thereafter, the transmission signal generation circuit 48 generates the image pixel SP including the pieces of image data and a piece of image position data representing the position (parameters POSX and POSY) of the partial image P2 in the entire image P1.

Figure 38:
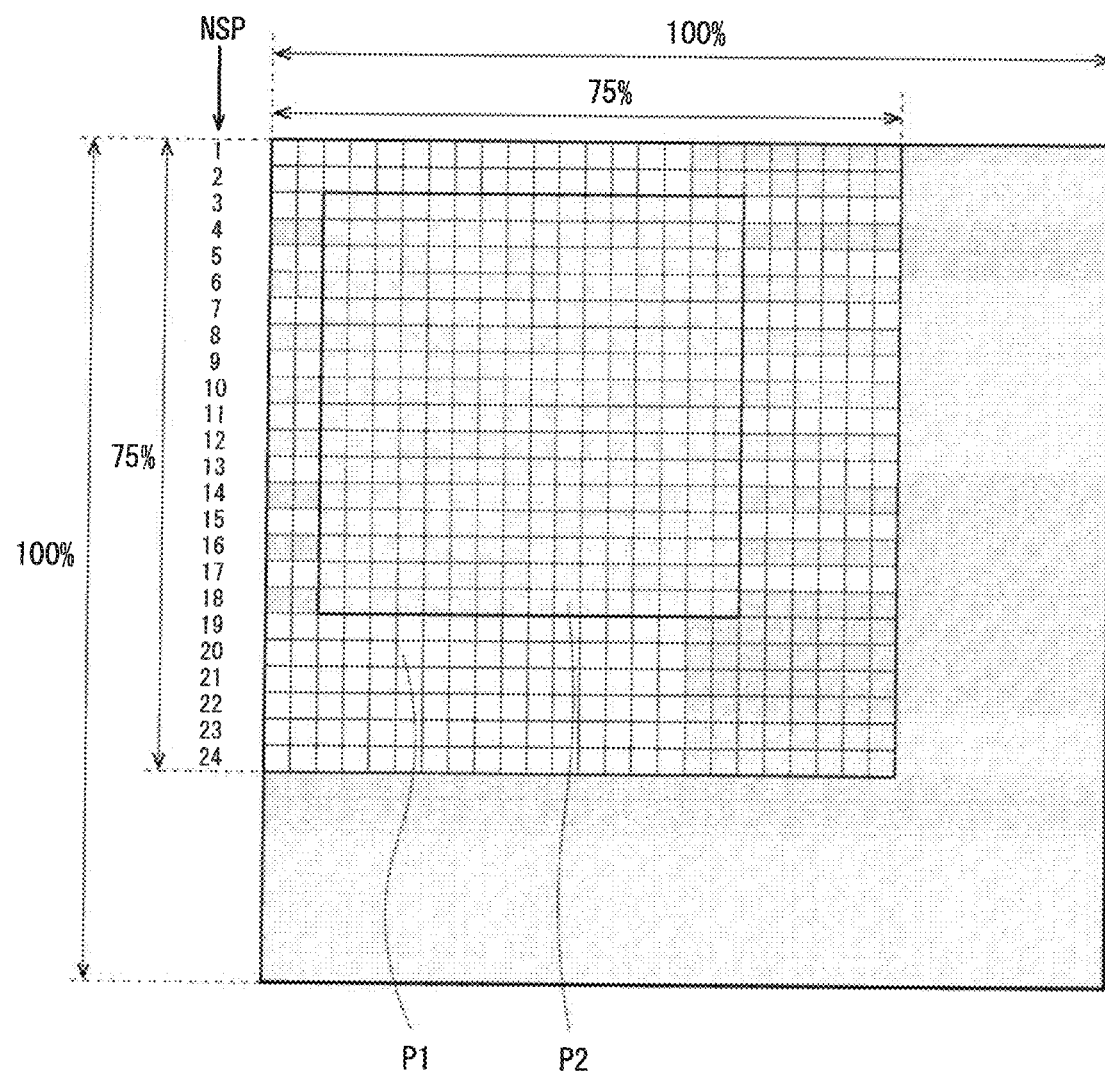
FIG. 38 is an explanatory diagram illustrating a transmission band of the display system illustrated in FIG. 36.

FIG. 38 illustrates a transmission band in the display system 2. In FIG. 38, an unshaded portion indicates a piece of image data related to the entire image P1, and a shaded portion indicates a piece of image data related to the partial image P2. In addition, a dark-shaded pixel value indicates a black pixel value. The pieces of image data included in the image signal SP in this example include pieces of image data for 24 rows. For explanatory convenience, each of the pieces of image data for 24 rows is attached with a data number NSP.

The number of pixel values in the pieces of image data included in the image signal SP is 56.25% (=0.75×0.75) of the number of pixel values included in the entire image P1. Thus, it is possible for the display system 2 to reduce an image data amount, as compared with a case where the entire image P1 before conversion is transmitted as it is.

The head-mounted display 50 (FIG. 36) includes a display controller 56. The display controller 56 is configured to control an operation of display panel 27 on the basis of the pieces of image data and the piece of image position data that are supplied from the processor 24.

Figure 39:
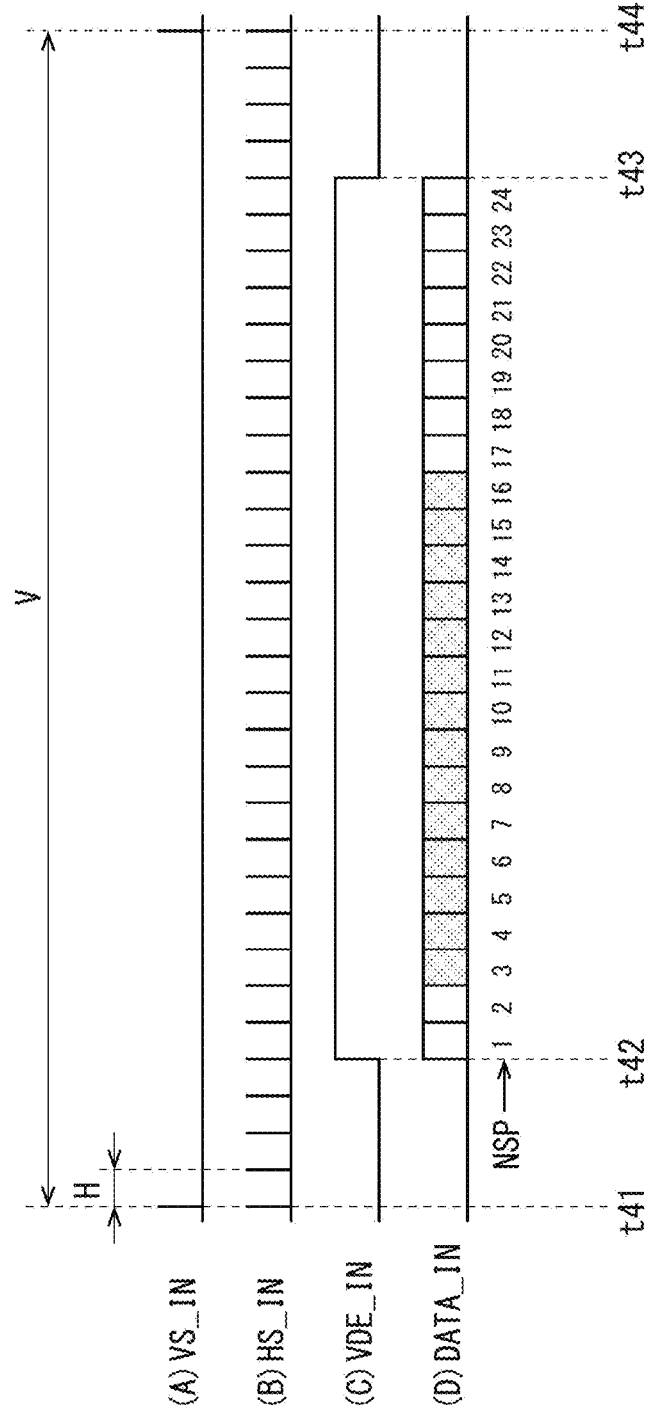
FIG. 39 is a timing chart illustrating an example of input signals of a display controller illustrated in FIG. 36.

FIG. 39 illustrates an example of signals to be inputted to the display controller 56, where (A) indicates a waveform of the vertical synchronization signal VS_IN, (B) indicates a waveform of the horizontal synchronization signal HS_IN, (C) indicates a waveform of the vertical data enable signal VDE_IN, and (D) indicates the data signal DATA_IN.

At a timing t41, a pulse of the vertical synchronization signal VS_IN is generated, and the vertical period V starts ((A) of FIG. 39). In addition, a pulse of the horizontal synchronization signal HS_IN is generated every time the horizontal period H starts ((B) of FIG. 39).

Thereafter, at a timing t42, the vertical data enable signal VDE_IN changes from the low level to the high level ((C) of FIG. 39). In this example, the data signal DATA_IN is supplied over 24 horizontal periods H. The data signal DATA_IN includes 24 pieces of image data corresponding to 24 horizontal periods H. The 24 pieces of image data each correspond to a corresponding one of pieces of image data (with the data number NSP=1 to 24) for 24 rows included in the image signal SP illustrated in FIG. 38.

Figure 40:
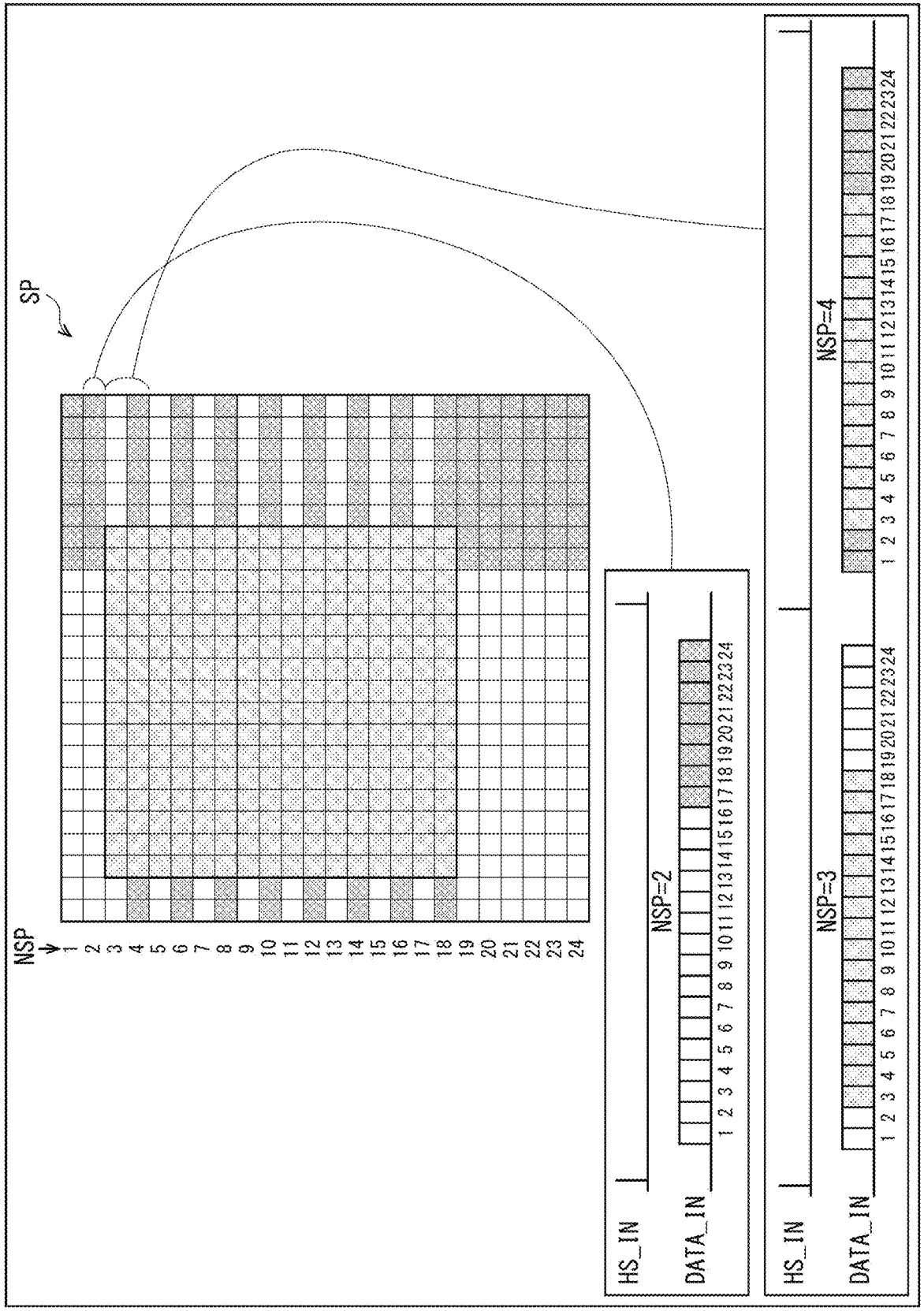
FIG. 40 is another timing chart illustrating an example of input signals of the display controller illustrated in FIG. 36.

FIG. 40 illustrates an example of the data signal DATA_IN. For example, the piece of image data in the second row included in the image signal SP corresponds to a second piece of image data of the 24 pieces of image data included in the data signal DATA_IN. This piece of image data includes sixteen pixel values related to the entire image P1 and eight pixel values representing black. For example, the piece of image data in the third row included in the image signal SP corresponds to a third piece of image data of the 24 pieces of image data included in the data signal DATA_IN. This piece of image data includes two pixel values related to the entire image P1, sixteen pixel values related to the partial image P2, and six pixel values related to the entire image P1. For example, the piece of image data in the fourth row included in the image signal SP corresponds to a fourth piece of image data of the 24 pieces of image data included in the data signal DATA_IN. This piece of image data includes two pixel values representing black, sixteen pixel values related to the partial image P2, and six pixel values representing black.

Thereafter, at a timing t43, the vertical data enable signal VDE_IN changes from the high level to the low level ((C) of FIG. 39). Thereafter, at a timing t44, this vertical period V ends, and the next vertical period V starts.

The display controller 56 performs predetermined processing on the basis of such pieces of image data supplied from the processor 24 to thereby generate the vertical synchronization signal VS_OUT, the horizontal synchronization signal HS_OUT, the vertical data enable signal VDE_OUT, and the data signal DATA_OUT.

Figure 41:
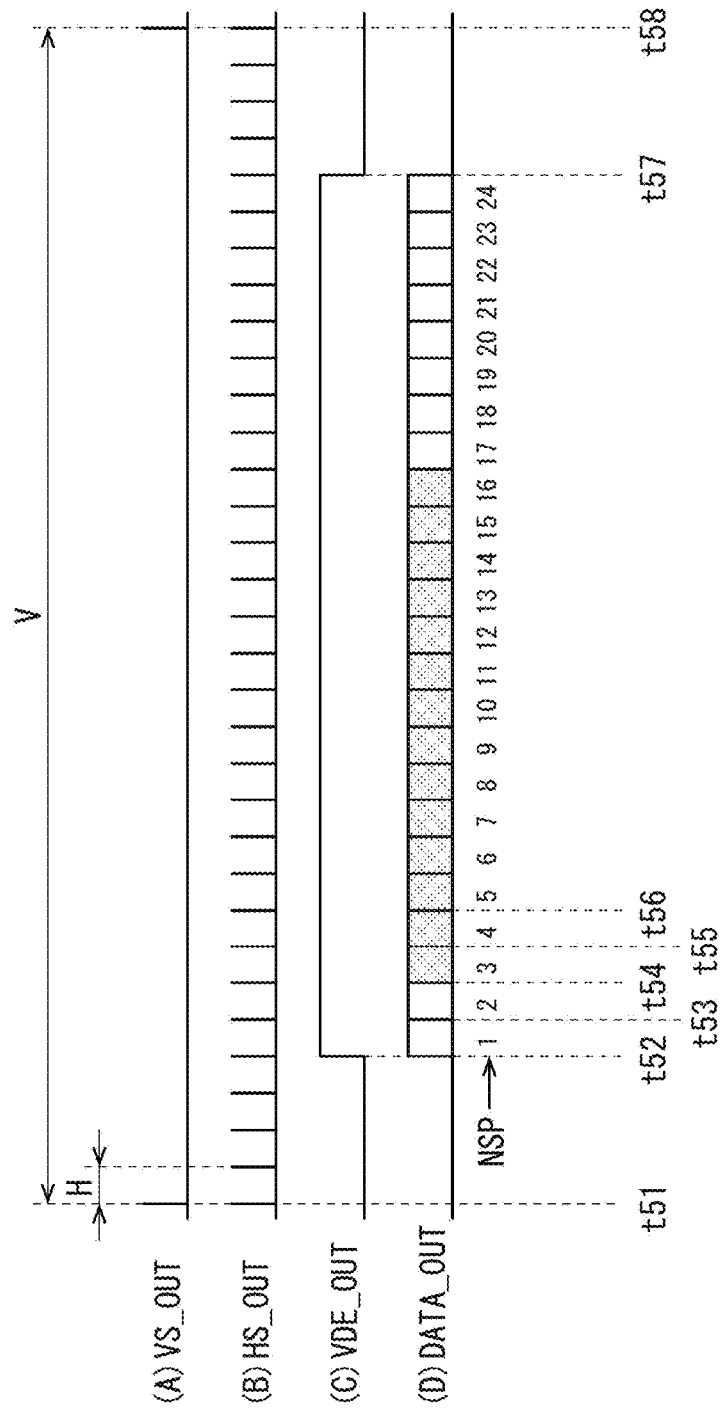
FIG. 41 is a timing chart illustrating an example of output signals of the display controller illustrated in FIG. 36.

FIG. 41 illustrates an example of signals to be outputted from the display controller 56, where (A) indicates a waveform of the vertical synchronization signal VS_OUT, (B) indicates a waveform of the horizontal synchronization signal HS_OUT, (C) indicates a waveform of the vertical data enable signal VDE_OUT, and (D) indicates the data signal DATA_OUT. In (D) of FIG. 41, an unshaded portion indicates a piece of image data related to the entire image P1, and a shaded portion indicates a piece of image data related to the partial image P2.

As with a case of FIG. 39, at a timing t51, a pulse of the vertical synchronization signal VS_OUT is generated, and the vertical period V starts ((A) of FIG. 41). In addition, a pulse of the horizontal synchronization signal HS_OUT is generated every time the horizontal period H starts ((B) of FIG. 41).

Thereafter, at a timing t52, the vertical data enable signal VDE_OUT changes from the low level to the high level ((C) of FIG. 41). In this example, the display controller 56 outputs 24 pieces of image data as the data signal DATA_OT over 24 horizontal periods H ((D) of FIG. 41). The 24 pieces of image data each correspond to a corresponding one of the 24 pieces of image data in the data signal DATA_IN ((D) of FIG. 39). In other words, the 24 pieces of image data each correspond to a corresponding one of the pieces of image data in 24 rows included in the image signal SP illustrated in (B) of FIG. 37 and FIG. 38.

The display controller 56 performs control to drive the plurality of pixels PIX in the display panel 27 in units of four pixels PIX disposed in two rows and two columns on the basis of the pieces of image data related to the entire image P1 included in the data signal DATA_OUT. In addition, the display controller 56 performs control to drive the plurality of pixels PIX in the display panel 27 in units of one pixel PIX on the basis of the pieces of data related to the partial image P2 included in the data signal DATA_OUT.

Figure 42:
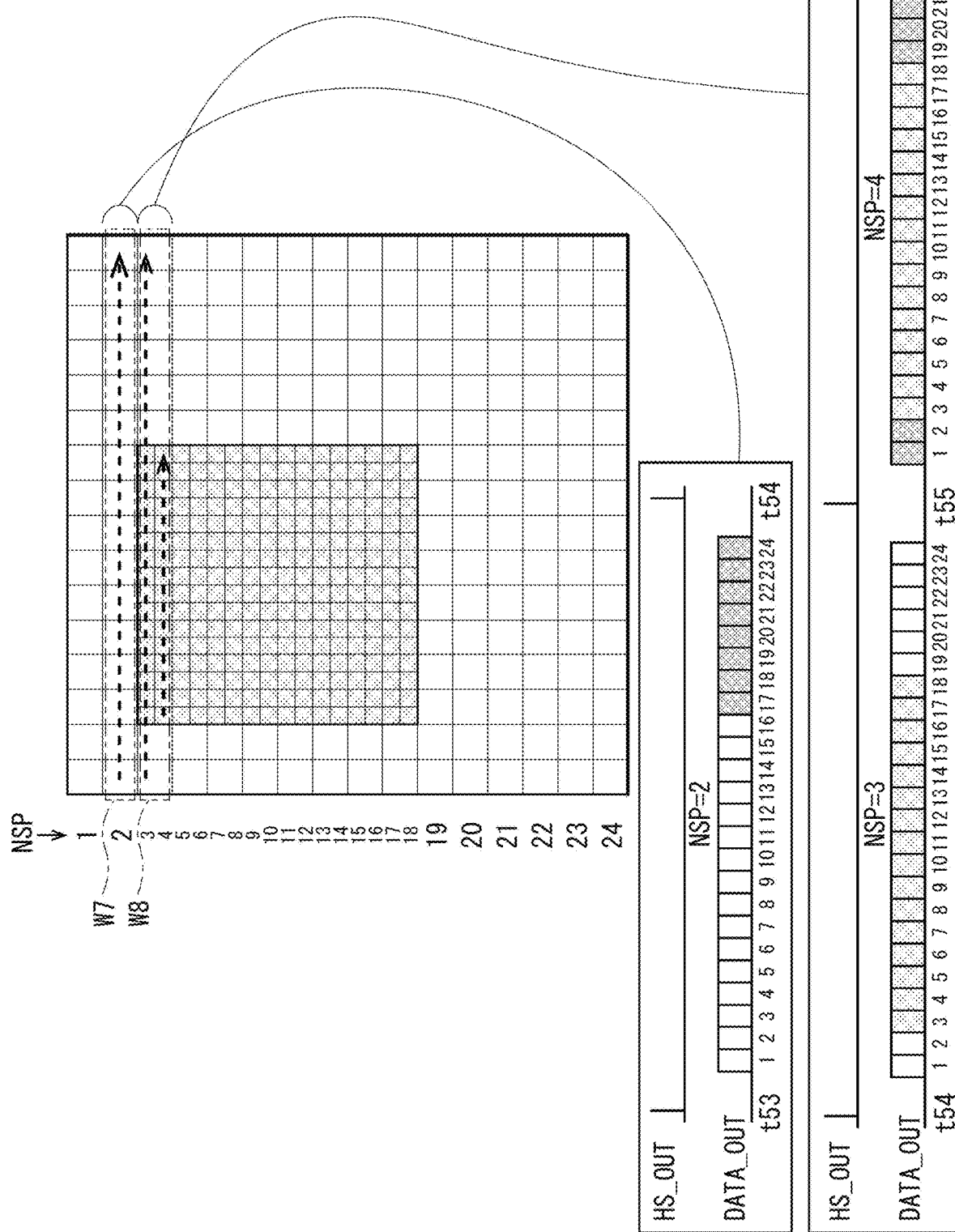
FIG. 42 is another timing chart illustrating an example of output signals of the display controller illustrated in FIG. 36.

FIG. 42 illustrates an example of the data signal DATA_OUT from a timing t53 to a timing t56 in FIG. 41, and a display driving operation based on the data signal DATA_OUT.

The display panel 27 performs a display driving operation on two pixel lines L indicated by a sign W7 in FIG. 42 in a period from the timing t53 to a timing t54.

In this period from the timing t53 to the timing t54, as illustrated in FIG. 42, the display controller 56 outputs, as the data signal DATA_OUT, a piece of image data including sixteen pixel values related to the entire image P1 and eight pixel values representing black. The data number NSP of this piece of image data is "2". The display controller 56 performs control to drive two pixel lines L corresponding to the data number NSP=2 in units of four pixels PIX on the basis of the sixteen pixel values.

Thus, the pixel signal generation circuit 32 writes a pixel signal related to the entire image P1 to two pixel lines L indicated by the sign W7 in FIG. 42

Next, the display panel 27 performs the display driving operation on two pixel lines L indicated by a sign W8 in FIG. 42 in a period from the timing t54 to the timing t56.

First, in a period from the timing 154 to a timing t55, as illustrated in FIG. 42, the display controller 56 outputs, as the data signal DATA_OUT, a piece of image data including two pixel values related to the entire image P1 that are first and second pixel values, sixteen pixel values related to the partial image P2 that are third to eighteenth pixel values, and six pixel values related to the entire image P1 that are nineteenth to 24th pixel values. The data number NSP of this piece of image data is "3". The display controller 56 knows that this piece of image data includes the pixel values related to the partial image P2, on the basis of the piece of image position data. Thereafter, the display controller 56 performs control to drive two pixel lines L corresponding to the data number NSP=3 and 4 in units of four pixels PIX on the basis of eight (two and six) pixel values in total related to the entire image P1. In addition, the display controller 56 performs control to drive the two pixel lines L corresponding to the data number NSP=3 and 4 in units of two pixels PIX on the basis of the sixteen pixel values related to the partial image P2.

Figure 43:
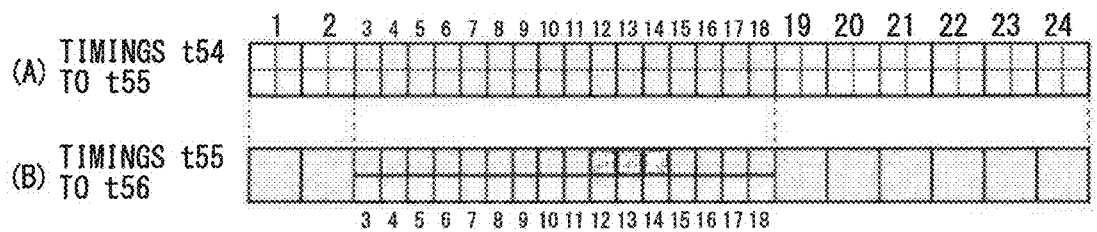
FIG. 43 is an explanatory diagram illustrating an example of a pixel driving operation in a head-mounted display illustrated in FIG. 36.

FIG. 43 illustrates an example of a display driving operation on two pixel lines L indicated by the sign W8 in FIG. 42, where (A) indicates an operation from the timing t54 to the timing t55, and (B) indicates an operation from the timings t55 to the timing t56. As illustrated in (A) of FIG. 43, from the timing t54 to the timing t55, the pixel signal generation circuit 32 writes the pixel signals corresponding to the first to 24th pixel values to the pixels PIX corresponding to these pixel values.

In the next period from the timing t55 to a timing t66, as illustrated in FIG. 42, the display controller 56 outputs, as the data signal DATA_OUT, a piece of image data including two pixel values representing black that are first and second pixel values, sixteen pixel values related to the partial image P2 that are third to eighteenth pixel values, and six pixel values representing black that are nineteenth to 24th pixel values. The data number NSP of this piece of image data is "4". The display controller 56 knows that this piece of image data includes the pixel values related to the partial image P2, on the basis (A of the piece of image position data. Thereafter, the display controller 56 performs control to drive one pixel line L corresponding to the data number NSP=4 in units of one pixel PIX on the basis of the sixteen pixel values related to the partial image P2.

As illustrated in (B) of FIG. 43, from the timing t55 to the timing t56, the pixel signal generation circuit 32 writes the pixel signals corresponding to the sixteen pixel values that are the third to eighteenth pixel values to the pixels PIX corresponding to these pixel values. In addition, the pixel signal generation circuit 32 does not write the pixel value to the pixels PIX other than these pixels PIX.

Thus, as illustrated in (A) and (B) of FIG. 43, the pixel signal generation circuit 32 writes the pixel signals related to the entire image P1 or the pixel signals related to the partial image P2 to all the pixels PIX in two pixel lines L indicated by the sign W8 in FIG. 42 in the period from the timing t54 to the timing t56.

As illustrated in FIG. 41, even after this, the display controller 26 and the display panel 27 operate similarly. Thereafter, at a timing t57, the vertical data enable signal VDE_OUT changes from the high level to the low level ((C) of FIG. 41). Thereafter, at a timing t58, this vertical period V ends, and the next vertical period V starts.

Thus, in the display system 2, the head-mounted display 50 receives a piece of first image data having one or a plurality of pixel values included in the entire image P1 having the first resolution, a piece of second image data having one or a plurality of pixel values included in the partial image P2 having the second resolution higher than the first resolution, and a piece of third image data having one or a plurality of pixel values included in the entire image P1 in this order. Here, the piece of first image data includes, for example, first and second pixel values related to the entire image P1 in a piece of image data with the data number NSP=3 in FIG. 38. The piece of second image data includes, for example, third to eighteenth pixel values related to the partial image P2 in the piece of image data with the data number NSP=3 in FIG. 38. The piece of third image data includes, for example, nineteenth to 24th pixel values related to the entire image P1 in the piece of image data with the data number NSP=3 in FIG. 38. Thereafter, the head-mounted display 20 performs first driving, second driving, and third driving. In the first driving, a plurality of pixels PIX is driven in units of four pixels PIX on the basis of the piece of first image data. In the second driving, a plurality of pixels PIX is driven in units of two pixels PIX on the basis of the piece of second image data. In the third driving, a plurality of pixels PIX is driven in units of four pixels PIX on the basis of the piece of third image data. Here, each of the first driving, the second driving, and the third driving is, for example, driving illustrated in (A) of FIG. 43 based on the piece of image data with the data number NSP=3. Specifically, for example, the first driving is driving based on the first and second pixel values, the second driving is driving based on the third to eighteenth pixel values, and the third driving is driving based on the nineteenth to 24th pixel values. This allows the head-mounted display 50 to perform a display driving operation in order of reception on the basis of the piece of first image data, the piece of second image data, and the piece of third image data, which makes it possible to omit, for example, a frame memory. Thus, in the head-mounted display 50, it is possible to reduce power consumption.

As described above, in the present embodiment, the piece of first image data having one or a plurality of pixel values included in an entire image having the first resolution, the piece of second image data having one or a plurality of pixel values included in a partial image having the second resolution higher than the first resolution, and the piece of third image data having one or a plurality of pixel values included in the entire image are received in this order. Thereafter, the first driving, the second driving, and the third driving are performed. In the first driving, a plurality of pixels is driven in units of four pixels on the basis of the piece of first image data. In the second driving, a plurality of pixels is driven in units of two pixels on the basis of the piece of second image data. In the third driving, a plurality of pixels is driven in units of four pixels on the basis of the piece of third image data. This makes it possible to reduce power consumption. Other effects are similar to those in the first embodiment described above.

Modification Example 2-1

In the embodiment described above, the entire image P1 and the partial image P2 are used, but the embodiment is not limited thereto. Instead of this, for example, three or more images may be used as with the modification example 1-5. An example in a case where three images are used is described in detail below.

Example 1-5

As with the case of the modification example 1-5 (FIG. 29) described above, the image generation circuit 41 according to the present modification example generates the entire image P1 representing a scenery corresponding to the direction of the head-mounted display 50 in a virtual space on the basis of a result of detection by the acceleration sensor 22 included in a piece of data supplied from the reception circuit 13. In addition, the image generation circuit 41 specifies the partial images P2 and P3 each representing a portion at which the user is looking of the scenery corresponding to the direction of the head-mounted display 50 in the virtual space on the basis of a result of detection by the eye-tracking sensor 23 included in the piece of data supplied from the reception circuit 13.

Figure 44:
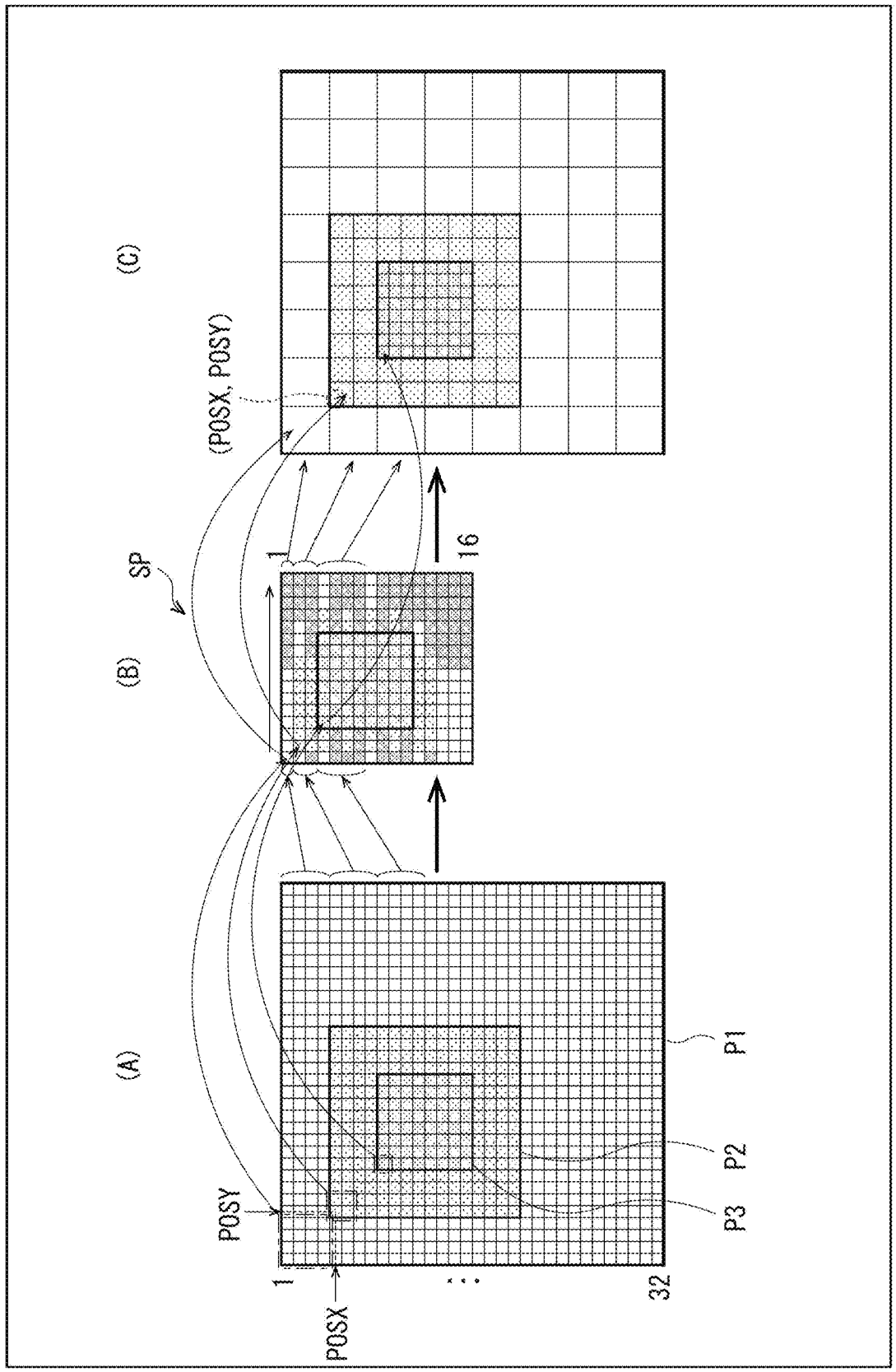
FIG. 44 is an explanatory diagram illustrating an operation example of a display system according to a modification example of the second embodiment.

FIG. 44 illustrates an operation example of the display system 2 according to the present modification example, where (A) indicates an image generated by the image generation circuit 41, (B) indicates pieces of image data included in the image signal SP, and (C) indicates a display driving operation in the head-mounted display 50 according to the present modification example.

As illustrated in (A) and (B) of FIG. 44, the transmission signal generation circuit 48 according to the present modification example performs left-to-right scanning from top to bottom sequentially on the entire image P1 generated by the image generation circuit 41 to thereby generate the image signal SP. The transmission signal generation circuit 48 converts sixteen pixel values disposed in four rows and four columns in a portion not overlapping the partial image P2 of the entire image P1 into one pixel value, converts four pixel values disposed in two rows and two columns in a portion that overlaps the partial image P2 and does not overlap the partial image P3 of the entire image P1 into one pixel value, and outputs one pixel value as it is in a portion overlapping the partial image P3 of the entire image P1, thereby generating pieces of image data in the image signal SP.

Specifically, in this example, the transmission signal generation circuit 48 converts sixteen pixel values disposed in four rows and four columns into one pixel value on the basis of 128 pixel values included in the first to fourth rows of the entire image P1 to thereby generate one pixel value related to the entire image P1. Thereafter, the transmission signal generation circuit 48 generates eight pixel values representing black. Thus, the transmission signal generation circuit 48 generates a piece of image data in the first row in the image signal SP.

In addition, the transmission signal generation circuit 48 converts sixteen pixel values disposed in four rows and four columns into one pixel value on the basis of sixteen pixel values belonging to first to fourth columns of 128 pixel values included in the fifth to eighth rows of the entire image P1 to thereby generate one pixel value related to the entire image P1. The transmission signal generation circuit 48 converts four pixel values disposed in two rows and two columns into one pixel value on the basis of 32 pixel values related to the partial image P2 of 64 pixel values included in the fifth and sixth rows of the entire image P1 to thereby generate eight pixel values related to the partial image P2. The transmission signal generation circuit 48 converts sixteen pixel values disposed in four rows and four columns into one pixel value on the basis of 48 pixel values belonging to 21st to 32nd columns of the 128 pixel values included in the fifth to eighth rows of the entire image P1 to thereby generate three pixel values related to the entire image P1. Thereafter, the transmission signal generation circuit 48 generates three pixel values representing black. Thus, the transmission signal generation circuit 48 generates a piece of image data in the second row in the image signal SP.

In addition, the transmission signal generation circuit 48 generates one pixel value representing black. The transmission signal generation circuit 48 converts four pixel values disposed in two rows and two columns into one pixel value on the basis of 32 pixel values related to the partial image P2 of 64 pixel values included in seventh and eighth rows of the entire image P1 to thereby generate eight pixel values related to the partial image P2. Thereafter, the transmission signal generation circuit 48 generates seven pixel values representing black. Thus, the transmission signal generation circuit 48 generates a piece of image data in the third row in the image signal SP.

In addition, the transmission signal generation circuit 48 converts sixteen pixel values disposed in four rows and four columns into one pixel value on the basis of sixteen pixel values belonging to the first to fourth columns of 128 pixel values included in ninth to twelfth rows of the entire image P1 to thereby generate one pixel value related to the entire image P1. The transmission signal generation circuit 48 converts four pixel values disposed in two rows and two columns into one pixel value on the basis of eight pixel values belonging to the fifth to eighth columns of 64 pixel values included in the ninth and tenth rows of the entire image P1 to generate two pixel values related to the partial image P2. The transmission signal generation circuit 48 outputs eight pixel values related to the partial image P3 of 32 pixel values included in the ninth row of the entire image P1 as they are. The transmission signal generation circuit 48 converts four pixel values disposed in two rows and two columns into one pixel value on the basis of eight pixel values belonging to seventeenth to 20th columns of the 64 pixel values included in the ninth and tenth rows of the entire image P1 to thereby generate two pixel values related to the partial image P2. Thereafter, the transmission signal generation circuit 48 converts sixteen pixel values disposed in four rows and four columns into one pixel value on the basis of 48 pixel values belonging to the 21st to 32nd columns of the 128 pixel values included in the ninth to twelfth rows of the entire image P1 to thereby generate three pixel values related to the entire image P1. Thus, the transmission signal generation circuit 48 generates a piece of image data in the fourth row in the image signal SP.

In addition, the transmission signal generation circuit 48 generates three pixel values representing black. The transmission signal generation circuit 48 outputs eight pixel values related to the partial image P3 of 32 pixel values included in the tenth row of the entire image P1 as they are. Thereafter, the transmission signal generation circuit 48 generates five pixel values representing black. Thus, the transmission signal generation circuit 48 generates a piece of image data in the fifth row in the image signal SP.

In addition, the transmission signal generation circuit 48 generates one pixel value representing black. The transmission signal generation circuit 48 converts four pixel values disposed in two rows and two columns into one pixel value on the basis of eight pixel values belonging to fifth to eighth columns of 64 pixel values included in the eleventh and twelfth rows of the entire image P1 to thereby generate two pixel values related to the partial image P2. The transmission signal generation circuit 48 outputs eight pixel values related to the partial image P3 of 32 pixel values included in the eleventh row of the entire image P1. The transmission signal generation circuit 48 converts four pixel values disposed in two rows and two columns into one pixel value on the basis of eight pixel values belonging to the seventeenth to 20th columns of the 64 pixel values included in the eleventh and twelfth rows of the entire image P1 to thereby generate two pixel values related to the partial image P2. Thereafter, the transmission signal generation circuit 48 generates three pixel values representing black. Thus, the transmission signal generation circuit 48 generates a piece of image data in the sixth row in the image signal SP.

In addition, the transmission signal generation circuit 48 generates three pixel values representing black. The transmission signal generation circuit 48 outputs eight pixel values related to the partial image P3 of 32 pixel values included in the twelfth row of the entire image P1 as they are. Thereafter, the transmission signal generation circuit 48 generates five pixel values representing black. Thus, the transmission signal generation circuit 48 generates a piece of image data in the seventh row in the image signal SP.

As described above, the transmission signal generation circuit 48 converts sixteen pixel values disposed in four rows and four columns in the portion not overlapping the partial image P2 of the entire image P1 into one pixel value. In addition, the transmission signal generation circuit 48 converts four pixel values disposed in two rows and two columns in the portion that overlap the partial image P2 and does not overlap the partial image P3 of the entire image P1 into one pixel value. The transmission signal generation circuit 48 outputs pixel values as they are in the portion overlapping the partial image P3 of the entire image P1. As a result, in the image signal SP, the resolution of the entire image P1 becomes lower than the resolution of the partial image P2, and the resolution of the partial image P2 becomes lower than the resolution of the partial image P3.

Thus, the transmission signal generation circuit 48 generates pieces of image data including a plurality of pixel values as illustrated in (B) of FIG. 44, on the basis of the image generated by the image generation circuit 41. Thereafter, the transmission signal generation circuit 48 generates the image pixel SP including the pieces of image data and the piece of image position data representing the position (parameters POSX and POSY) of the partial image P2 in the entire image P1.

Figure 45:
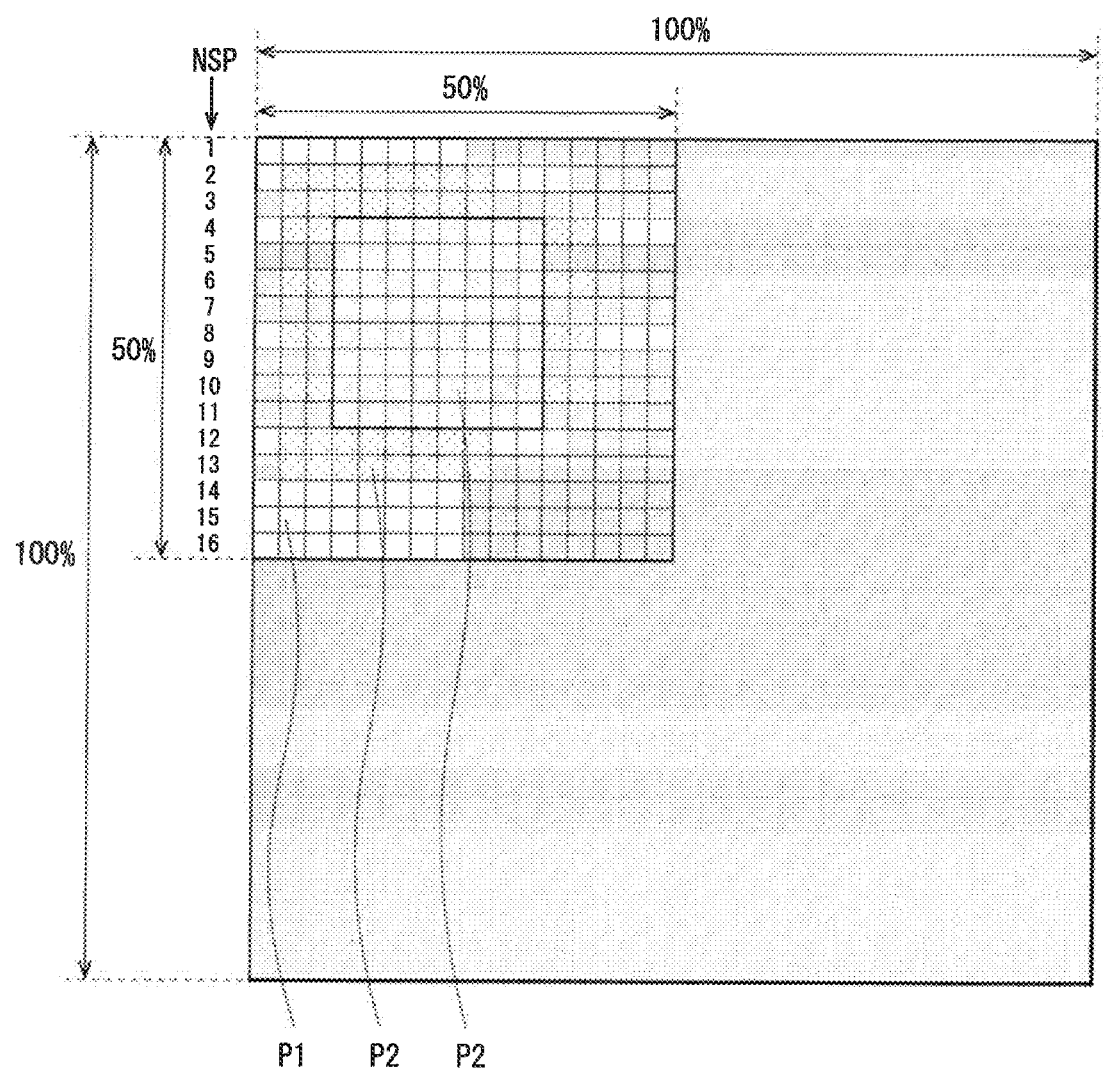
FIG. 45 is an explanatory diagram illustrating a transmission band of the display system according to the modification example of the second embodiment.

FIG. 45 illustrates a transmission band in the display system 2 according to the present modification example. The pieces of image data included in the image signal SP in this example include pieces of image data for sixteen rows. The number of pixel values in the pieces of image data included in the image signal SP is 25% (=0.5×0.5) of the number of pixel values included in the entire image P1. Thus, it is possible for the display system 2 to reduce an image data amount, as compared with a case where the entire image P1 before conversion is transmitted as it is.

Figure 46:
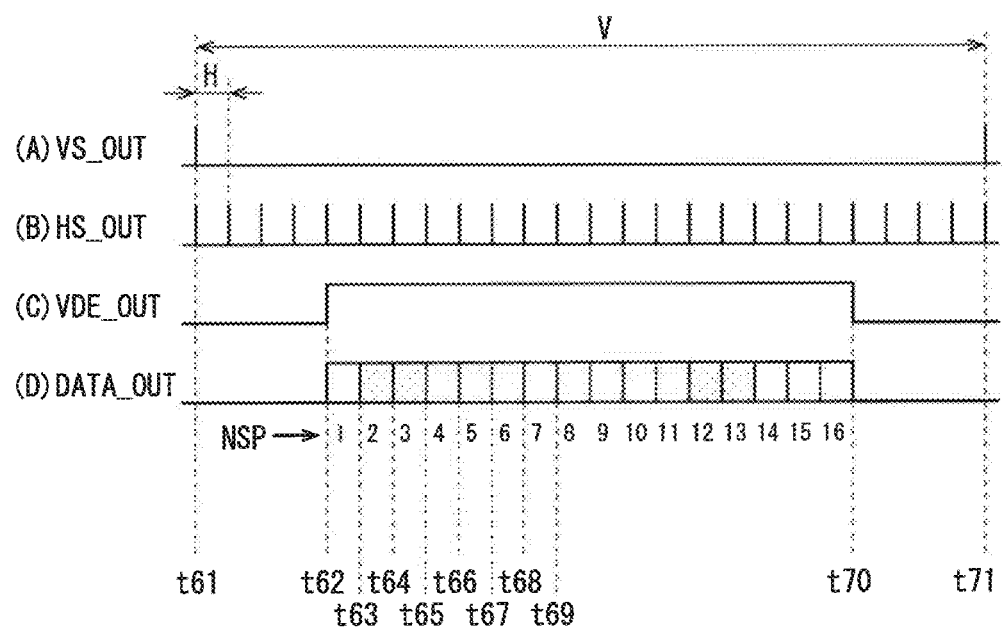
FIG. 46 is a timing chart illustrating an example of output signals of a display controller according to the modification example of the second embodiment.

FIG. 46 illustrates an example of signals to be outputted from the display controller 56, where (A) indicates a waveform of the vertical synchronization signal VS_OUT, (B) indicates a waveform of the horizontal synchronization signal HS_OUT, (C) indicates a waveform of the vertical data enable signal VDE_OUT, and (D) indicates the data signal DATA_OUT.

At a timing 161, a pulse of the vertical synchronization signal VS_OUT is generated, and the vertical period V starts ((A) of FIG. 46). In addition, a pulse of the horizontal synchronization signal HS_OUT is generated every time the horizontal period H starts ((B) of FIG. 46).

Thereafter, at a timing t62. the vertical data enable signal VDE_OUT changes from the low level to the high level ((C) of FIG. 46). In this example, the display controller 56 outputs, as the data signal DATA_OUT, sixteen pieces of image data over sixteen horizontal periods H ((D) of FIG. 46).

The display controller 56 performs control to drive the plurality of pixels PIX in the display panel 27 in units of sixteen pixels PIX disposed in four rows and four columns on the basis of the pieces of image data related to the entire image P1 included in the data signal DATA_OUT. The display controller 56 performs control to drive the plurality of pixels PIX in the display panel 27 in units of four pixels PIX disposed in two rows and two columns on the basis of pieces of image data related to the partial image P2 included in the data signal DATA_OUT. In addition, the display controller 56 performs control to drive the plurality of pixels PIX in the display panel 27 in units of one pixel PIX on the basis of pieces of data related to the partial image P3 included in the data signal DATA_OUT.

Figure 47:
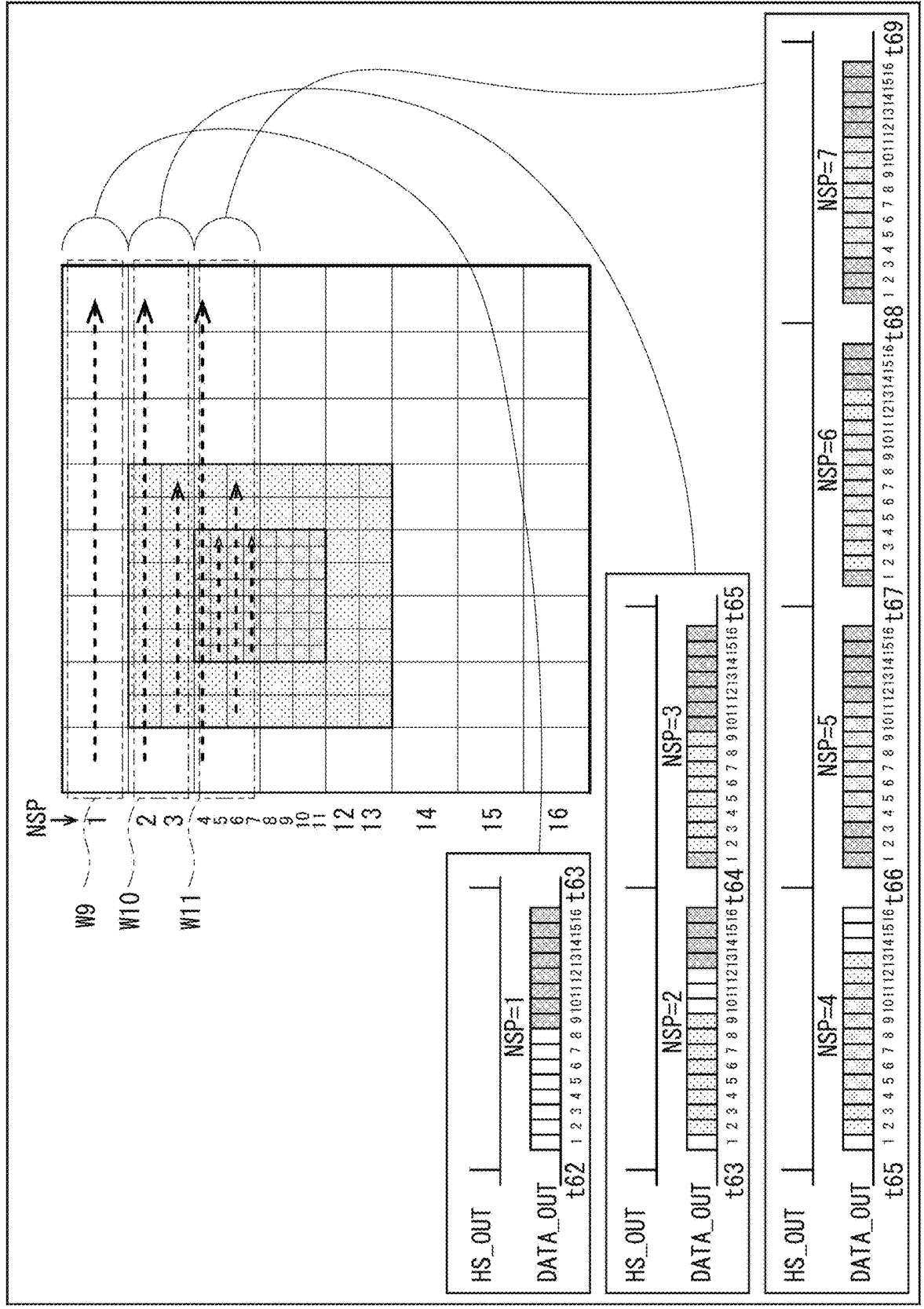
FIG. 47 is another timing chart illustrating an example of output signals of the display controller according to the modification example of the second embodiment.

FIG. 47 illustrates an example of the data signal DATA_OUT from the timing t62 to a timing t69 in FIG. 46, and a display driving operation based on the data signal DATA_OUT.

The display panel 27 performs a display driving operation on four pixel lines L indicated by a sign W9 in FIG. 47 in a period from the timing t62 to a timing t63.

In this period from the timing t62 to the timing t63, as illustrated in FIG. 47, the display controller 56 outputs, as the data signal DATA_OUT, a piece of image data including eight pixel values related to the entire image P1, and eight pixel values representing black. The data number NSP of this piece of image data is "1". The display controller 56 performs control to drive four pixel lines L corresponding to the data number NSP=1 in units of sixteen pixels PIX on the basis of the eight pixel values.

Thus, the pixel signal generation circuit 32 writes a pixel signal related to the entire image P1 to two pixel lines L indicated by the sign W9 in FIG. 47.

Next, the display panel 27 performs the display driving operation on four pixel lines L indicated by a sign W10 in FIG. 47 in a period from the timing t63 to a timing 165.

First, in a period from the timing t63 to a timing t64, as illustrated in FIG. 47, the display controller 56 outputs, as the data signal DATA_OUT, a piece of image data including one pixel value related to the entire image P1 that is a first pixel value, eight pixel values related to the partial image P2 that are second to ninth pixel values, three pixel values related to the entire image P1 that are tenth to twelfth pixel values, and four pixel values of black that are thirteenth to sixteenth pixel values. The data number NSP of this piece of image data is "2". The display controller 56 knows that this piece of image data includes the pixel values related to the partial image P2, on the basis of the piece of image position data. Thereafter, the display controller 56 performs control to drive four pixel lines L corresponding to the data number NSP=2 and 3 in units of sixteen pixels PIX on the basis of four (one and three) pixel values in total related to the entire image P1. In addition, the display controller 56 performs control to drive the four pixel lines L corresponding to the data number NSP=2 and 3 in units of eight pixels PIX on the basis of eight pixel values related to the partial image P2.

FIG. 48 illustrates an example of a display driving operation on four pixel lines L indicated by the sign W10 in FIG. 47, where (A) indicates an operation from the timing t63 to the timing t64, and (B) indicates an operation from the timing t64 to the timing t65. As illustrated in (A) of FIG. 48, from the timing t63 to the timing t64, the pixel signal generation circuit 32 writes the pixel signals corresponding to the first to twelfth pixel values to the pixels PIX corresponding to these pixel values.

In the next period from the timing t64 to the timing t65, as illustrated in FIG. 47, the display controller 56 outputs, as the data signal DATA_OUT, a piece of image data including one pixel value representing black that is a first pixel value, eight pixel values related to the partial image P2 that are second to ninth pixel values, and seven pixel values representing black that are tenth to sixteenth pixel values. The data number NSP of this piece of image data is "3". The display controller 56 knows that this piece of image data includes the pixel values related to the partial image P2, on the basis of the piece of image position data. Thereafter, the display controller 56 performs control to drive two pixel lines L corresponding to the data number NSP=3 in units of four pixels PIX on the basis of the eight pixel values related to the partial image P2.

As illustrated in (B) of FIG. 48, from the timing t64 to the timing t65, the pixel signal generation circuit 32 writes the pixel signals corresponding to the eight pixel values that are the second to ninth pixel values to the pixels PIX corresponding to these pixel values. In addition, the pixel signal generation circuit 32 does not write the pixel value to the pixels PIX other than these pixels PIX.

Thus, as illustrated in (A) and (B) of FIG. 48, the pixel signal generation circuit 32 writes the pixel signals related to the entire image P1 or the pixel signals related to the partial image P2 to all the pixels PIX in four pixel lines L indicated by the sign W10 in FIG. 47 in the period from the timing t63 to the timing t65.

Next, the display panel 27 performs the display driving operation on four pixel lines L indicated by a sign W11 in FIG. 47 in a period from the timing t65 to the timing t69.

First, in a period from the timing t65 to the timing t66, as illustrated in FIG. 47, the display controller 56 outputs, as the data signal DATA_OUT, a piece of image data including one pixel value related to the entire image P1 that is a first pixel value, two pixel values related to the partial image P2 that are second and third pixel values, eight pixel values related to the partial image P3 that are fourth to eleventh pixel values, two pixel values related to the partial image P1 that are twelfth and thirteenth pixel values, and three pixel values related to the entire image P1 that are fourteenth to sixteenth pixel values. The data number NSP of this piece of image data is "4". The display controller 56 knows that this piece of image data includes the pixel values related to the partial images P2 and P3, on the basis of the piece of image position data. Thereafter, the display controller 56 performs control to drive four pixel lines L corresponding to the data number NSP=4 to 7 in units of sixteen pixels PIX on the basis of the one pixel value and the three pixel values related to the entire image P1. In addition, the display controller 56 performs control to drive the four pixel lines L corresponding to the data number NSP=4 to 7 in units of eight pixels PIX on the basis of the four pixel values related to the partial image P2. In addition, the display controller 56 performs control to drive the four pixel lines L corresponding to the data number NSP=4 to 7 in units of eight pixels PIX on the basis of eight pixel values related to the partial image P3.

FIG. 49 illustrates an example of a display driving operation on four pixel lines L indicated by a sign W11 in FIG. 47, where (A) indicates an operation from the timing 165 to the timing t66, (B) indicates an operation from the timings 166 to a timing 167, (C) indicates an operation from the timing t67 to a timing t68, and (D) indicates an operation from the timing t68 to the timing t69. As illustrated in (A) of FIG. 49, from the timing 165 to the timing 166, the pixel signal generation circuit 32 writes the pixel signals corresponding to the first to sixteenth pixel values to the pixels PIX corresponding to these pixel values.

In the next period from the timing t66 to the timing t67, as illustrated in FIG. 47, the display controller 56 outputs, as the data signal DATA_OUT, a piece of image data including three pixel values representing black that are first to third pixel values, eight pixel values related to the partial image P3 that are fourth to eleventh pixel values, and five pixel values representing black that are twelfth to sixteenth pixel values. The data number NSP of this piece of image data is "5". The display controller 56 knows that this piece of image data includes the pixel values related to the partial image P3, on the basis of the piece of image position data. Thereafter, the display controller 56 performs control to drive one pixel line L corresponding to the data number NSP=5 in units of one pixel PIX on the basis of eight pixel values related to the partial image P3.

As illustrated in (B) of FIG. 49, from the timing t66 to the timing t67, the pixel signal generation circuit 32 writes the pixel signals corresponding to the eight pixel values that are the fourth to eleventh pixel values to the pixels PIX corresponding to these pixel values. In addition, the pixel signal generation circuit 32 does not write the pixel value to the pixels PIX other than these pixels PIX.

In the next period from the timing t67 to the timing t68, as illustrated in FIG. 47, the display controller 56 outputs, as the data signal DATA_OUT, a piece of image data including one pixel value representing black that is a first pixel value, two pixel values related to the partial image P2 that are second and third pixel values, eight pixel values related to the partial image P3 that are fourth to eleventh pixel values, two pixel values related to the partial image P1 that are twelfth and thirteenth pixel values, and three pixel values representing black that are fourteenth to sixteenth pixel values. The data number NSP of this piece of image data is "6". The display controller 56 knows that this piece of image data includes the pixel values related to the partial images P2 and P3, on the basis of the piece of image position data. Thereafter, the display controller 56 performs control to drive two pixel lines L corresponding to the data number NSP=6 and 7 in units of four pixels PIX on the basis of the two pixel values and the two pixel values related to the partial image P2. In addition, the display controller 56 performs control to drive the two pixel lines L corresponding to the data number NSP=6 and 7 in units of two pixels PIX on the basis of the eight pixel values related to the partial image P3.

As illustrated in (C) of FIG. 49, from the timing t67 to the timing t68, the pixel signal generation circuit 32 writes the pixel signals corresponding to the second to thirteenth pixel values to the pixels PIX corresponding to these pixel values. In addition, the pixel signal generation circuit 32 does not write the pixel value to the pixels PIX other than these pixels PIX.

In the next period from the timing t68 to the timing t69, as illustrated in FIG. 47, the display controller 56 outputs, as the data signal DATA_OUT, a piece of image data including three pixel values representing black that are first to third pixel values, eight pixel values related to the partial image P3 that are fourth to eleventh pixel values, and five pixel values representing black that are twelfth to sixteenth pixel values. The data number NSP of this piece of image data is "7". The display controller 56 knows that this piece of image data includes the pixel values related to the partial image P3, on the basis of the piece of image position data. Thereafter, the display controller 56 performs control to drive one pixel line L corresponding to the data number NSP=7 in units of one pixel PIX on the basis of the eight pixel values related to the partial image P3.

As illustrated in (D) of FIG. 49, from the timing 168 to the timing t69, the pixel signal generation circuit 32 writes the pixel signals corresponding to the eight pixel values that are the fourth to eleventh pixel values to the pixels PIX corresponding to these pixel values. In addition, the pixel signal generation circuit 32 does not write the pixel value to the pixels PIX other than these pixels PIX.

Thus, as illustrated in (A) to (D) of FIG. 49, the pixel signal generation circuit 32 writes the pixel signals related to the entire image P1, the pixel signals related to the partial image P2, or the pixel signals related to the partial image P3 to all the pixels PIX in four pixel lines L indicated by the sign W11 in FIG. 47 in the period from the timing t65 to the timing t69.

As illustrated in FIG. 46, even after this, the display controller 26 and the display panel 27 operate similarly. Thereafter, at a timing t170, the vertical data enable signal VDE_OUT changes from the high level to the low level ((C) of FIG. 46). Thereafter, at a timing t71, this vertical period V ends, and the next vertical period V starts.

Modification Example 2-21

The modification examples 1-1 or 1-4 of the first embodiment described above may be applied to the display system 2 according to the embodiment described above.

3. Application Examples

Next, description is given of application examples of the display systems described in the embodiments described above and the modification examples.

Specific Example 1

FIG. 50 illustrates an example of an appearance of a head-mounted display 110. The head-mounted display 110 includes ear hook sections 112 for mounting on the head of a user on both sides of a glasses-shaped display section 111. The technology according to the embodiments described above and the like is applicable to such a head-mounted display 110.

Specific Example 2

FIG. 51 illustrates an example of an appearance of another head-mounted display 120. The head-mounted display 120 is a see-through head-mounted display including a main body section 121, an arm section 122, and a barrel section 123. The head-mounted display 120 is mounted on glasses 128. The main body section 121 includes a control substrate for controlling an operation of the head-mounted display 120, and a display section. This display section outputs image light of a display image. The arm section 122 couples the main body section 121 and the barrel section 123 to each other, and supports the barrel section 123. The barrel section 123 projects the image light supplied from the main body section 121 through the arm section 122 toward a user's eye through a lens 129 of the glasses 128. The technology according to the embodiments described above and the like is applicable to such a head-mounted display 120.

It is to be noted that the head-mounted display 120 is a so-called light guide plate system head-mounted display, but is not limited thereto. For example, the head-mounted display 120 may be, for example, what is called a birdbath system head-mounted display. The birdbath system head-mounted display includes, for example, a beam splitter, and a partially transparent mirror. The beam splitter outputs light encoded with image information toward the mirror, and the mirror reflects the light toward the user's eye. Both of the beam splitter and the partially transparent mirror are partially transparent. This causes light from an ambient environment to reach the user's eye.

Application Example 3

FIGS. 52A and 52B illustrate an example of an appearance of a digital still camera 130. FIG. 52A illustrates a front view, and FIG. 52B illustrates a rear view. The digital still camera 130 is an interchangeable lens single-lens reflex type camera, and includes a camera main body section (camera body) 131, a photographing lens unit 132, a grip section 133, a monitor 134, and an electronic view finder 135. The photographing lens unit 312 is an interchangeable lens unit, and is provided almost in the vicinity of a middle of a front surface of the camera main body section 311. The grip section 133 is provided on left side of the front surface of the camera main body section 311, and a photographer grasps the grip section 133. The monitor 134 is provided on left side from almost a middle of a rear surface of the camera main body section 131. The electronic view finder 135 is provided above the monitor 14 on the rear surface of the camera main body section 131. The photographer looks into the electronic view finder 135, thereby making it possible to visually recognize a light image of a subject guided from the photographing lens unit 132 and determine a composition. The technology according to the embodiments described above and the like is applicable to the electronic view finder 135.

Application Example 4

FIG. 53 illustrates an example of an appearance of a television apparatus 140. The television apparatus 140 includes an image display screen section 141 including a front panel 142 and filter glass 143. The technology according to the embodiments described above and the like is applicable to the image display screen section 141.

Application Example 5

FIG. 54 illustrates an example of an appearance of a smartphone 150. The smartphone 150 includes a display section 151 that displays various types of information, and an operation section 152 including a button that receives operation input by a user, and the like. The technology according to the embodiments described above and the like is applicable to the display section 151.

Application Example 6

FIGS. 55A and 55B illustrate a configuration example of a vehicle to which the technology of the present disclosure is applied. FIG. 56A illustrates an example of a vehicle interior viewed from the rear of a vehicle 200, and FIG. 56B illustrates the vehicle interior viewed from the left rear of the vehicle 200.

The vehicle in FIGS. 55A and 55B includes a center display 201, a console display 202, a head-up display 203, a digital rearview mirror 204, a steering wheel display 205, and a rear entertainment display 106.

The center display 201 is provided at a location opposed to a driver seat 262 and a passenger seat 263 in a dashboard 261. FIG. 55A illustrates an example of the horizontally long center display 201 extending from side of the driver seat 262 to side of the passenger seat 263, but the screen size and installation location of the center display 201 are not limited thereto. The center display 201 is allowed to display information detected by various sensors. As a specific example, the center display 201 is configured to display a shot image captured by an image sensor, a distance image to an obstacle in front of the vehicle or on a side of the vehicle measured by a ToF sensor, the temperature of an occupant detected by an infrared sensor, and the like. It is possible to use the center display 201 for displaying, for example, at least one of safety relevant information, operation relevant information, a lifelog, health relevant information, authentication/identification relevant information, or entertainment relevant information.

The safety relevant information includes information based on results of detection by sensors, such as drowsiness detection, looking-away detection, detection of tampering by a child in the vehicle, detection of whether or not a seat belt is fastened, and detection of a left-behind occupant. The operation relevant information includes information about a gesture related to an operation by an occupant detected with use of a sensor. The gesture may include operations of various facilities in the vehicle, and includes, for example, operations of an air-conditioning facility, a navigation device, an AV (Audio Visual) device, a lighting device, and the like. The lifelog includes lifelogs of all occupants. For example, the lifelog includes behavior recording of each occupant. Obtaining and storing the lifelog makes it possible to confirm the condition of the occupant at the time of occurrence of an accident. The health relevant information includes information about the temperature of an occupant detected with use of a temperature sensor, and a health condition of the occupant presumed on the basis of the detected temperature. Alternatively, information about the health condition of the occupant may be presumed on the basis of an image of the face of the occupant captured by an image sensor. In addition, the information about the health condition of the occupant may be presumed on the basis of answer contents of the occupant obtained by performing conversation with the occupant with use of automated voice. The authentication/identification relevant information includes information about a keyless entry function in which facial recognition is performed with use of a sensor, a function of automatedly adjusting the height and position of a seat by facial identification, and the like. The entertainment relevant information includes information about an operation of an AV device by an occupant detected by a sensor and information about contents to be displayed that are suitable for an occupant detected and recognized by a sensor.

It is possible to use the console display 202, for example, for displaying lifelog information. The console display 202 is disposed near a shift lever 265 in a center console 264 between the driver seat 262 and the passenger seat 263. The console display 202 is also configured to display information detected by various sensors. In addition, the console display 202 may display an image around the vehicle captured by an image sensor, or may display a distance image to an obstacle around the vehicle.

The head-up display 203 is virtually displayed at the back of a windshield 266 in front of the driver seat 262. It is possible to use the head-up display 203 for displaying, for example, at least one of safety relevant information, operation relevant information, a lifelog, health relevant information, authentication/identification relevant information, or entertainment relevant information. The head-up display 203 is often virtually disposed in front of the driver seat 262, and is therefore suitable to display information directly related to an operation of the vehicle such as speed of the vehicle, a fuel level, and remaining battery life.

The digital rearview mirror 204 is configured not only to display a rear side of the vehicle but also to display the state of an occupant on a backseat; therefore, it is possible to use the digital rearview mirror 204, for example, for displaying lifelog information about the occupant on the backseat.

The steering wheel display 205 is disposed around the center of a steering wheel 267 of the vehicle. It is possible to use the steering wheel display 205 for displaying, for example, at least one of safety relevant information, operation relevant information, a lifelog, health relevant information, authentication/identification relevant information, or entertainment relevant information. Specifically, the steering wheel display 205 is disposed near a driver's hand, and is therefore suitable to display lifelog information such as the temperature of the driver or to display information related to operations of an AV device, an air-conditioning facility, and the like.

The rear entertainment display 206 is mounted on rear surface side of the driver seat 262 or the passenger seat 263, and is for being watched by an occupant on a backseat. It is possible to use the rear entertainment display 206 for displaying, for example, at least one of safety relevant information, operation relevant information, a lifelog, health relevant information, authentication/identification relevant information, or entertainment relevant information. Specifically, the rear entertainment display 206 is disposed in front of the occupant on the backseat, and therefore displays information related to the occupant on the backseat. The rear entertainment display 206 may display, for example, information related to the operations of an AV device and an air-conditioning facility, or may display a result obtained by measuring the temperature or the like of the occupant on the backseat by a temperature sensor 5.

The technology according to the embodiments described above and the like is applicable to the center display 201, the console display 202, the head-up display 203, the digital rearview mirror 204, the steering wheel display 205, and the rear entertainment display 206.

The present technology has been described above with reference to some embodiments, the modification examples, and the application examples to electronic apparatuses, but the present technology is not limited to the embodiments and the like, and may be modified in a variety of ways.

For example, in the embodiments described above, the acceleration sensor 22 and the eye-tracking sensor 23 are provided in the head-mounted display 20, but this is not limitative. For example, these sensors may not be provided. In this case, the image generation circuit 11 specifies, as the partial image P2, a portion where an image changes of the entire image P1.

In the embodiments described above and the like, the present technology is applied to the head-mounted display, but this is not limitative. For example, the present technology is applicable to various electronic apparatuses that are configured to display an image, such as a monitor and a projector.

The present technology is applicable not only to a closed system described in the embodiments described above, but also to a video see-through system and a mixed reality system.

In addition, the present technology is applicable to various simulators such as a flight simulator, and applications for gaming, projection mapping, and the like.

In addition, in the embodiments described above, the display panel 27 illustrated in FIG. 5 is used, but this is not limitative. A display panel 27E according to the present modification example is described in detail below.

FIG. 56 illustrates a configuration example of the display panel 27E. The display panel 27E includes a pixel array 31E, the pixel signal generation circuit 32, the scanning circuit 33, and a drive circuit 34E.

The pixel array 31E includes a plurality of signal lines SGL, a plurality of control lines CTL, a plurality of control lines WSEN, and a plurality of pixels PIX. The plurality of control lines WSEN extends in the vertical direction (the longitudinal direction in FIG. 56), and is provided side by side in the horizontal direction (the lateral direction in FIG. 56). The plurality of control lines WSEN each supplies a control signal generated by the drive circuit 34E to the pixels PIX.

The drive circuit 34E is configured to generate a control signal and apply the generated control signal to the plurality of control lines WSEN, thereby performing control on the pixels PIX to which the pixel signal generated by the pixel signal generation circuit 32 is to be written to determine which pixel PIX of the plurality of pixels PIX the pixel signal is to be written to.

FIG. 57 illustrates a configuration example of the pixel PIX. The pixel array including this pixel PIX includes a control line WSL. The control lines CTL illustrated in FIG. 56 include this control line WSL. The pixel PIX includes transistors MN01 to MN03, a capacitor C01, and a light-emitting element EL. The transistors MN01 to MN03 are N-type MOSFETs (Metal Oxide Semiconductor Field Effect Transistors). The transistor MN01 has a gate coupled to the control line WSEN, a drain coupled to the signal line SGL, and a source coupled to a drain of the transistor MN02. The transistor MN02 has a gate coupled to the control line WSL, the drain coupled to the source of the transistor MN01, and a source coupled to a gate of the transistor MN03 and the capacitor C01. The capacitor C01 has one end coupled to the source of the transistor MN02 and the gate of the transistor MN03, and another end coupled to a source of the transistor MN03 and an anode of the light-emitting element EL. The transistor MN03 has the gate coupled to the source of the transistor MN02 and the one end of the capacitor C01, a drain coupled to a power supply line VCCP, and the source coupled to the other end of the capacitor C01 and the anode of the light-emitting element EL. The light-emitting element EL is, for example, an organic EL light-emitting element, and has the anode coupled to the source of the transistor MN03 and the other end of the capacitor C01, and a cathode coupled to a power supply line Vcath.

With this configuration, in the pixel PIX, the transistors MN01 and MN02 are turned on to thereby set a voltage between both ends of the capacitor C01 on the basis of a pixel signal supplied from the signal line SGL. The transistor MN03 causes a current corresponding to the voltage between both ends of the capacitor C01 to flow into the light-emitting element EL. The light-emitting element EL emits light on the basis of the current supplied from the transistor MN03. Thus, the pixel PIX emits light with luminance corresponding to the pixel signal.

In an example in FIG. 12, as illustrated in (A) of FIG. 12, in the period from the timing t14 to the timing t15, the display controller 26 performs control to drive the plurality of pixels PIX in the display panel 27E in units of four pixels PIX on the basis of pieces of image data of the entire image P1. As illustrated in FIG. 10, in the period from the timing t14 to the timing t15, the scanning circuit 33 of the display panel 27 scans the plurality of pixels PIX in scanning units US of two pixel lines L. The drive circuit 34E sets all the control lines WSEN active (high level). The pixel signal generation circuit 32 applies the same pixel signal to two signal lines SGL adjacent to each other. Accordingly, the same pixel signal is written to four pixels PIX in selected two pixel lines L. Thus, the display panel 27E drives the plurality of pixels PIX in units UD of four pixels PIX.

In addition, as illustrated in (B) of FIG. 12, in the period from the timing t15 to the timing t16, the display controller 26 performs control to drive a plurality of pixels PIX disposed in a region corresponding to the partial image P2 of the plurality of pixels PIX in the display panel 27E in units of one pixel PIX on the basis of a piece of image data of the partial image P2 and a piece of data about the position of the partial image P2. As illustrated in FIG. 11, from the timing t15 to the timing t16, the scanning circuit 33 of the display panel 27E scans the plurality of pixels PIX in scanning units US of one pixel line L. The drive circuit 34E sets a plurality of control lines WSEN related to the region corresponding to the partial image P2 active (high level), and sets a plurality of other control lines WSEN inactive (low level). The pixel signal generation circuit 32 applies each of a plurality of pixel signals to a corresponding one of a plurality of signal lines SGL related to the region corresponding to the partial image P2 of the plurality of signal lines SGL. Accordingly, each of a plurality of pixel signals is written to a corresponding one of a plurality of pixels PIX related to the region corresponding to the partial image P2 in selected one pixel line L. Meanwhile, a pixel signal is not written to a plurality of pixels PIX related to a region other than the region corresponding to the partial image P2. Thus, the display panel 27E drives the plurality of pixels PIX in units UD of one pixel PIX.

In addition, as illustrated in (C) of FIG. 12, in the period from the timing t16 to the timing t17, the display controller 26 performs control to drive a plurality of pixels PIX provided in a region corresponding to the partial image P2 of the plurality of pixels PIX in the display panel 27 in units of one pixel PIX on the basis of a piece of image data of the partial image P2 and the piece of data about the position of the partial image P2. This operation is similar to the operation in the period from the timing t15 to the timing t16 illustrated in (B) of FIG. 12.

The configuration of the pixel PIX is not limited to the example in FIG. 57. Some examples of the configuration of the pixel PIX are described below.

FIG. 58 illustrates another configuration example of the pixel PIX. The pixel array including this pixel PIX includes the control line WSL, a control line DSL, and a control line AZSL. The control lines CTL illustrated in FIG. 56 include the control lines WSL, DSL, and AZSL. This pixel PIX includes transistors MP11 and MP12, capacitors C11 and C12, transistors MP13 to MP15, and the light-emitting element EL. The transistors MP11 to MP15 are P-type MOSFETs. The transistor MP11 has a gate coupled to the control line WSEN, a source coupled to the signal line SGL, and a drain coupled to a source of the transistor MP12. The transistor MP12 has agate coupled to the control line WSL, the source coupled to the drain of the transistor MP11, and a drain coupled to a gate of the transistor MP14 and the capacitor C12. The capacitor C11 has one end coupled to the power supply line VCCP, and another end coupled to the capacitor C12, a drain of the transistor MP13, and a source of the transistor MP14. The capacitor C12 has one end coupled to the other end of the capacitor C11, the drain of the transistor MP13, and the source of the transistor MP14, and another end coupled to the drain of the transistor MP12 and the gate of the transistor MP14. The transistor MP13 has a gate coupled to the control line DSL, a source coupled to the power supply line VCCP, and the drain coupled to the source of the transistor MP14, the other end of the capacitor C11, and the one end of the capacitor C12. The transistor MP14 has the gate coupled to the drain of the transistor MP12 and the other end of the capacitor C12, the source coupled to the drain of the transistor MP13, the other end of the capacitor C11, and the one end of the capacitor C12, and a drain coupled to the anode of the light-emitting element EL and a source of the transistor MP15. The transistor MP15 has a gate coupled to the control line AZSL, the source coupled to the drain of the transistor MP14 and the anode of the light-emitting element EL, and a drain coupled to a power supply line VSS.

With this configuration, in the pixel PIX, the transistors MP11 and MP12 are turned on to thereby set a voltage between both ends of the capacitor C12 on the basis of the pixel signal supplied from the signal line SGL. The transistor MP13 is turned on or off on the basis of a signal of the control line DSL. The transistor MP14 causes a current corresponding to the voltage between both ends of the capacitor C12 to flow into the light-emitting element EL in a period in which the transistor MP13 is turned on. The light-emitting element EL emits light on the basis of the current supplied from the transistor MP14. Thus, the pixel PIX emits light with luminance corresponding to the pixel signal. The transistor MP15 is turned on or off on the basis of a signal of the control line AZSL. In a period in which the transistor MP15 is turned on, a voltage of the anode of the light-emitting element EL is set to a voltage of the power supply line VSS, thereby being initialized.

FIG. 59 illustrates another configuration example of the pixel PIX. The pixel array including this pixel PIX includes the control line WSL, the control line DSL, and the control line AZSL. The control lines CTL illustrated in FIG. 56 include the control lines WSL, DSL, and AZSL. This pixel PIX includes transistors MN21 and MN22, a capacitor C21, transistors MN23 to MN25, and the light-emitting element EL. The transistors MN21 to MN25 are N-type MOSFETs. The transistor MN21 has a gate coupled to the control line WSEN, a drain coupled to the signal line SGL, and a source coupled to a drain of the transistor MN22. The transistor MN22 has a gate coupled to the control line WSL, the drain coupled to the source of the transistor MN21, and a source coupled to a gate of the transistor MN24 and the capacitor C21. The capacitor C21 has one end coupled to the source of the transistor MN22 and the gate of the transistor MN24, and another end coupled to a source of the transistor MN24 and a drain of the transistor MN25, and the anode of the light-emitting element EL. The transistor MN23 has a gate coupled to the control line DSL, a drain coupled to the power supply line VCCP, and a source coupled to a drain of the transistor MN24. The transistor MN24 has the gate coupled to the source of the transistor MN22 and the one end of the capacitor C21, the drain coupled to the source of the transistor MN23, and the source coupled to the other end of the capacitor C21, the drain of the transistor MN25, and the anode of the light-emitting element EL. The transistor MN25 has a gate coupled to the control line AZSL, the drain coupled to the source of the transistor MN24, the other end of the capacitor C21, and the anode of the light-emitting element EL, and a source coupled to the power supply line VSS.

With this configuration, in the pixel PIX, the transistors MN21 and MN22 are turned on to thereby set a voltage between both ends of the capacitor C21 on the basis of the pixel signal supplied from the signal line SGL. The transistor MN23 is turned on or off on the basis of a signal of the control line DSL. The transistor MN24 causes a current corresponding to the voltage between both ends of the capacitor C21 to flow into the light-emitting element EL in a period in which the transistor MN23 is turned on. The light-emitting element EL emits light on the basis of the current supplied from the transistor MP24. Thus, the pixel PIX emits light with luminance corresponding to the pixel signal. The transistor MN25 is turned on or off on the basis of a signal of the control line AZSL. In a period in which the transistor MN25 is turned on, the voltage of the anode of the light-emitting element EL is set to the voltage of the power supply line VSS, thereby being initialized.

FIG. 60 illustrates another configuration example of the pixel PIX. The pixel array including this pixel PIX includes the control line WSL, the control line DSL, and control lines AZSL1 and AZSL2. The control lines CTL illustrated in FIG. 56 include the control lines WSL, DSL, AZSL1, and AZSL2. This pixel PIX includes transistors MP31 and MP32, a capacitor C31, transistors MP33 to MP36, and the light-emitting element EL. The transistors MP31 to MP36 are P-type MOSFETs. The transistor MP31 has a gate coupled to the control line WSEN, a source coupled to the signal line SGL, and a drain coupled to a source of the transistor MP32. The transistor MP32 has a gate coupled to the control line WSL, the source coupled to the drain of the transistor MP31, and a drain coupled to a gate of the transistor MP33, a source of the transistor MP34, and the capacitor C31. The capacitor C31 has one end coupled to the power supply line VCCP, and another end coupled to the drain of the transistor MP32, the gate of the transistor MP33, and the source of the transistor MP34. The transistor MP34 has a gate coupled to the control line AZSL1, the source coupled to the drain of the transistor MP32, the gate of the transistor MP33, and the other end of the capacitor C31, and a drain coupled to a drain of the transistor MP33 and a source of the transistor MP35. The transistor MP35 has a gate coupled to the control line DSL, the source coupled to the drains of the transistors MP33 and MP34, and a drain coupled to a source of the transistor MP36 and the anode of the light-emitting element EL. The transistor MP36 has a gate coupled to the control line AZSL2, the source coupled to the drain of the transistor MP35 and the anode of the light-emitting element EL, and a drain coupled to the power supply line VSS.

With this configuration, in the pixel PIX, the transistors MP31 and MP32 are turned on to thereby set a voltage between both ends of the capacitor C31 on the basis of the pixel signal supplied from the signal line SGL. The transistor MP35 is turned on or off on the basis of a signal of the control line DSL. The transistor MP33 causes a current corresponding to the voltage between both ends of the capacitor C31 to flow into the light-emitting element EL in a period in which the transistor MP35 is turned on. The light-emitting element EL emits light on the basis of the current supplied from the transistor MP33. Thus, the pixel PIX emits light with luminance corresponding to the pixel signal. The transistor MP34 is turned on or off on the basis of a signal of the control line AZSL1. In a period in which the transistor MP34 is turned on, the drain and the gate of the transistor MP33 are coupled to each other. The transistor MP36 is turned on or off on the basis of a signal of the control line AZSL2. In a period in which the transistor MP36 is turned on, the voltage of the anode of the light-emitting element EL is set to the voltage of the power supply line VSS, thereby being initialized.

FIG. 61 illustrates another configuration example of the pixel PIX. The pixel array including this pixel PIX includes control lines WSL1 and WSL2, the control line DSL, the control lines AZSL1 and AZSL2, signal lines SGL1 and SGL2, capacitors C48 and C49, and a transistor MP49. The control lines CTL illustrated in FIG. 56 include the control lines WSL1, WSL2, DSL, AZSL1, and AZSL2. The signal lines SGL illustrated in FIG. 56 include the signal lines SGL1 and SGL2. The capacitor C48 has one end coupled to the signal line SGL1, and another end coupled to the power supply line VSS. The capacitor C49 has one end coupled to the signal line SGL1, and another end coupled to the signal line SGL2. The transistor MP49 is a P-type MOSFET, and has a gate coupled to the control line WSL2, a source coupled to the signal line SGL1, and a drain coupled to the signal line SGL2.

The pixel PIX includes transistors MP41 and MP42, a capacitor C41, transistors MP43 to MP46, and the light-emitting element EL. The transistors MP41 to MP46 are P-type MOSFETs. The transistor MP41 has a gate coupled to the control line WSEN, a source coupled to the signal line SGL2, and a drain coupled to a source of the transistor MP42. The transistor MP42 has a gate coupled to the control line WSL1, the source coupled to the drain of the transistor MP41, and a drain coupled to a gate of the transistor MP43 and the capacitor C41. The capacitor C41 has one end coupled to the power supply line VCCP, and another end coupled to the drain of the transistor MP42 and the gate of the transistor MP43. The transistor MP43 has the gate coupled to the drain of the transistor MP42 and the other end of the capacitor C41, a source coupled to the power supply line VCCP, and a drain coupled to sources of the transistors MP44 and MP45. The transistor MP44 has a gate coupled to the control line AZSL1, the source coupled to the drain of the transistor MP43 and the source of the transistor MP45, and a drain coupled to the signal line SGL2. The transistor MP45 has a gate coupled to the control line DSL, the source coupled to the drain of the transistor MP43 and the source of the transistor MP44, and a drain coupled to a source of the transistor MP46 and the anode of the light-emitting element EL. The transistor MP46 has a gate coupled to the control line AZSL2, the source coupled to the drain of the transistor MP45 and the anode of the light-emitting element EL, and a drain coupled to the power supply line VSS.

With this configuration, in the pixel PIX, the transistors MP41 and MP42 are turned on to thereby set a voltage between both ends of the capacitor C41 on the basis of the pixel signal supplied from the signal line SGL1 through the capacitor C49. The transistor MP45 is turned on or off on the basis of a signal of the control line DSL. The transistor MP43 causes a current corresponding to the voltage between both ends of the capacitor C41 to flow into the light-emitting element EL in a period in which the transistor MP45 is turned on. The light-emitting element EL emits light on the basis of the current supplied from the transistor MP43. Thus, the pixel PIX emits light with luminance corresponding to the pixel signal. The transistor MP44 is turned on or off on the basis of a signal of the control line AZSL1. In a period in which the transistor MP44 is turned on, the drain of the transistor MP43 and the signal line SGL2 are coupled to each other. The transistor MP46 is turned on or off on the basis of the control line AZSL2. In a period in which the transistor MP46 is turned on, the voltage of the anode of the light-emitting element EL is set to the voltage of the power supply line VSS, thereby being initialized.

FIG. 62 illustrates another configuration example of the pixel PIX. The pixel array including this pixel PIX includes the control line WSL, the control line DSL, and the control line AZSL, signal lines SGL1 SGL2, and controllers 70 and 80. The control lines CTL illustrated in FIG. 56 include the control lines WSL, DSL, and AZSL. The signal lines SGL illustrated in FIG. 56 include the signal lines SGL1 and SGL2.

The controller 70 includes transistors MN71 and MP72, a capacitor C71, and a transistor MP73. The transistor MN71 is an N-type MOSFET, and the transistors MP72 and MP73 are P-type MOSFETs. The transistor MN71 has a gate to be supplied with a control signal, a drain coupled to a source of the transistor MP72 and the signal line SGL1, and a source coupled to a drain of the transistor MP72, the capacitor C71, and a drain of the transistor MP73. The transistor MP72 has a gate to be supplied with a control signal, a source coupled to the drain of the transistor MN71 and the signal line SGL1, and a drain coupled to the source of the transistor MN71, the capacitor C71, and a drain of the transistor MP73. The transistors MN71 and MP72 configure a transmission gate. The capacitor C71 has one end coupled to the source of the transistor MN71, the drain of the transistor MP72, and the drain of the transistor MP73, and another end coupled to the signal line SGL2. The transistor MP73 has agate coupled to a control line REFL, a source coupled to a power supply line Vref, and the drain coupled to the source of the transistor MN71, the drain of the transistor MP72, and the capacitor C71.

The controller 80 includes transistors MN81 and MP82, a capacitor C81, and transistors MP83, MN84, MP85, and MP86. The transistors MN81 and MN84 are N-type MOSFETs, and the transistors MP82, MP83, MP85, and MP86 are P-type MOSFETs. The transistor MN81 has a gate to be supplied with a control signal, a drain coupled to a source of the transistor MP82 and the signal line SGL1, and a source coupled to a drain of the transistor MP82. The transistor MP82 has a gate to be supplied with a control signal, the source coupled to the drain of the transistor MN81 and the signal line SGL1, and the drain coupled to the source of the transistor MN81. The transistors MN81 and MP82 configure a transmission gate. A pixel signal generated by the pixel signal generation circuit 32 is supplied to the source of the transistor MN81 and the drain of the transistor MP82. The capacitor C81 has one end coupled to the signal line SGL1, and another end coupled to the power supply line VSS. The transistor MP83 has a gate to be supplied with a control signal, a drain coupled to a source of the transistor MN84 and signal line SGL2, and a source coupled to a drain of the transistor MN84 and a power supply line Vorst. The transistor MN84 has a gate to be supplied with a control signal, the source coupled to the drain of the transistor MP83 and the signal line SGL2, and the drain coupled to the source of the transistor MP83 and the power supply line Vorst. The transistors MP83 and MN84 configure a transmission gate. The transistor MP85 has a gate coupled to a control line INIL, a drain coupled to the signal line SGL2, and a source coupled to a power supply line Vini. The transistor MP86 has a gate coupled to a control line ELL, a drain coupled to the signal line SGL2, and a source coupled to a power supply line Vel.

The pixel PIX includes transistors MP91 and MP92, a capacitor C91, transistors MP93 to MP96, and the light-emitting element EL. The transistors MP91 to MP96 are P-type MOSFETs. The transistor MP91 has a gate coupled to the control line WSEN, a source coupled to the signal line SGL2, and a drain coupled to a source of the transistor MP92. The transistor MP92 has a gate coupled to the control line WSL, the source coupled to the drain of the transistor MP91, and a drain coupled to a gate of the transistor MP93 and the capacitor C91. The capacitor C91 has one end coupled to the power supply line Vel, and another end coupled to the drain of the transistor MP92 and the gate of the transistor MP93. The transistor MP93 has the gate coupled to the drain of the transistor MP92 and the other end of the capacitor C91, a source coupled to the power supply line Vel, and a drain coupled to sources of the transistors MP94 and MP95. The transistor MP94 has a gate coupled to the control line AZSL, the source coupled to the drain of the transistor MP93 and the source of the transistor MP95, and a drain coupled to the signal line SGL2. The transistor MP95 has a gate coupled to the control line DSL, the source coupled to the drain of the transistor MP93 and the source of the transistor MP94, and a drain coupled to a source of the transistor MP96 and the anode of the light-emitting element EL. The transistor MP96 has a gate coupled to the control line AZSL, the source coupled to the drain of the transistor MP95 and the anode of the light-emitting element EL, and a drain coupled to the power supply line VSS.

With this configuration, in the pixel PIX, the transistors MP91 and MP92 are turned on to thereby set a voltage between both ends of the capacitor C91 on the basis of the pixel signal supplied through the transistors MN81 and MP82, the signal line SGL1, the transistors MN71 and MP72, the capacitor C71, and the signal line SGL2. The transistor MP95 is turned on or off on the basis of a signal of the control line DSL. The transistor MP93 causes a current corresponding to the voltage between both ends of the capacitor C91 to flow into the light-emitting element EL in a period in which the transistor MP95 is turned on. The light-emitting element EL emits light on the basis of the current supplied from the transistor MP93. Thus, the pixel PIX emits light with luminance corresponding to the pixel signal. The transistor MP94 and 96 are turned on or off on the basis of a signal of the control line AZSL. In a period in which the transistor MP94 is turned on, the drain of the transistor MP93 and the source of the transistor MP95 are coupled to the signal line SGL2. I In a period in which the transistor MP96 is turned on, the voltage of the anode of the light-emitting element EL is set to a voltage of the power supply line Vorst, thereby being initialized. In addition, the transistor MP85 is turned on or off on the basis of a signal of the control line INIL, the transistor MP86 is turned on or off on the basis of a signal of the control line ELL, and the transistor MP73 is turned on or off on the basis of a signal of the control line REFL. Upon turning on the transistor MP85, the voltage of the signal line SGL2 is set to a voltage of the power supply line *Vini*. Upon turning on the transistor MP86, the voltage of the signal line SGL2 is set to a voltage of the power supply line Vel. Upon turning on the transistor MP73, the end of the capacitor C71 is set to a voltage of the power supply line Vref, thereby being initialized.

FIG. 63 illustrates another configuration example of the pixel PIX. The pixel array including this pixel PIX includes the control line WSL, the control line DSL, and the control lines AZSL1 and AZSL2. The control lines CTL illustrated in FIG. 56 include the control lines WSL, DSL, AZSL1, and AZSL2. This pixel PIX includes transistors MP51 to MP54, a capacitor C51, transistors MP55 to MP60, and the light-emitting element EL. The transistors MP51 to MP60 are P-type MOSFETs. The transistor MP51 has a gate coupled to the control line WSEN, a source coupled to the signal line SGL, and a drain coupled to a source of the transistor MP52. The transistor MP52 has a gate coupled to the control line WSL, the source coupled to the drain of the transistor MP51, and a drain coupled to a drain of the transistor MP53 and a source of the transistor MP54. The transistor MP53 has a gate coupled to the control line DSL, a source coupled to the power supply line VCCP, and the drain coupled to the drain of the transistor MP52 and the source of the transistor MP54. The transistor MP54 has a gate coupled to a source of the transistor MP55, a drain of the transistor MP57, and the capacitor C51, the source coupled to the drains of the transistors MP52 and MP53, and a drain coupled to sources of the transistors MP58 and MP59. The capacitor C51 has one end coupled to the power supply line VCCP, and another end coupled to the gate of the transistor MP54, the source of the transistor MP55, and the drain of the transistor MP57. The capacitor C51 may include two capacitors coupled in parallel to each other. The transistor MP55 has a gate coupled to the control line AZSL1, the source coupled to the gate of the transistor MP54, the drain of the transistor MP57, and the other end of the capacitor C51, and a drain coupled to a source of the transistor MP56. The transistor MP56 has a gate coupled to the control line AZSL1, the source coupled to the drain of the transistor MP55, a drain coupled to the power supply line VSS. The transistor MP57 has a gate coupled to the control line WSL, the drain coupled to the gate of the transistor MP54, the source of the transistor MP55, and the other end of the capacitor C51, and a source coupled to a drain of the transistor MP58. The transistor MP58 has a gate coupled to the control line WSL, the drain coupled to the drain of the transistor MP57, and the source coupled to the drain of the transistor MP54 and the source of the transistor MP59. The transistor 59 has a gate coupled to the control line DSL, the source coupled to the drain of the transistor MP54 and the source of the transistor MP58, and a drain coupled to a source of the transistor MP60 and the anode of the light-emitting element EL. The transistor MP60 has a gate coupled to the control line AZSL2, the source coupled to the drain of the transistor MP59 and the anode of the light-emitting element EL, and a drain coupled to the power supply line VSS.

With this configuration, in the pixel PIX, the transistors MP51, MP52, MP54, MP58, and MP57 are turned on to thereby set a voltage between both ends of the capacitor C51 on the basis of the pixel signal supplied from the signal line SGL. The transistors MP53 and MP59 are turned on or off on the basis of a signal of the control line DSL. The transistor MP54 causes a current corresponding to the voltage between both ends of the capacitor C51 to flow into the light-emitting element EL in a period in which the transistors MP53 and MP59 are turned on. The light-emitting element EL emits light on the basis of the current supplied from the transistor MP54. Thus, the pixel PIX emits light with luminance corresponding to the pixel signal. The transistors MP55 and MP56 are turned on or off on the basis of a signal of the control line AZSL1. In a period in which the transistors MP55 and MP56 are turned on, a voltage of the gate of the transistor MP54 is set to the voltage of the power supply line VSS, thereby being initialized. The transistor MP60 is turned on or off on the basis of a signal of the control line AZSL2. In a period in which the transistor MP60 is turned on, the voltage of the anode of the light-emitting element EL is set to the voltage of the power supply line VSS, thereby being initialized.

FIG. 64 illustrates another configuration example of the pixel PIX. The pixel array including this pixel PIX includes control lines WSENN and WSENP, control lines WSNL and WSPL, the control line AZL, and the control line DSL. The control lines WSEN illustrated in FIG. 56 include the control lines WSENN and WSENP. The control lines CTL illustrated in FIG. 56 include the control lines WSNL, WSPL, AZL, and DSL. A signal of the control line WSENN and a signal of the control line WSENP are signals inverted from each other. A signal of the control line WSNL and a signal of the control line WSPL are signals inverted from each other.

The pixel PIX includes transistors MN61, MP62. MN63, and MP64, capacitors C61 and C62, transistors MN65 to MN67, and the light-emitting element EL. The transistors MN61, MN63, and MN65 to MN67 are N-type MOSFETs, and the transistors MP62 and MP64 are P-type MOSFETs. The transistor MN61 has a gate coupled to the control line WSENN, a drain coupled to the signal line SGL and a source of the transistor MP62, and a source coupled to a drain of the transistor MP62, a drain of the transistor MN63, and a source of the transistor MP64. The transistor MP62 has a gate coupled to the control line WSENP, the source coupled to the signal line SGL and the drain of the transistor MN61, and the drain coupled to the source of the transistor MN61, the drain of the transistor MN63, and the source of the transistor MP64. The transistor MN63 has a gate coupled to the control line WSNL, the drain coupled to the source of the transistor MN61, the drain of the transistor MP62, and the source of the transistor MP64, and a source coupled to a drain of the transistor MP64, the capacitors C61 and C62, and a gate of the transistor MN65. The transistor MP64 has a gate coupled to the control line WSPL, the source coupled to the source of the transistor MN61, the drain of the transistor MP62, and the drain of the transistor MN63, and the drain coupled to the source of the transistor MN63, the capacitors C61 and C62, and the gate of the transistor MN65. The capacitor C61 is configured with use of, for example, a MOM (Metal Oxide Metal) capacitor, and has one end coupled to the source of the transistor MN63, the drain of the transistor MP64, the capacitor C62, and the gate of the transistor MN65, and another end coupled to a power supply line VSS2. It is to be noted that the capacitor C61 may be configured with use of, for example, a MOS capacitor or a MIM (Metal Insulator Metal) capacitor. The capacitor C62 is configured with use of, for example, a MOS capacitor, and has one end coupled to the source of the transistor MN63, the drain of the transistor MP64, the one end of the capacitor C61, and the gate of the transistor MN65, and another end coupled to the power supply line VSS2. It is to be noted that the capacitor C62 may be configured with use of, for example, a MOM capacitor or a MIM capacitor. The transistor MN65 has the gate coupled to the source of the transistor MN63, the drain of the transistor MP64, and the one ends of the capacitors C61 and C62, a drain coupled to the power supply line VCCP, and a source coupled to drains of the transistors MN66 and MN67. The transistor MN66 has a gate coupled to the control line AZL, the drain coupled to the source of the transistor MN65 and the drain of the transistor MN67, and a source coupled to a power supply line VSS1. The transistor MN67 has a gate coupled to the control line DSL, the drain coupled to the source of the transistor MN65 and the drain of the transistor MN66, and a source coupled to the anode of the light-emitting element EL.

With this configuration, in the pixel PIX, at least one of the transistor MN61 or the transistor MP62 is turned on, and at least one of the transistor MN63 or the transistor MP64 is turned on, thereby setting a voltage between both ends of the capacitor C61 and a voltage between both ends of the capacitor C62 on the basis of the pixel signal supplied from the signal line SGL. The transistor MN67 is turned on or off on the basis of a signal of the control line DSL. The transistor MN65 causes a current corresponding to the voltages between both ends of the capacitor C61 and between both ends of capacitor C62 to flow into the light-emitting element EL in a period in which the transistor MN67 is turned on. The light-emitting element EL emits light on the basis of the current supplied from the transistor MP65. Thus, the pixel PIX emits light with luminance corresponding to the pixel signal. The transistor MN66 may be turned on or off on the basis of a signal of the control line AZL. In addition, the transistor MN66 may function as a resistor having a resistance value corresponding to a signal of the control line AZL. In this case, the transistor MN65 and the transistor MN66 configure what is called a source-follower circuit.

It is to be noted that the effects described herein are merely illustrative and non-limiting, and other effects may be provided.

It is to be noted that the present technology may have the following configurations. According to the present technology having the following configurations, it is possible to reduce power consumption.

(1)
    A display device including:
        a reception circuit that is configured to receive a piece of first image data, a piece of second image data, and a piece of third image data in this order, the piece of first image data having one or a plurality of pixel values included in an entire image having a first resolution, the piece of second image data having one or a plurality of pixel values included in a partial image having a second resolution higher than the first resolution, the partial image having an image range narrower than the entire image, and the piece of third image data having one or a plurality of pixel values included in the entire image;
        a display section including a first plurality of pixels, a second plurality of pixels, and a third plurality of pixels; and
        a display drive circuit that is configured to perform first driving, second driving, and third driving, the first driving in which the first plurality of pixels is driven in units of a first number of pixels on the basis of the piece of first image data, the second driving in which the second plurality of pixels is driven in units of a second number of pixels on the basis of the piece of second image data, the second number being smaller than the first number, and the third driving in which the third plurality of pixels is driven in units of the first number of pixels on the basis of the piece of third image data.

(2)

The display device according to (1), in which
the one or plurality of pixel values in the piece of first image data includes a plurality of pixel values in one or a plurality of line images included in the entire image,
the one or plurality of pixel values in the piece of second image data includes a plurality of pixel values in one or a plurality of line images included in the partial image, and
the one or plurality of pixel values in the piece of third image data includes a plurality of pixel values in one or a plurality of line images included in the entire image.

(3)

The display device according to (2), in which the display drive circuit is configured to sequentially perform the first driving, the second driving, and the third driving in this order.

(4)

The display device according to (2) or (3), in which the entire image includes an image corresponding to the partial image.

(5)

The display device according to any one of (2) to (4), in which
the reception circuit is configured to receive the piece of first image data in a first period,
the reception circuit is configured to receive a predetermined piece of image data representing one or a plurality of line images having a predetermined pixel values in a second period after the first period,
the reception circuit is configured to receive the piece of second image data in a third period after the second period,
the reception circuit is configured to receive the predetermined piece of image data in a fourth period after the third period, and
the reception circuit is configured to receive the piece of third image data in a fifth period after the fourth period.

(6)

The display device according to (5), further including an image decompression circuit, in which
a piece of data to be received by the reception circuit is subjected to compression processing,
the image decompression circuit is configured to perform decompression processing on the basis of a result of reception by the reception circuit, and
the display drive circuit is configured to operate on the basis of the piece of first image data, the piece of second image data, and the piece of third image data included in a processing result of the decompression processing.

(7)

The display device according to (1), in which
the one or plurality of pixel values in the piece of first image data includes one or a plurality of pixel values in one line image included in the entire image,
the one or plurality of pixel values included in the piece of second image data includes one or a plurality of pixel values in one line image included in the partial image, and
the one or plurality of pixel values in the piece of third image data includes one or a plurality of pixel values in one line image included in the entire image.

(8)

The display device according to (7), in which the display drive circuit is configured to simultaneously perform the first driving, the second driving, and the third driving.

(9)

The display device according to (7) or (8), in which the entire image does not include an image corresponding to the partial image.

(10)

The display device according to any one of (1) to (9), in which each of the piece of first image data, the piece of second image data, and the piece of third image data has one or a plurality of pixel values representing luminance of a first color, one or a plurality of pixel values representing luminance of a second color, and one or a plurality of pixel values representing luminance of a third color.

(11)

The display device according to any one of (1) to (9), in which each of the piece of first image data, the piece of second image data, and the piece of third image data has one or a plurality of pixel values representing luminance, one or a plurality of pixel values representing a first color difference, and one or a plurality of pixel values representing a second color difference.

(12)

The display device according to any one of (1) to (9), in which
the piece of second image data has one or a plurality of pixel values representing luminance, one or a plurality of pixel values representing a first color difference, and one or a plurality of pixel values representing a second color difference,
a number of the one or plurality of pixel values representing the first color difference is smaller than a number of the one or plurality of pixel values representing the luminance, and
a number of the one or plurality of pixel values representing the second color difference is smaller than the number of the one or plurality of pixel values representing the luminance.

(13)

The display device according to any one of (1) to (9), in which
each of the piece of first image data and the piece of third image data has one or a plurality of pixel values representing luminance, one or a plurality of pixel values representing a first color difference, and one or a plurality of pixel values representing a second color difference, and
the piece of second image data has one or a plurality of pixel values corresponding to luminance.

(14)

The display device according to any one of (1) to (9), in which
each of the piece of first image data and the piece of third image data has one or a plurality of pixel values representing luminance, one or a plurality of pixel values representing a first color difference, and one or a plurality of pixel values representing a second color difference,
a number of the one or plurality of pixel values representing the first color difference is smaller than a number of the one or plurality of pixel values representing the luminance, and
a number of the one or plurality of pixel values representing the second color difference is smaller than the number of the one or plurality of pixel values representing the luminance.

(15)

The display device according to any one of (1) to (14), in which
the display device further includes:
a sensor that is configured to detect which portion in a display region of the display section a user is observing; and
a transmission circuit that is configured to transmit a result of detection by the sensor to an image generation device that is configured to transmit the piece of first image data, the piece of second image data, and the piece of third image data,
the partial image includes an image corresponding to the result of detection by the sensor.

(16)

A display system including:
an image generation device that is configured to transmit a piece of first image data, a piece of second image data, and a piece of third image data in this order, the piece of first image data having one or a plurality of pixel values included in an entire image having a first resolution, the piece of second image data having one or a plurality of pixel values included in a partial image having a second resolution higher than the first resolution, the partial image having an image range narrower than the entire image, and the piece of third image data having one or a plurality of pixel values included in the entire image; and
a display device,
the display device including
a reception circuit that is configured to receive the piece of first image data, the piece of second image data, the piece of third image data in this order,
a display section including a first plurality of pixels, a second plurality of pixels, and a third plurality of pixels, and
a display drive circuit that is configured to perform first driving, second driving, and third driving, the first driving in which the first plurality of pixels is driven in units of a first number of pixels on the basis of the piece of first image data, the second driving in which the second plurality of pixels is driven in units of a second number of pixels on the basis of the piece of second image data, the second number being smaller than the first number, and the third driving in which the third plurality of pixels is driven in units of the first number of pixels on the basis of the piece of third image data.

(17)

The display system according to (16), in which the image generation device is configured to generate a frame image having the second resolution, is configured to specify the partial image in the frame image, and is configured to generate the piece of first image data, the piece of second image data, the piece of third image data by performing first-direction scanning in a second direction sequentially on the basis of the frame image.

(18)

The display system according to (17), in which
the display device further includes
a sensor that is configured to detect which portion in a display region of the display section a user is observing, and
a transmission circuit that is configured to transmit a result of detection by the sensor to the image generation device, and
the image generation device is configured to receive the result of detection by the sensor transmitted from the transmission circuit, and is configured to specify the partial image on the basis of the result of detection by the sensor.

(19)

A display driving including:
receiving a piece of first image data, a piece of second image data, a piece of third image data in this order, the piece of first image data having one or a plurality of pixel values included in an entire image having a first resolution, the piece of second image data having one or a plurality of pixel values included in a partial image having a second resolution higher than the first resolution, the partial image having an image range narrower than the entire image, and the piece of third image data having one or a plurality of pixel values included in the entire image;
performing first driving in which a first plurality of pixels is driven in units of a first number of pixels on the basis of the piece of first image data;
performing second driving in which a second plurality of pixels is driven in units of a second number of pixels on the basis of the piece of second image data, the second number being smaller than the first number; and performing third driving in which a third plurality of pixels is driven in units of the first number of pixels on the basis of the piece of third image data.

This application claims the priority on the basis of Japanese Patent Application No. 2021-183508 filed on Nov. 10, 2021 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display device comprising:
a reception circuit that is configured to receive a piece of first image data, a piece of second image data, and a piece of third image data in this order in a time division manner with use of one interface, the piece of first image data having one or a plurality of pixel values included in an entire image having a first resolution, the piece of second image data having one or a plurality of pixel values included in a partial image having a second resolution higher than the first resolution, the partial image having an image range narrower than the entire image, and the piece of third image data having one or a plurality of pixel values included in the entire image;
a display section including a first plurality of pixels, a second plurality of pixels, and a third plurality of pixels; and
a display drive circuit that is configured to perform first driving, second driving, and third driving, the first driving in which the first plurality of pixels is driven in units of a first number of pixels on a basis of the piece of first image data, the second driving in which the second plurality of pixels is driven in units of a second number of pixels on a basis of the piece of second image data, the second number being smaller than the first number, and the third driving in which the third plurality of pixels is driven in units of the first number of pixels on a basis of the piece of third image data, wherein
each of the piece of first image data and the piece of third image data has one or a plurality of pixel values representing luminance, one or a plurality of pixel values representing a first color difference, and one or a plurality of pixel values representing a second color difference, a number of the one or plurality of pixel values representing the first color difference is smaller than a number of the one or plurality of pixel values representing the luminance, and a number of the one or plurality of pixel values representing the second color difference is smaller than the number of the one or plurality of pixel values representing the luminance.

2. The display device according to claim 1, wherein
the one or plurality of pixel values in the piece of first image data comprises a plurality of pixel values in one or a plurality of line images included in the entire image,
the one or plurality of pixel values in the piece of second image data comprises a plurality of pixel values in one or a plurality of line images included in the partial image, and
the one or plurality of pixel values in the piece of third image data comprises a plurality of pixel values in one or a plurality of line images included in the entire image.

3. The display device according to claim 2, wherein the display drive circuit is configured to sequentially perform the first driving, the second driving, and the third driving in this order.

4. The display device according to claim 2, wherein the entire image includes an image corresponding to the partial image.

5. The display device according to claim 2, wherein
the reception circuit is configured to receive the piece of first image data in a first period,
the reception circuit is configured to receive a predetermined piece of image data representing one or a plurality of line images having a predetermined pixel values in a second period after the first period,
the reception circuit is configured to receive the piece of second image data in a third period after the second period,
the reception circuit is configured to receive the predetermined piece of image data in a fourth period after the third period, and
the reception circuit is configured to receive the piece of third image data in a fifth period after the fourth period.

6. The display device according to claim 5, further comprising an image decompression circuit, wherein
a piece of data to be received by the reception circuit is subjected to compression processing,
the image decompression circuit is configured to perform decompression processing on a basis of a result of reception by the reception circuit, and
the display drive circuit is configured to operate on a basis of the piece of first image data, the piece of second image data, and the piece of third image data included in a processing result of the decompression processing.

7. The display device according to claim 1, wherein
the one or plurality of pixel values in the piece of first image data comprises one or a plurality of pixel values in one line image included in the entire image,
the one or plurality of pixel values included in the piece of second image data comprises one or a plurality of pixel values in one line image included in the partial image, and
the one or plurality of pixel values in the piece of third image data comprises one or a plurality of pixel values in one line image included in the entire image.

8. The display device according to claim 7, wherein the display drive circuit is configured to simultaneously perform the first driving, the second driving, and the third driving.

9. The display device according to claim 7, wherein the entire image does not include an image corresponding to the partial image.

10. The display device according to claim 1, wherein each of the piece of first image data, the piece of second image data, and the piece of third image data has one or a plurality of pixel values representing luminance of a first color, one or a plurality of pixel values representing luminance of a second color, and one or a plurality of pixel values representing luminance of a third color.

11. The display device according to claim 1, wherein each of the piece of first image data, the piece of second image data, and the piece of third image data has one or a plurality of pixel values representing luminance, one or a plurality of pixel values representing a first color difference, and one or a plurality of pixel values representing a second color difference.

12. The display device according to claim 1, wherein
each of the piece of first image data and the piece of third image data has one or a plurality of pixel values representing luminance, one or a plurality of pixel values representing a first color difference, and one or a plurality of pixel values representing a second color difference, and
the piece of second image data has one or a plurality of pixel values corresponding to luminance.

13. The display device according to claim 1, wherein
the display device further comprises:
a sensor that is configured to detect which portion in a display region of the display section a user is observing; and
a transmission circuit that is configured to transmit a result of detection by the sensor to an image generation device that is configured to transmit the piece of first image data, the piece of second image data, and the piece of third image data,
the partial image comprises an image corresponding to the result of detection by the sensor.

14. A display device comprising:
a reception circuit that is configured to receive a piece of first image data, a piece of second image data, and a piece of third image data in this order in a time division manner with use of one interface, the piece of first image data having one or a plurality of pixel values included in an entire image having a first resolution, the piece of second image data having one or a plurality of pixel values included in a partial image having a second resolution higher than the first resolution, the partial image having an image range narrower than the entire image, and the piece of third image data having one or a plurality of pixel values included in the entire image;
a display section including a first plurality of pixels, a second plurality of pixels, and a third plurality of pixels; and
a display drive circuit that is configured to perform first driving, second driving, and third driving, the first driving in which the first plurality of pixels is driven in units of a first number of pixels on a basis of the piece of first image data, the second driving in which the second plurality of pixels is driven in units of a second number of pixels on a basis of the piece of second image data, the second number being smaller than the first number, and the third driving in which the third plurality of pixels is driven in units of the first number of pixels on a basis of the piece of third image data, wherein the piece of second image data has one or a plurality of pixel values representing luminance, one or a plurality of pixel values representing a first color difference, and one or a plurality of pixel values representing a second color difference, a number of the one or plurality of pixel values representing the first color difference is smaller than a number of the one or plurality of pixel values representing the luminance, and a number of the one or plurality of pixel values representing the second color difference is smaller than the number of the one or plurality of pixel values representing the luminance.

15. A display system comprising:

an image generation device that is configured to transmit a piece of first image data, a piece of second image data, and a piece of third image data in this order in a time division manner with use of one interface, the piece of first image data having one or a plurality of pixel values included in an entire image having a first resolution, the piece of second image data having one or a plurality of pixel values included in a partial image having a second resolution higher than the first resolution, the partial image having an image range narrower than the entire image, and the piece of third image data having one or a plurality of pixel values included in the entire image; and a display device, the display device including a reception circuit that is configured to receive the piece of first image data, the piece of second image data, the piece of third image data in this order, a display section including a first plurality of pixels, a second plurality of pixels, and a third plurality of pixels, and a display drive circuit that is configured to perform first driving, second driving, and third driving, the first driving in which the first plurality of pixels is driven in units of a first number of pixels on a basis of the piece of first image data, the second driving in which the second plurality of pixels is driven in units of a second number of pixels on a basis of the piece of second image data, the second number being smaller than the first number, and the third driving in which the third plurality of pixels is driven in units of the first number of pixels on a basis of the piece of third image data, wherein each of the piece of first image data and the piece of third image data has one or a plurality of pixel values representing luminance, one or a plurality of pixel values representing a first color difference, and one or a plurality of pixel values representing a second color difference, a number of the one or plurality of pixel values representing the first color difference is smaller than a number of the one or plurality of pixel values representing the luminance, and a number of the one or plurality of pixel values representing the second color difference is smaller than the number of the one or plurality of pixel values representing the luminance.

16. The display system according to claim 15, wherein the image generation device is configured to generate a frame image having the second resolution, is configured to specify the partial image in the frame image, and is configured to generate the piece of first image data, the piece of second image data, the piece of third image data by performing first-direction scanning in a second direction sequentially on a basis of the frame image.

17. The display system according to claim 16, wherein the display device further includes a sensor that is configured to detect which portion in a display region of the display section a user is observing, and a transmission circuit that is configured to transmit a result of detection by the sensor to the image generation device, and the image generation device is configured to receive the result of detection by the sensor transmitted from the transmission circuit, and is configured to specify the partial image on a basis of the result of detection by the sensor.

18. A display driving method comprising:

receiving a piece of first image data, a piece of second image data, a piece of third image data in this order in a time division manner with use of one interface, the piece of first image data having one or a plurality of pixel values included in an entire image having a first resolution, the piece of second image data having one or a plurality of pixel values included in a partial image having a second resolution higher than the first resolution, the partial image having an image range narrower than the entire image, and the piece of third image data having one or a plurality of pixel values included in the entire image;

performing first driving in which a first plurality of pixels is driven in units of a first number of pixels on a basis of the piece of first image data;

performing second driving in which a second plurality of pixels is driven in units of a second number of pixels on a basis of the piece of second image data, the second number being smaller than the first number; and performing third driving in which a third plurality of pixels is driven in units of the first number of pixels on a basis of the piece of third image data, wherein each of the piece of first image data and the piece of third image data has one or a plurality of pixel values representing luminance, one or a plurality of pixel values representing a first color difference, and one or a plurality of pixel values representing a second color difference, a number of the one or plurality of pixel values representing the first color difference is smaller than a number of the one or plurality of pixel values representing the luminance, and a number of the one or plurality of pixel values representing the second color difference is smaller than the number of the one or plurality of pixel values representing the luminance.

19. A non-transitory computer readable medium storing a program for display driving, the program being executable by at least one processor to perform operations comprising:

receiving a piece of first image data, a piece of second image data, a piece of third image data in this order in a time division manner with use of one interface, the piece of first image data having one or a plurality of pixel values included in an entire image having a first resolution, the piece of second image data having one or a plurality of pixel values included in a partial image having a second resolution higher than the first resolution, the partial image having an image range narrower than the entire image, and the piece of third image data having one or a plurality of pixel values included in the entire image;

performing first driving in which a first plurality of pixels is driven in units of a first number of pixels on a basis of the piece of first image data;

performing second driving in which a second plurality of pixels is driven in units of a second number of pixels on a basis of the piece of second image data, the second number being smaller than the first number; and performing third driving in which a third plurality of pixels is driven in units of the first number of pixels on a basis of the piece of third image data, wherein each of the piece of first image data and the piece of third image data has one or a plurality of pixel values representing luminance, one or a plurality of pixel values representing a first color difference, and one or a plurality of pixel values representing a second color difference, a number of the one or plurality of pixel values representing the first color difference is smaller than a number of the one or plurality of pixel values representing the luminance, and a number of the one or plurality of pixel values representing the second color difference is smaller than the number of the one or plurality of pixel values representing the luminance.

\* \* \* \* \*